(12) United States Patent  
Cocotis et al.

(10) Patent No.: US 8,024,398 B2
(45) Date of Patent: *Sep. 20, 2011

(54) OUTPUT MANAGEMENT SYSTEM AND METHOD FOR ENABLING PRINTING VIA WIRELESS DEVICES

(75) Inventors: Thomas A. Cocotis, Huntington Beach, CA (US); Alan D. Curtis, Hermosa Beach, CA (US); David M. Emmett, Palo Alto, CA (US); Shengkuo Fan, Culver City, CA (US); Kristofer P. Henderson, Seattle, WA (US); Jack W. Luepke, Mt. Baldy, CA (US); Howard J. Nellor, Playa del Rey, CA (US); Jay A. Treptow, Maple Valley, WA (US); Gregory H. Wong, Torrance, CA (US)

(73) Assignee: Kyocera Mita Corporation, Osaka (JP)

( * ) Notice: Subject to any disclaimer, the term of this patent is extended or adjusted under 35 U.S.C. 154(b) by 1322 days.

This patent is subject to a terminal disclaimer.

(21) Appl. No.: 11/484,047

(22) Filed: Jul. 10, 2006

(65) Prior Publication Data

US 2007/0168514 A1    Jul. 19, 2007

Related U.S. Application Data

(62) Division of application No. 10/225,581, filed on Aug. 21, 2002, now abandoned.

(60) Provisional application No. 60/314,412, filed on Aug. 22, 2001, provisional application No. 60/351,754, filed on Jan. 23, 2002.

(51) Int. Cl.
*G06F 15/16* (2006.01)
*G06F 3/12* (2006.01)

(52) U.S. Cl. .................... 709/203; 358/1.2; 358/1.15
(58) Field of Classification Search .................. None
See application file for complete search history.

(56) References Cited

U.S. PATENT DOCUMENTS 5,825,891 A    10/1998   Levesque et al.
(Continued)

FOREIGN PATENT DOCUMENTS

WO    WO 01/42894 A1    6/2001

OTHER PUBLICATIONS

Moseley et al., "Mastering Office 97", 1997, Sybex Inc., Proffessional Edition, pp. 20-22, 98, 258-260, 535-536.*
Bigioi et al., Connectivity Solution to Link a Bluetooth Camera to the Internet, Aug. 2001, IEEE Transactions on Consumer Electronics, vol. 47, No. 3., pp. 294-299.*

(Continued)

*Primary Examiner* — Patrice Winder
(74) *Attorney, Agent, or Firm* — Blakely, Sokoloff, Taylor & Zafman

(57)    ABSTRACT

A system and method for managing output such as printing, faxing, and e-mail over various types of computer networks. In one aspect, the method provides for printing via a wireless device. The system provides renderable data to the wireless device by which a user-interface (UI) may be rendered. The UI enables users to select source data and an output device on which the source data are to be printed. The source data are then retrieved from a local or remote store and forwarded to a print service, which renders output image data corresponding to the source data and the output device that was selected. The output image data are then submitted to the output device to be physically rendered. The user-interfaces enable wired and wireless devices to access the system. The system enables documents to be printed by reference, and enables access to resources behind firewalls.

20 Claims, 48 Drawing Sheets

U.S. PATENT DOCUMENTS

| | | | |
|---|---|---|---|
| 6,088,796 | A | 7/2000 | Cianfrocca et al. |
| 6,255,800 | B1 | 7/2001 | Bork |
| 6,505,252 | B1* | 1/2003 | Nagasaka ................... 709/200 |
| 6,553,240 | B1* | 4/2003 | Dervarics ................... 455/566 |
| 7,050,993 | B1 | 5/2006 | Piikivi et al. |
| 2001/0029531 | A1* | 10/2001 | Ohta ........................... 709/223 |
| 2001/0034747 | A1* | 10/2001 | Fujitani et al. .............. 707/525 |
| 2002/0087673 | A1* | 7/2002 | Selkirk et al. ............... 709/223 |
| 2002/0099826 | A1* | 7/2002 | Summers et al. ............ 709/227 |
| 2002/0135798 | A1* | 9/2002 | Simpson et al. ............ 358/1.15 |
| 2002/0181010 | A1* | 12/2002 | Pineau ........................ 358/1.15 |
| 2003/0014651 | A1* | 1/2003 | Strobel et al. ............... 713/189 |
| 2003/0038963 | A1* | 2/2003 | Yamaguchi ................. 358/1.15 |
| 2003/0093324 | A1* | 5/2003 | Simpson et al. ............. 705/26 |

OTHER PUBLICATIONS

Bickmore et al., Digestor: device-independent access to the World Wide Web, 1997, Computer Networks and ISDN Systems 29, pp. 1075-1082.*

Varshney et al., "Emerging Mobile and Wireless Networks", Jun. 2000, ISSN: 0001-0782, pp. 73-81.

Flynn Mike, et al., "The Satchel System Architecture: Mobile Access to Documents and Services", Dec. 2000, ISSN: 1383-469X, pp. 243-258.

PCT International Search Report, Sep. 30, 2002.

Moseley et al. "Mastering Office 97", 1997, Sybex Inc., Professional Edition, pp. 20-22, 98, 258-260, 535-536.

\* cited by examiner

FIG. 38

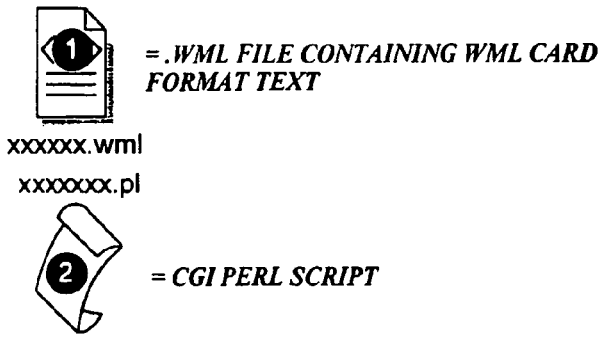

= .WML FILE CONTAINING WML CARD FORMAT TEXT xxxxx.wml xxxxxxx.pl

= CGI PERL SCRIPT

1 = A NAVIGATION LOCATION WITHIN THE CONTEXT OF FIGURES 39-52.
EXAMPLE: THIS IS TARGET LOCATION 1

(1) = IDENTIFIER FOR A JUMP TO A LOCATION WITHIN THE CONTEXT OF FIGURES 39-52.
EXAMPLE: JUMP TO TARGET LOCATION 1

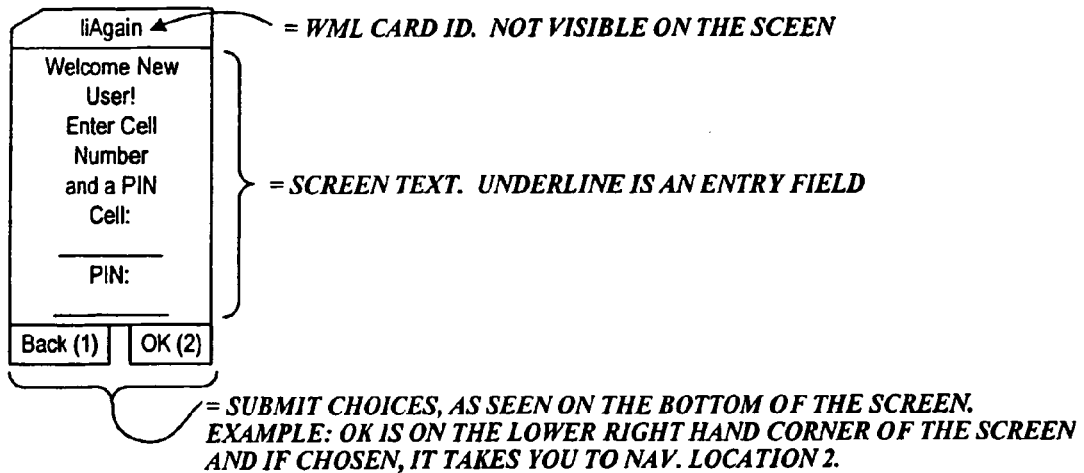

= WML CARD ID. NOT VISIBLE ON THE SCEEN

= SCREEN TEXT. UNDERLINE IS AN ENTRY FIELD

= SUBMIT CHOICES, AS SEEN ON THE BOTTOM OF THE SCREEN.
EXAMPLE: OK IS ON THE LOWER RIGHT HAND CORNER OF THE SCREEN AND IF CHOSEN, IT TAKES YOU TO NAV. LOCATION 2.

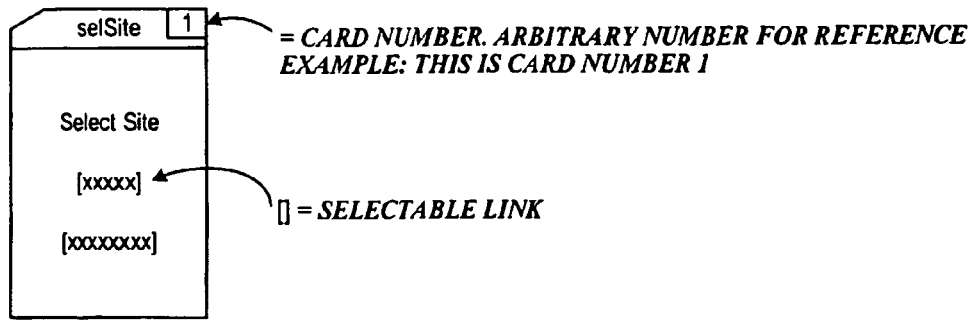

= CARD NUMBER. ARBITRARY NUMBER FOR REFERENCE
EXAMPLE: THIS IS CARD NUMBER 1

[] = SELECTABLE LINK

| CGI Returned HTTP Data | = THE ENTIRE CONTENT OF A WML FILE OF DATA. THIS CAN BE THE CONTENTS OF A .WML FILE OR THE DATA PORTION OF DATA RETURNED FROM A CGI SCRIPT |

FIG. 41 subOutputIndex.pl

NO SITE SELECTED → odSites [9]

Select Network Place
[xxxxx] (4)
[xxxxxxx] (4)

SETUP (5)

CGI Returned HTTP Data

624

CALLED WITH PARAMETER SITEID AND NO SELECTED DIRECTORY

SITE AND FILE SELECTED → odTypes [10]

(Site Name)
(Selected File)

[Print] (13)
[FAX] (14)
[Email] (15)

⎫
⎬ 634
⎭

BACK (4)  PLACES (3)

CGI Returned HTTP Data

632

THE CONSUMER'S SELECTED SITE AND FILE ARE DISPLAYED

CALLED WITH PARAMETERS BACK TO NO SITE SELECTED

CALLED WITH PARAMETERS SITEID AND SELECTED DIRECTORY

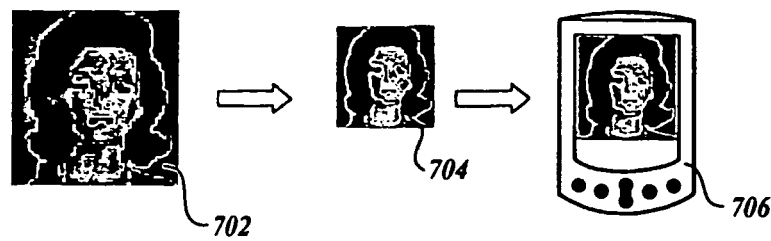
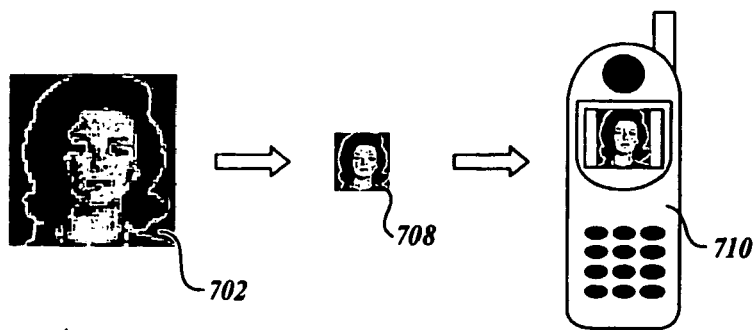
FIG. 53
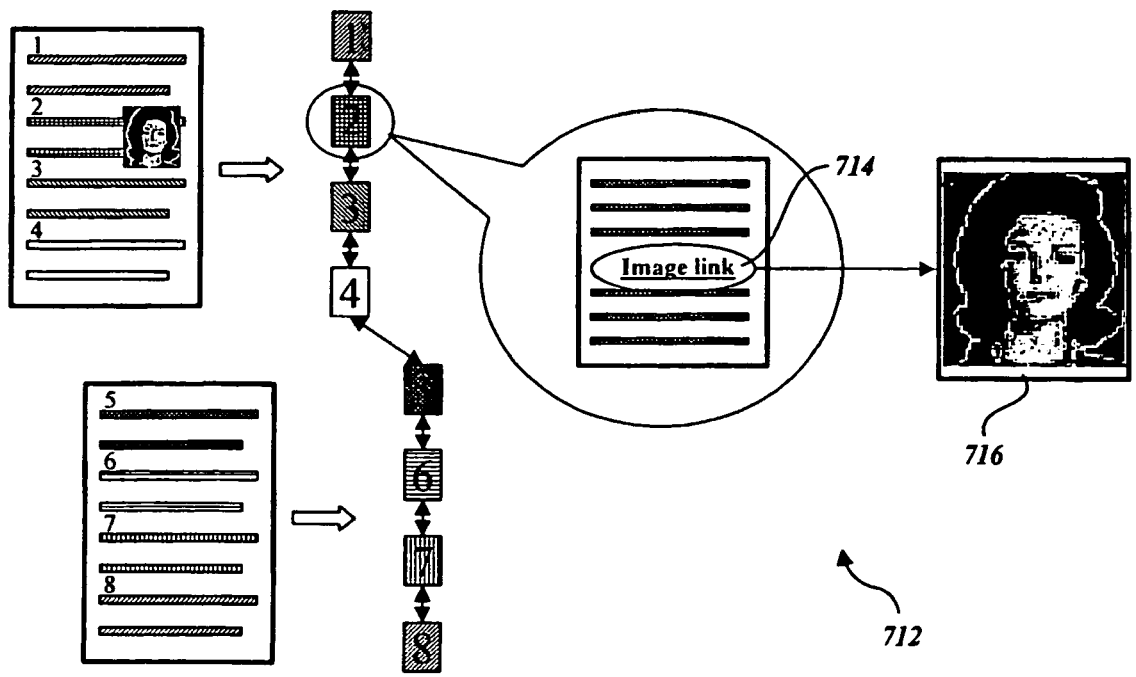
FIG. 54

OUTPUT MANAGEMENT SYSTEM AND METHOD FOR ENABLING PRINTING VIA WIRELESS DEVICES

RELATED APPLICATIONS

The present application is a Divisional of application Ser. No. 10/255,581, filed Aug. 21, 2002 now abandoned which is based on provisional applications entitled "METHOD AND APPARATUS FOR WIRELESS DOCUMENT PRINTING, VIEWING AND SHARING," Ser. No. 60/314,412, filed on Aug. 22, 2001, and "METHOD AND SYSTEM FOR PRINTING AND FORMATTING DOCUMENTS AND OUTPUT RESOURCE MANAGEMENT FROM MOBILE DEVICES" Ser. No. 60/351,754, filed on Jan. 23, 2002, the benefit of the filing dates of which are claimed under 35 U.S.C. §119(e), and on non-provisional applications entitled "UNIVERSAL PRINTING AND DOCUMENT IMAGING SYSTEM AND METHOD," Ser. No. 10/098,832 filed on Mar. 13, 2002, and "METHOD AND SYSTEM TO PRINT VIA E-MAIL," Ser. No. 10/104,528, filed on Mar. 21, 2002, now, U.S. Pat. No. 6,993,562 which issued Jan. 31, 2006, the benefit of the filing dates of which are claimed under 35 U.S.C. §120. In addition, the specification and drawings of each of the non-provisional application are incorporated herein by reference in their entirety.

FIELD OF THE INVENTION

The field of invention relates generally to networked printing environments and, more specifically but not exclusively relates to mobile networked printing environments and management of output requests.

BACKGROUND INFORMATION

In a traditional printing environment, users operating computers interconnected via closed computer networks such as local area networks (LANs) may submit documents generated by applications running on their computers to be rendered on output devices connected to the networks, such as printers, plotters, and the like. In today's fast-paced mobile business environment, this limited printing solution is no longer satisfactory. While legacy printing technologies certainly have advanced to output document faster with higher resolution, improved quality, and color, there has been little effort to develop a printing technology that fits today's mobile workforce.

In today's mobile business environment, many printing scenarios occur that were not considered or addressed by developers of traditional printing environments. For example, consider the following situations. Can a business developer submit a needed agreement stored on his company's home network to a printer in a partner's network while preparing to discuss a business deal at the partner's office? Can a traveling sales representative print her presentation slides to a nearby printer rather easily, even if she doesn't even have the presentation slide document with her? Can a Bluetooth handset user walk into a room, detect the presence of a Bluetooth capable printer, and print a document by reference to a nearby printer even though the printer is not Bluetooth-enabled? Can an instant messaging user drag and drop a document to his buddy's printer list to print the document? Can a venture capitalist in an airport print a needed document at his home office using only his cell phone? It would be advantageous to provide a printing solution for each of these situations, and other similar scenarios.

SUMMARY OF THE INVENTION

In accordance with aspects of the present invention, a system and method for managing output such as printing, faxing, and e-mail over various types of computer networks is provided. In one aspect, the method provides for printing via a wireless device. The system provides renderable data to the wireless device by which a user-interface (UI) may be rendered. The UI enables users to select source data and an output device on which the source data are to be printed. The source data are then retrieved from a local or remote store and forwarded to a print service, which renders output image data corresponding to the source data and the output device that was selected. The output image data are then submitted to the output device to be physically rendered. The user-interfaces enable wired and wireless devices to access the system. The system enables documents to be printed by reference, and enables access to resources behind firewalls.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 38 is a legend corresponding to WAP-based user interfaces details in FIGS. 39-52;

FIG. 41 is a WAP UI flow diagram corresponding to a subOutputIndex.pl CGI script;

FIG. 53 is a diagram illustrating how an original document image is converted to various-sized thumbnails for document preview on devices with low-resolution screens;

FIG. 54 is a schematic diagram illustrating how a user may navigate through portions of a text-based document to preview how the document will appear when it is output on a selected output device;

DETAILED DESCRIPTION OF PREFERRED EMBODIMENTS

Figure 1:
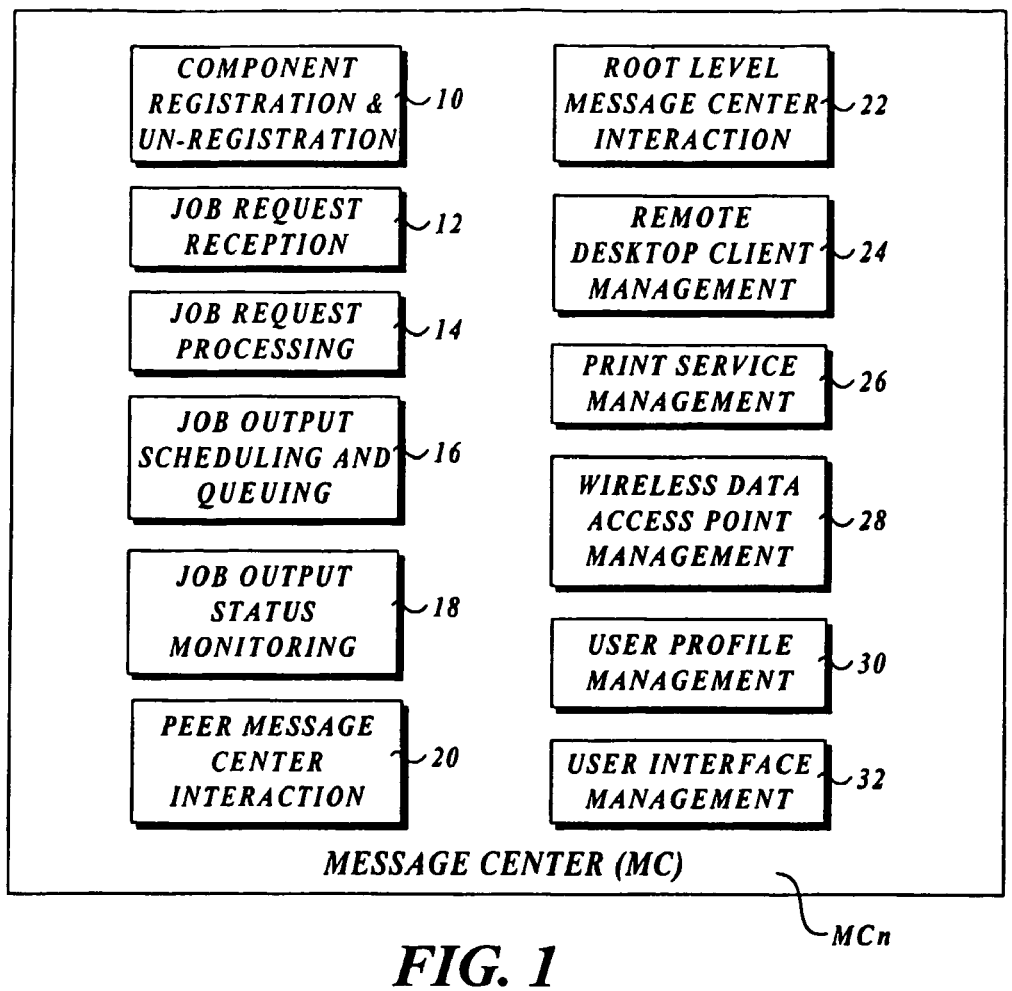
FIG. 1 is a block schematic diagram illustrating various tasks performed by a Message Center (MC)

Embodiments of an output management system and method that provides printing solutions for mobile users and land-line users are described herein. In the following description, numerous specific details are set forth, such as exemplary architecture implementations, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Definitions

The following terms and their definitions are frequently used throughout the following description:

Source Data: Source data refers to any document or media that can be retrieved and output to a device. The supported input data formats include but are not limited to most of the document processor supported types (e.g., PDF, PostScript, Microsoft Word, ASCII text, etc.), Web URL link, e-mail, and e-mail attachments.

Remote Store: A Remote Store comprises a remote location on a Local Area Network (LAN) or on the Internet where the Source Data are stored. Remote Stores include but are not limited to an FTP content server, an NFS file server, a PCNFS file server, and a Web server.

Local Source: A Local Source comprises Source Data that are stored on the same user device from which a print request is issued. Accordingly, when printed from a Local Source, the Source Data need to be uploaded from the user's device onto the output management system for processing.

Remote Source: A Remote Source comprises Source Data that are stored on a Remote Store.

Originating Device: A wireless or wired device from which a user originates a Job Request.

Output Device Output Device: An Output Device comprises an apparatus that takes output image data from the system and turns them into a specific form for viewing or recording purposes. The supported output devices include but are not limited to printers, fax machines, remote document repositories, and e-mail destinations. These output devices can be situated on a LAN, or may reside on an external network, including public-accessible networks such as the Internet and private networks.

Job Request: A Job Request refers to a request that a user submits to the system to be processed and sent to an Output Device.

Job Status This refers to the status of a job request that indicates the current progress of the request processing. It is a mechanism to help users understand the status of their job requests and to help the system administrators to administer them.

Print By Reference (PBR): This job processing method specifies that the system should retrieve the Source Data from a Remote Source rather than a Local Source.

Deferred Print This is defined as to defer the output of a processed job request, the final stage of job processing, due to current unavailability of a destined Output Device.

User Database This refers to the system database used to track each user's system configuration settings.

Server: A computer running software that is accessible over a network.

Web Server: A software program running on a computer or server, which communicates with client computers using the HyperText Transmission Protocol (HTTP) or Secure HTTP (HTTPS) to transmit HyperText Markup Language (HTML) files, Common Gateway Interface (CGI) data, and data files between the client and server computers.

Windows Printer In the Microsoft Windows Operating systems, a 'Printer' is defined as the named combination of a printer driver, print processor, language monitor, and port monitor.

Spool File: A printer language file that is created by a MS Windows printer driver. The content of this file may be sent directly to a printer for printing.

Internet Printing Protocol (IPP): A protocol similar to HTTP for sending spool files to, and getting print job status from, a networked printer.

Line Printer Remote (LPR): A protocol for submitting spool files to a networked printer.

Zone: A network that encloses an autonomic Output Management System. Typically, a Zone comprises a logical representation of a network domain.

The various embodiments of the invention described herein enable wireless and wired users to retrieve source data from local and remote sources, and request that the source data be output on selected output devices, also referred to as destined or destination output devices. In general, the output devices may be located on the same network as an originating device (i.e., the device from which an output request is issued), or more often the case, on a separate network, including networks that normally would not be accessible to the originating device.

At a top level, the operations and functionality of the embodiments of the invention's output management system described herein are enabled through the user of four major components: Message Centers (MC), Print Services (PS), Remote Desktop Clients (RDC), and Wireless Data Access Points (WDAP). In actual implementations, various combinations of these components will generally be used, dependent on the particular requirements of the implementations.

The Message Center is the heart of the system. It interfaces with the rest of the components in the system to ensure the entire system functions properly. As shown in FIG. 1, in one embodiment a Message Center MCn performs twelve major tasks, including Component Registration and Un-registration 10, Job Request Reception 12, Job Request Processing 14, Job Output Scheduling and Queuing 16, Job Output Status Monitoring 18, Peer Message Center Interaction 20, Root Level Message Center Interaction 22, Remote Desktop Client Management 24, Print Service Management 26, Wireless Data Access Point Management 28, User Profile Management 30; and User Interface Management 32.

Figure 2:
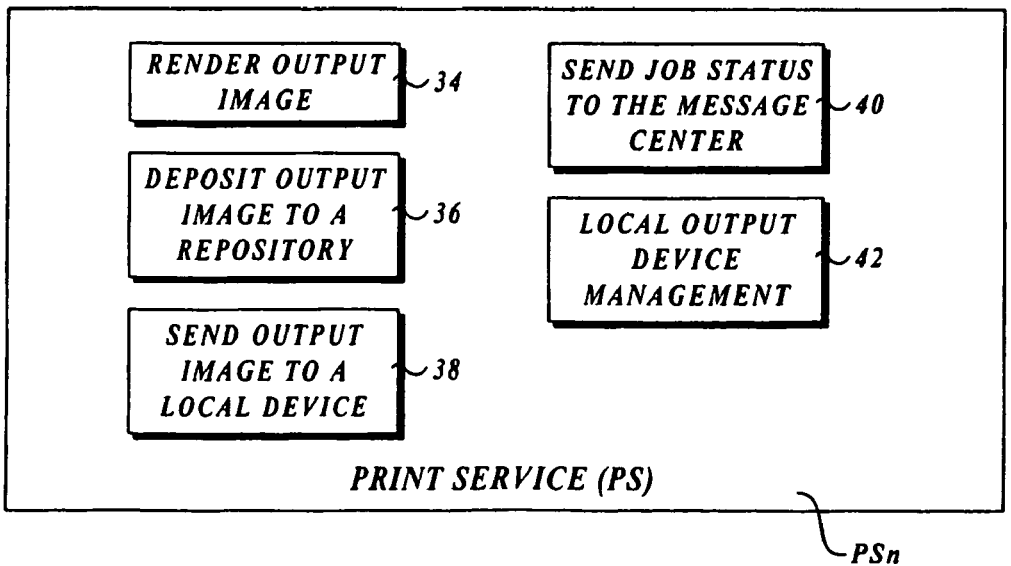
FIG. 2 is a block schematic diagram illustrating various tasks performed by a Print Service (PS)

The Print Service component handles the rendering and printing of a job request. As shown in FIG. 2, in one embodiment a Print Service PSn performs print service tasks including Render Output Image 34, Deposit Output Image to a Repository 36, Send output image to a Local Device 38, Send Job Output Status to the Message Center 40, and Local Output Device Management 42.

Figure 3:
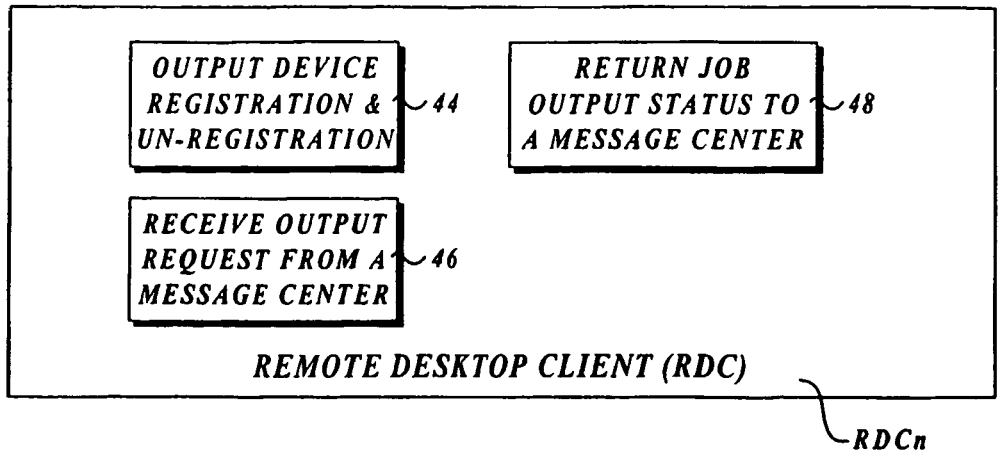
FIG. 3 is a block schematic diagram illustrating various tasks performed by a Remote Desktop Client (RDC)

The Remote Desktop Client component helps the remote device to connect to the entire system. As shown in FIG. 3, in one embodiment a Remote Desktop Client RDCn performs three major tasks including Output Device Registration and Un-registration 44, Receive Output Request from a Message Center 46, and Return Job Output Status to a Message Center 48.

Figure 4:
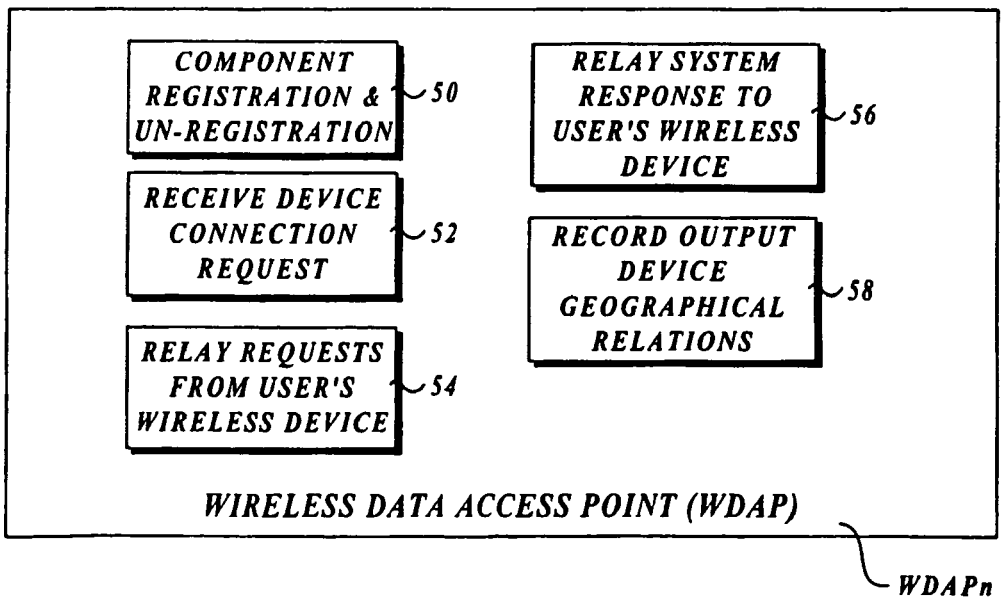
FIG. 4 is a block schematic diagram illustrating various tasks performed by a Wireless Data Access Point (WDAP)

The Wireless Data Access Point component helps wireless users to connect to the system using a standard wireless protocol, such as Bluetooth, IEEE 802.11, etc. It also helps the Message Center to manage the resource mapping for wireless access purposes. As shown in FIG. 4, in one embodiment a WDAPn performs five major tasks, including Component Registration and Un-registration 50, Receive Device Connection Request 52, Relay Requests from user's Wireless Device 54, Relay System Response to user's Wireless Device 56, and Record Output Device Geographical Relations 58.

Overall, inventive aspects of the embodiments of the output management system described herein cover the following operations: 1) Device Resources Management; 2) Device Resource Discovery; 3) Job Request Management; 4) Job Request Scheduling; 5) Job Request Monitoring; 6) User Profile Management; and 7) User mobile sign-in. The following describes a brief preview of each aspect, with further details described via exemplary system embodiments described thereafter.

Device Resource Management

The system manages device resources to allow easy and fast output device location. In one embodiment these devices are divided into physical and logical output devices. The physical output devices include but are not limited to printers, fax machines, and copy machines. The logical output devices including but are not limited to file servers, print servers, FTP repository, and e-mail destinations. Following is a list of related operations.

Using Hierarchical Root Message Centers, Public and Private Device Classification for Easy Resource Management and Sharing: The system uses a database to record the relations of each Message Center. The root Message Center has a Message Center Id (MCID) equal to 0; all other Message Centers have non-zero positive integer MCID values. A root Message Center table maintains information that identifies the zone and network address of the other Message Centers. Local Message Centers need to register to the root Message Center and to announce their public resource information for resource sharing. All non-published device resources are considered private and cannot be shared outside the zone in which they reside.

Device Management Using Local and Remote Client Registration Mechanism: The associated Print Services register their connected output devices to the Message Center; likewise the associated Remote Desktop Client registers its directly connected output devices to the Message Center. These output devices may then be referenced through a corresponding Print Service or Remote Desktop Client. Depending on the particular security requirements of an implementation, it may be advisable to use encryption on the Print. Services and Remote Desktop Clients in a system to ensure data security and integrity, if such is required.

Device Management Using World Wide Web and Mobile Device Interface: The system provides a complete administration interface in conjunction with a simple mobile administration interface for device management purpose.

Remote Device Installation Using Centralized Driver Store: Upon registration of an output device, a corresponding driver will need to be installed on the Print Service associated with the output device. The Message Center provides an array of commonly used drivers in its driver stores to eliminate the need of requiring a device to transfer the driver to the Print Service component. However, if the driver is not currently available from the MC driver store, it may be transferred to the driver store, and subsequently installed on the Print Service.

Device Resource Discovery

The system enables users to locate output devices in a mobile computing environment. As discussed in further detail below, in one embodiment it uses Bluetooth and IEEE 802.11 technology for device discovery. It also enables non-Bluetooth capable devices to operate as through they are Bluetooth devices through its Bluetooth Device Emulator. Following is a list of related operations.

Output Device Discovery and Registration to a Message Center Via a Bluetooth Connection This is achieved by running an agent on the Wireless Data Access Point (WDAP) to interface with the Message Center to acquire the output device information. The agent also collaborates with the Message Center to maintain its output device information database is run on the WDAP.

Local Generic Output Device Availability Announcement to a Bluetooth Client via a Bluetooth Gateway: An optional Bluetooth gateway can be deployed to help a Message Center manage the information it receives through WDAP's. This information, including output device availability, will be announced to a wireless user when he or she connects to the network through a registered WDAP. For mobile users, this information will be refreshed by the system as the user travels through the network and connects to different WDAP's.

Output Device Discovery and Registration via 802.11 Gateway: This is achieved by running an agent on the Wireless Data Access Point (WDAP) to interface with the Message Center and to acquire the output device information in a manner similar that used for Bluetooth connections.

Output Device Availability Announcement via IP Broadcast: An optional 802.11 gateway can be deployed in the system to help a Message Center manage the information it receives through WDAP's. This information, including output device availability, will be announced to an 802.11 authenticated user when he or she enters the network through a registered WDAP. The information will be refreshed by the system as the user travels through the network and connects to different WDAP's.

Local Output Device Availability Announcement via an Instant Messaging Interface The Remote Desktop Client can be expanded to support device management through an instant messaging (IM) protocol (e.g., AOL Instant Messaging, Yahoo Messaging, MSN Messaging, ICQ, etc.). The concept is to make users' output resources viewable and shareable to other messenger users (e.g., buddies, etc.). For example, this capability enables IM users to drag and drop files to a shared device on a buddy's list of output devices thereby enabling output corresponding to the files to be output on a device the buddy can easily access.

Default Output Device Assignment Based on Output Resource Discovery: There are two types of default output devices, one is the Static Default Output Device, and the other is the Dynamic Default Output Device. A user can modify his or her profile settings via a Graphical User Interface (GUI) to change the Static Default Output Device. However, only the system updates the Dynamic Default Output Device when a user uses a mobile device to access the system. Either way, the user may turn the dynamic overwrite off by modifying the user's profile setting or always specify the output device destination.

Job Request Management

The system implements a request queue to manage the job requests. Following is a list of related operations.

Using A Remote Desktop Client to Manage Job Requests for an Output Device: A Job Request to a destined output device is channeled through a Remote Desktop Client. This RDC helps the output device retrieve the output data and send a status back to the Message Center. The same RDC may implement encryption to protect the output data exchanged between the Message Center and the RDC.

Job Submission Through an Instant Messaging Interface: The Remote Desktop Client can be modified to support job submission through an instant messaging protocol (e.g., AOL Instant Messaging, Yahoo Messaging, MSN Messaging, ICQ, etc.). This mechanism enables users may drag and drop a file to a device on his or her buddy's shared output device list. The buddy will then receive the output data from the device. The modified RDC needs to register to a Message Center (e.g., AOL owned, Yahoo owned, corporate owned, or a root MC). Upon success, the output management interface on the instant messaging UI will be visible. User's resource information will be transferred to the connected buddy through the instant messaging protocol if user's buddy also runs an RDC tailored for the instant messaging tool. Documents can then be dragged and dropped to a user buddy's shared output devices.

Receive Job Printing Request Through an Instant Messaging Interface: The remote Desktop Client can be modified to support job reception through an instant messaging protocol. When a sender drags and drops output data to a device on a receiver's shared output device list, the job request is sent to the receiver's RDC for printing. The modified RDC needs to register to a Message Center, as before. Upon success, the output management interface on the instant messaging UI will be visible. A user's resource information will be transferred to the connected buddy through the instant messaging protocol, if the user's buddy also runs a RDC tailored for the instant messaging tool. The user can then receive job request from other registered user.

Interface with Multimedia Messaging System: The Message Center can deploy inbound and outbound gateways to interface with most multimedia messaging systems. This deployment enable generic multimedia clients communicate with output management system powered clients to exchange information or to request output to shared devices and destinations.

Job Submission Through a Bluetooth Connection to a Generic Output Device: WDAP's that include Bluetooth device emulators enable users to access the system's submission interface through a Bluetooth connection. Upon request, output device availability is returned to the user, including Bluetooth and generic output devices. The user may then send output to a selected destination output device through the Bluetooth connection.

Job Request Rendering Through a Dedicated Server: The system uses a Print Service as a dedicated job-rendering server. This reduces unnecessary installation of device drivers on the client machine. With the Remote Desktop Client, the job rendered thousands miles away can be output to a local device and vice versa.

Personal and Business Job Request Classification: Current corporate printing environments do not differentiate between a personal print job request from a business request. In contrast, the system implements a method to classify job requests, tag them in the database, and to retain the information for accounting purposes. The accounting department can charge the department or the employee accordingly, based on job characteristics defined by the job requests.

Support Guest Printing: The system can be configured to support Guest Printing. This is achieved through a guest job submission interface hosted on the Message Center. The interface does not enforce user profile validation, but rather only allows restricted access to the public output resources. Administrators can configure the Message Center to still support Dynamic Default Printer for Guest Printing.

E-mail Job Request Support: The system accepts E-mails with or without attachments as general job requests. It can process these requests with or without the attachments to multiple output channels.

Document Preview: The system supports document preview to provide users with visual confirmations (e.g., the right version of the document) before they issue a final output request. This Document Preview feature provides a fast method for users to view images in dithered thumbnails and to view other files in plain text format with page references preserved. For spreadsheets, it also provides navigation in both vertical and horizontal directions. Furthermore, in the preview document the page relations of the original document are maintained, thereby enabling users to have random access to preview documents.

Job Request Scheduling

The system implements a request queue to manage the job requests. Following is the list of related operations.

Deferred Job Scheduling: When a job request enters the Message Center, a Job Queue entry is inserted into the Message Center database to maintain sufficient information for job processing purposes. If the destined output device is not available, the system keeps the entry in the queue and reschedules it a later time (using an administrator-configurable deferral value) such that it may be submitted when the output device becomes available.

Output Using File Reference in Job Spooling Factory: The system uses a Print Service to render the output image. Because the Print Service and Message Center generally will not be co-located on the same host machine, the rendered data need to be transferred from the Print Service to the Message Center for the final stage processing. For efficiency considerations, the Print Service stores the rendered image to a shared spooling factory (i.e., repository) and returns a reference of the image to the Message Center. The Message Center then uses the reference to output the data to the destination.

Secure Output through Firewall: The modular design of the system allows customized configurations of each component. Administrators may install a firewall to protect the system. The Remote Desktop Client has the ability to interface with the Message Center when the firewall is properly configured. This gives uses the ability to print documents through a firewall.

Job Request Monitoring

The system implements job status monitoring via job queue log tracking. Following is a list of related operations.

Job Status Monitoring via Job Persistent State Tracking Using Database Update The Message Center maintains persistent states for each job request. When a job output request is sent out, the Table Update Handler monitors the job state to determine if the output request is completed. If so, it updates the database and returns the status to the user.

Job Output Status Reporting via WAP Push: When a job request is completed, the job state in the database is updated. The Message Center then informs the user of its completion via a WAP push if the job originator is a WAP client.

Job Output Status Reporting via HTTP Browser Refresh: When a job request is completed, the job state in the database is updated. The Message Center then informs the user of its completion. For HTTP job submission clients, the job state is updated by automatic browser refresh until the state is marked completed.

Output Creation

The system implements a Print Service for output creation. Following is a list of related operations performed by Print Services.

Dynamic Selection of Output Rendering Applications Based on Input File Format and Configurable System Settings: The applications used to render the output file images can be prioritized based on the format of input files. The priorities can be adjusted via change of system configuration settings.

Use of Third Party Applications for Output File Image Rendering: The system use may also use third party applications to render output images.

Multiple Output Rendering Algorithms Support: The system uses different methods for generating the output images, depending on the particular characteristics of the input document. It may use a background service with print tools and printer drivers, a foreground keystroke simulation with application control handler, or a translator to do the rendering.

Multiple Output Channel Support: The system supports multiple output channels including but not limited to printing to printer channels, sending faxes to fax recipients, previewing output images on originating devices, and sending output to e-mail destinations. When an e-mail destination output channel is chosen, the document can be included within the e-mail body or sent as an attachment.

Window Handler to Increase Overall System Reliability: The system uses a windows handler to deal with the various pop-up dialog boxes that may be encountered when the foreground output rendering option is used. This allows the system to run fully unattended over a long period of time User Profile Management The system enables users to manage their personal profiles using a Web or mobile device interface. Following is a list of related operations.

User Profile Management and Dynamic Update via Web And Mobile Device Interface: The user profile is created and maintained by the Message Center used to store subscription information. Users can use WEB (HTML) or WAP (WML) interfaces to change their configuration settings when necessary. In addition, the system automatically updates the user's Dynamic Default Printer if the user is currently using a mobile device to access the system in the user's home network.

User Profiles Multiple Billing Record Support: User profiles contain multiple billing ID for the system to tag different type of charges. For instance, a user may have both a personal printing account and business printing account. This can help organizations to integrate the output management system into their billing systems easier.

User Mobile Sign-in

The system enables users to sign on a local network via a Wireless Data Access Point (WDAP). The local shared resources will then be made available to the user. Following is a list of related operations.

Users Authentication via Verification of the Query Result from the Mobile Device The system retrieves the unique identifiers of a query result to validate against the user's profile. It can then send out a customized greeting based on the user's identification.

Enable Mobile Users to Access System Resources: The Wireless Data Access Point component enables a wireless user to access the network via a wireless connection (e.g., Bluetooth, 802.11). The WDAP also supports Dynamic Default Printer management.

Exemplary System Configurations

Figure 5:
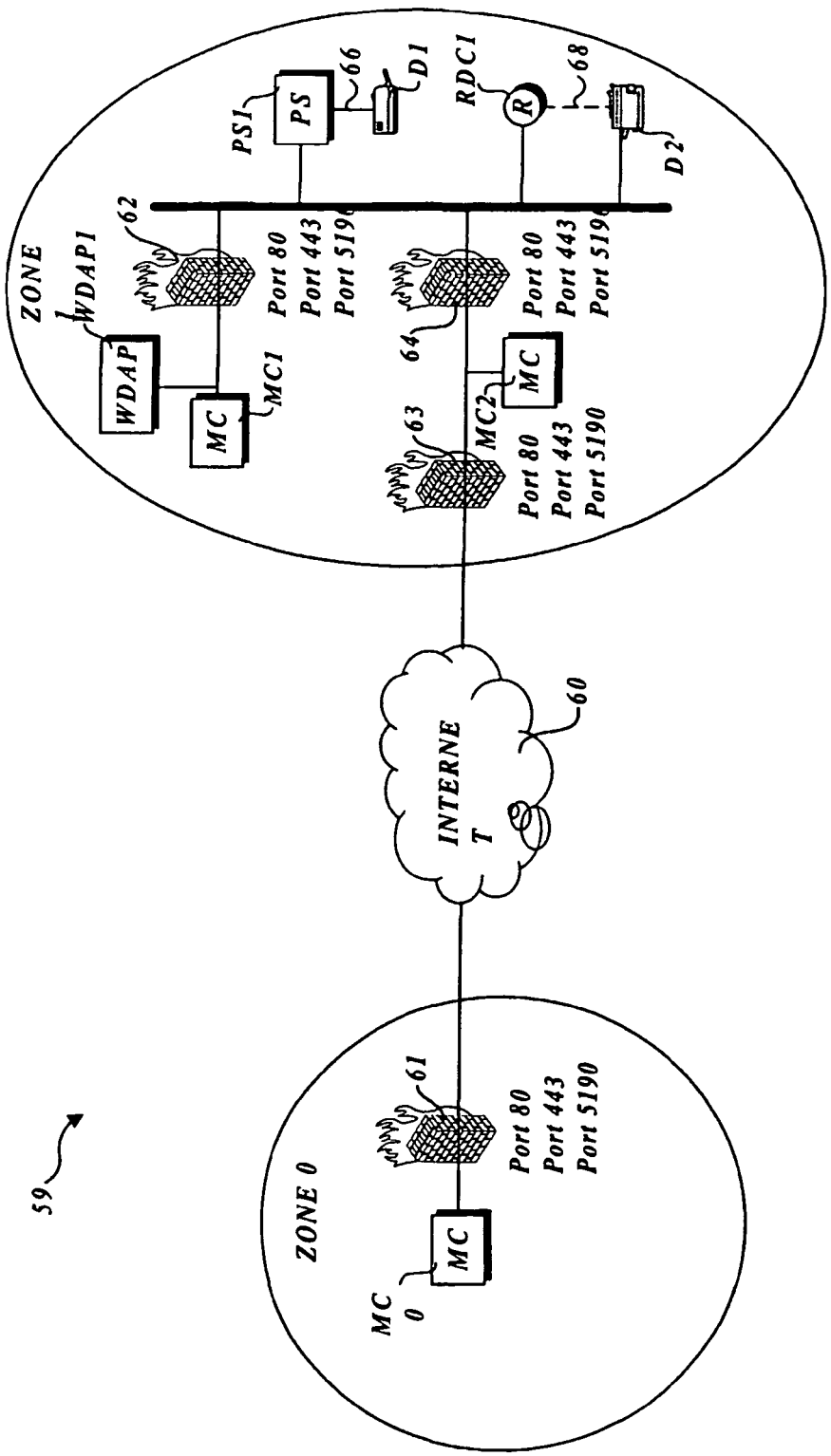
FIG. 5 is a schematic diagram illustrating a simple exemplary output management system implementation.

A simple exemplary system configuration 59 is shown in FIG. 5. In this example, the system is deployed in two Zones, namely Zone 0 and Zone 1, linked in communication across Internet 60. Zone 0 contains a root Message Center MC0 that manages all shared public output resources. Zone 0 may also contain an optional firewall 61. Zone 1 contains two Message Centers, MC1 and MC2. Message center MC1 is located behind an internal firewall 62 and is private. Message center MC2 is located in a network DMZ (demilitarized zone) between firewalls 63 and 64 and is public. A printer service PS1 is also public, as is a remote desktop client RDC1. Output devices D1 and D2 are both public as well.

In FIG. 5 and the following system configuration figures, solid lines indicate that there is a direct link between the connected entities, while dashed lines indicate the connection of the entities is a logical association (e.g., via registration) rather than a direct link. For example, output device D1 is directly linked to print service PS1 via a direct link 66, while output device D2 is logically associated with remote desktop client RDC1, as depicted by a logical association 68.

In some configurations, the firewalls may need to open port 80 (e.g., for Apache Web Services to service CGI calls) and port 5190 (for Instant Messaging as well as the system communication port) in order to allow users to access Message Center MC2 and to allow Message Center MC2 to access Print Service PS1, remote desktop client RDC1, and output devices D1 and D2. If SSL (Secure Socket Layer) is required, the firewalls also need to open port 443. Notice that the wireless data access point WDAP1 is located behind internal firewall 60 for security reasons to shield off external wireless users from the internal network.

Figure 6:
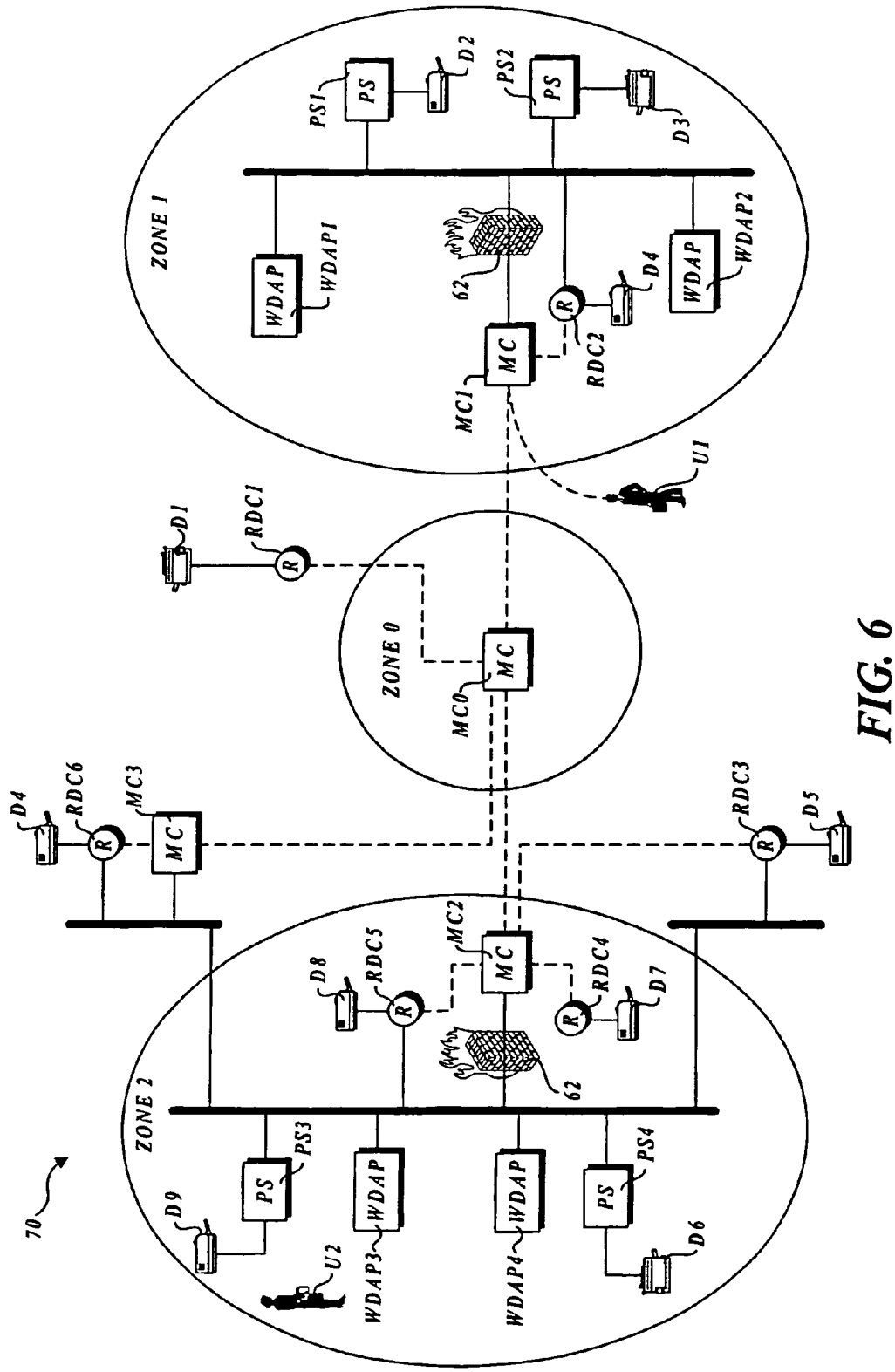
FIG. 6 is a schematic diagram illustrating a more complex exemplary output management system implementation.

A more complex system configuration 70 is shown in FIG. 6. In this example, the system is deployed across three zones: Zone 0, Zone 1, and Zone 2. Zone 0 contains a root Message Center MC0 that manages all shared public output resources. Zone 1 and Zone 2 are private zones that may contain both public and private resources. Zone 1 contains a public Message Center MC1, two private Print Services PS1 and PS2, two private WDAP's (WDAP1, WDAP2), one public remote desktop client RDC2, two private output devices D2 and D3, and one public output device D4. Zone 2 contains two public Message Centers MC2 and MC3, two private Print Services PS3, PS4, two private WDAP's (WDAP1, WDAP2), one private remote desktop client RDC5, three public remote desktop clients RDC3, RDC4, RDC6, three private output devices D6, D8, and D9, and three public output devices D5, D7, D10. Zone 0 contains a public Message Center MC0 that has three Message Centers registered to it (MC1, MC2, and MC3). It also has a registered remote desktop client (RDC1). The private resources (e.g., output devices D2, D3, D8 and remote desktop client RDC5) within each zone are not shared outside of the zone. Message Centers that manage public resources are registered with root Message Center MC0 so that they may be accessed through a public request.

Message Center MC0 is the root level Message Center that contains references to the registered public Message Centers. Upon installation of the system, the corporate owned Message Centers (MC1 and MC2) need to register themselves with the root Message Center. In instances in which a large number of public resources need to be managed, the configuration may include multiple root Message Centers. In such cases, in one embodiment the root MC's will be broken down into a hierarchy tree. In general, the organizations of the root Message Centers in such implementations are very flexible. Using geographical location to illustrate one classification possibility, the bottom level of the tree hierarchy could correspond to a specific region (e.g., California state, Minnesota state, Taiwan province, Canton province), the second-to-bottom level could group some of the region MC's into a greater regional MC (e.g., US MC, China MC), the next level up in the hierarchy could in turn group some of the MC's at the second-to-bottom level into a still greater region MC (e.g., America, Asia, Europe); eventually the hierarchy will lead to a master MC that represents the entire domain. A similar approach may be applied to set up Message Center hierarchies in terms of corporations, personal, and government.

A registered Message Center can query the root Message Center for public output resources. In one embodiment, the search may be based on the following RDC parameters: the name of the client, the zip code of the client, or the state of the client. The search may also be based on the zone descriptor or the zone type. In addition, the device resource search can be based on device resource name or device resource description. When the Zone 0 root level Message Center receives a search request, it returns the identifier of records found in its database. Subsequent searches are then performed with these identifiers as the qualification to return more extensive information.

Returning to FIG. 1, further details of the Message Center components are now described. The Remote Desktop Clients and Print Services register their output resources with Message Centers that provide access to these services via Component Registration and Un-registration component 10. During the registration process, the output resource type (e.g., printer, plotter, etc.) is determined by corresponding type-definition data. The Message Center collects these output resources and registers the public ones to the root level Message Center. The root Message Center creates a record for each registered public output device with sufficient information such that other Message Centers may use data contained in the record as a corresponding reference to access the resource remotely.

When an output device wants to disassociate itself from the Message Center, it sends a un-register request to the Message Center. In response, the Message Center un-registers the output device from the root Message Center. If the output device is a public resource, a corresponding sharing record in the root Message Center database is also removed.

Job Request Reception task 12 enables a Message Center to receive job requests. In one embodiment, the Message Center employs an Apache Web Server that runs a set of CGI scripts that can be invoked to submit job requests. The CGI scripts add print jobs to the system job queue in the Message Center. Once a job queue entry is created, the job submission is considered completed.

Once a job request has been submitted, handling of the request is performed by Job Request Processing task 14. When a job request enters the system, the Message Center gathers the source data either through referencing a Remote Source on a Remote Store or the submitter will transmit the Local Source to the Message Center. The Message Center then locates a Print Service to render an output image file corresponding to the source data and the destined output device.

After the output image file is created, the Print Service returns a file reference to the Message Center; the Message Center then calls the corresponding RDC to send the rendered image to the output device. If the RDC or the destined device is not available, the print request is deferred. The system will then try to resend the print request to the RDC again, as defined by a configurable retry duration. These operations are handled by Job Output Scheduling and Queuing task 16.

After the job output request is sent to the output device, the job status is returned to the Message Center via Job Output Status Monitoring task 18. The Message Center then updates its state and informs the user of the current job output status. In one current implementation, the system supports the following job states. DOCUMENT_DONE, INPUT_PENDING, RESOURCE_WAIT, IN_PROGRESS, COMPLETE, CANCEL_BY_USER, and ERROR.

In accordance with Peer Message Center Interaction task 20, the system architecture allows peer-to-peer Message Center communication for various operations. The interactions among peer Message Centers includes Zone 0 lookup queries, document routing requests, print document requests, and status back replies.

Figure 7:
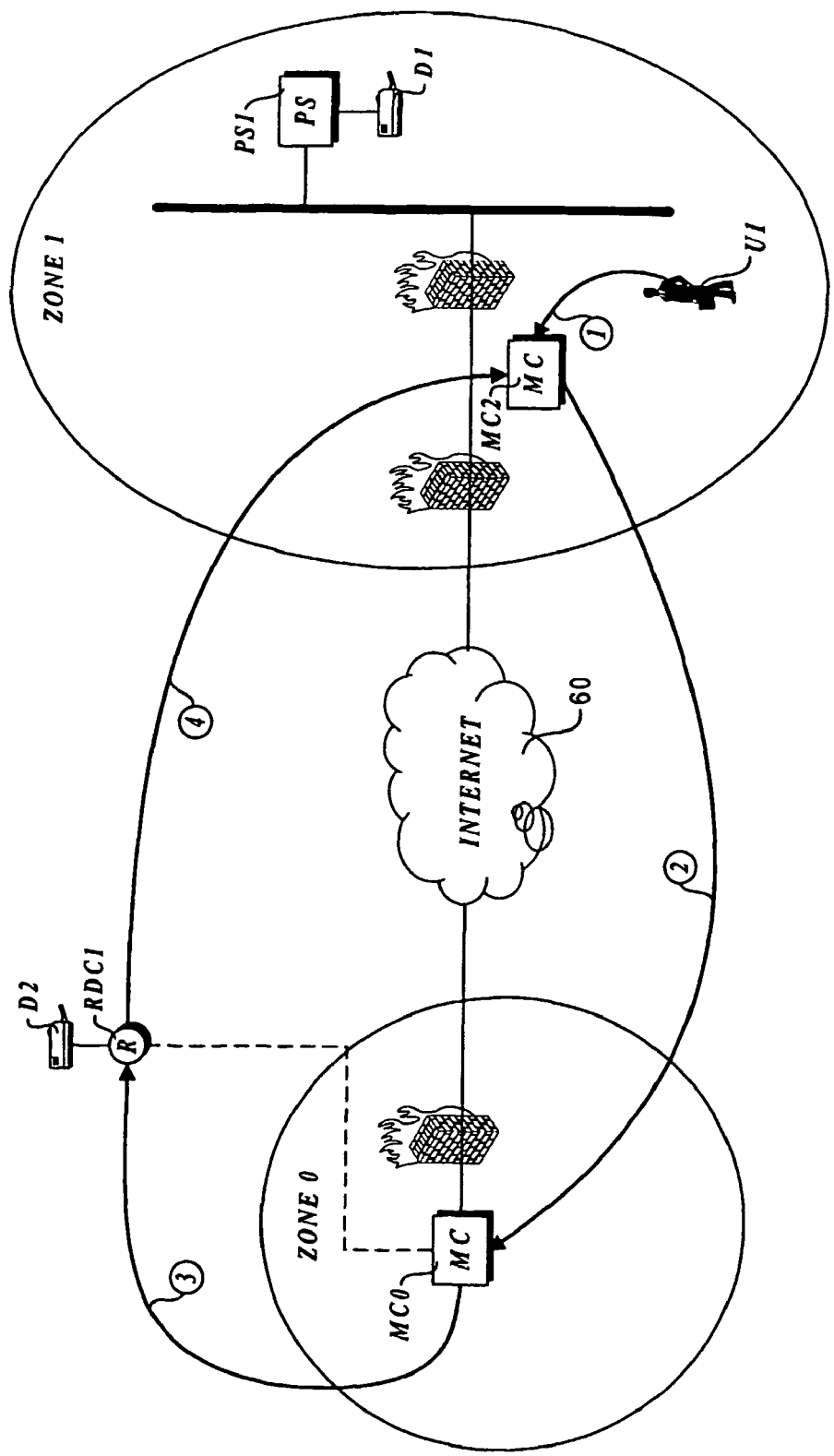
FIG. 7 is a schematic diagram of an interaction between a root Message Center and a Message Center connected to a private network.
Figure 8:
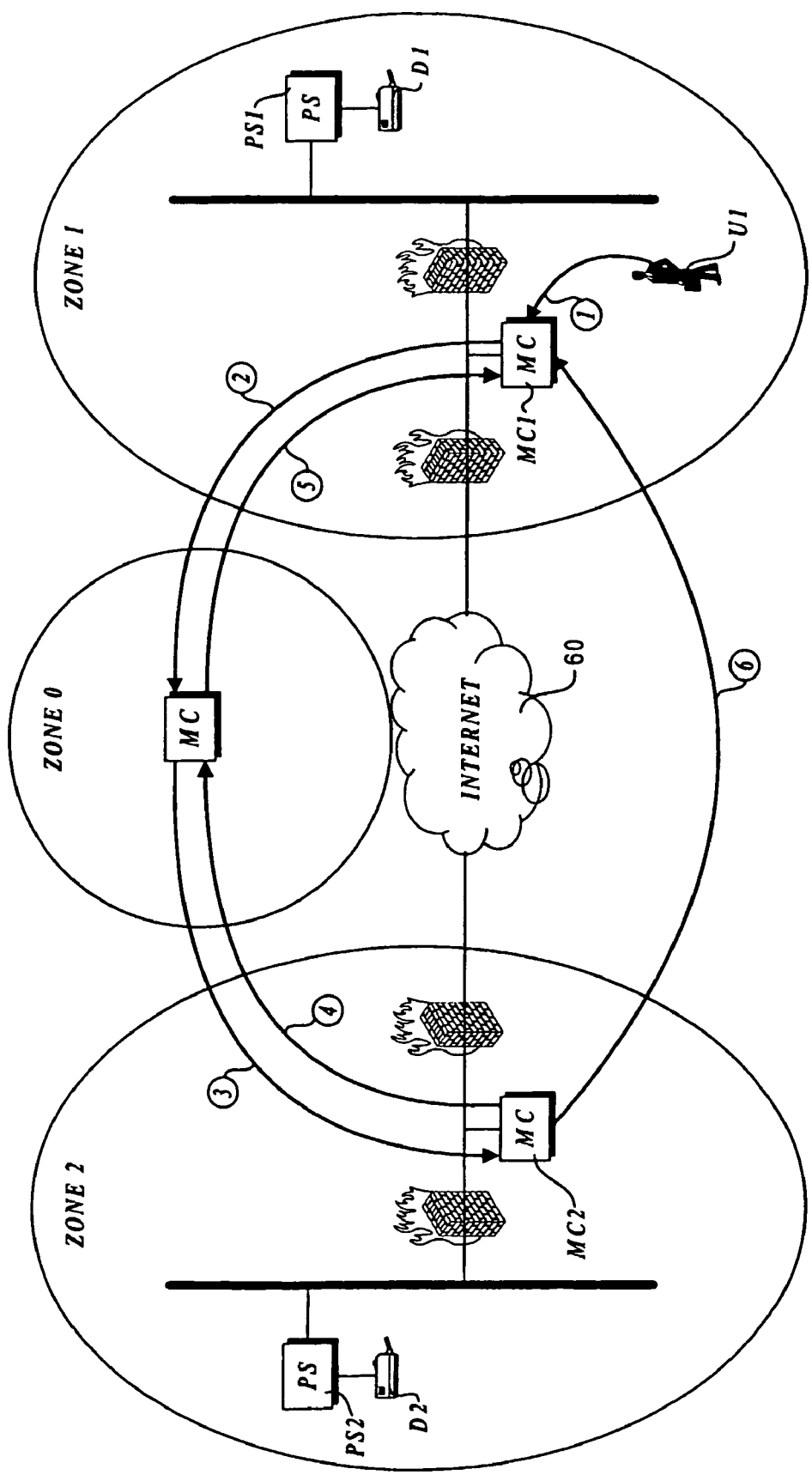
FIG. 8 is a schematic diagram illustrating setup operations used to establish a peer-to-peer Message Center connections.

Two examples of Message Center interactions are illustrated in FIGS. 7 and 8. The example in FIG. 7 demonstrates how a user can ask a public device to connect to his or her home Message Center to prepare for any subsequent request to the public device. The query sequence proceeds as follows:
1. User (U1) submits a public device connection request to the user's home Message Center (MC1). This public device (D2) happens to be a root Message Center connected device.
2. The user's home Message Center (MC1) queries the root Message Center (MC0) for access to the output device.
3. The root Message Center (MC0) locates the path to the specified output device and sends a connection request to its Remote Desktop Client (RDC1).
4. The Remote Desktop Client (RDC1) connects to the user's home MC (MC1), and the connection is therefore established.

The example illustrated in FIG. 8 corresponds to a peer-to-peer Message Center request, with the following sequence:
1. User (U1) submits a public device connection request to the user's home Message Center (MC1). This public device (D2) happens to be registered to another peer Message Center (MC2).
2. User's home Message Center (MC1) queries the root MC (MC0).
3. The root Message Center (MC0) locates the path to the specified device and sends a connection request to the destined Message Center (MC2).
4. The destined Message Center (MC2) honors the referral from the root Message Center (MC0) and sends a response back to the root Message Center (MC0).
5. The root Message Center (MC0) receives an "OK" response and sends the path information to the user's home Message Center (MC1).
6. The destined Message Center (MC2) connects to the user's home MC (MC1) and the connection is therefore established.

In accordance with Root Level Message Center Interaction task 22, the concept of the root level Message Center promotes public output resource sharing. As an advantage, the root level Message Center provides a centralized location for quick public resource lookup. To support such a mechanism, the non-root level Message Center's must interact with the root level Message Center to announce their public resources as well as to query for others' public resources when necessary.

The Remote Desktop Client helps the Message Center to send job requests to an output device. It can also used to configure the overall system in a way that security risks are reduced. For instance, set up an internal RDC for the secure output devices and set up an external RDC for the public output devices. These operations are handled by Remote Desktop Client Management task 24.

The Message Center can connect to multiple Print Services. The idea is to use a set of Print Services, instead of one, to better manage the output devices. The Message Center keeps a very close relation with these Print Services because they are the essential components to generate output images. These interactions are handled by Print Service Management task 26.

In order to support wireless devices such as Bluetooth and 802.11-enabled devices, the system deploys one or more of Wireless Data Access Points. Each WDAP has a set of descriptions and information that require a corresponding Message Center to manage. For instance, the Dynamic Default Output Device of each Wireless Data Access Point is maintained by the WDAP's corresponding MC. These operations are handled by Wireless Data Access Point Management task 28.

The Message Center maintains user profiles for login authentication and some default service settings, as depicted by User Profile Management task 30. For instance, the static default printer and the dynamic default printer for each user are defined in the user's profile. Users can modify their profiles through a standard Web interface or a device interface.

User Interface Management task 32 handles the various user interfaces provided by the system. A "consumer" user interface is used for users to manage their accounts as well as to exercise service requests. In one embodiment, the consumer interface has one segment for home users, and another segment for guest users. The guest user interface provides restricted access to system resources under certain conditions for security reasons. The system also has an administration user interface for debugging and maintenance purposes, and for setting up various system components and parameters.

The Print Service performs the five major tasks shown in FIG. 2. In accordance with Render Output Image task 34, when a Print Service receives a job-rendering request, an internal component, called the Driverless Print (DP) Server gathers the source data and places the data in its DP Server queue. The DP server then calls a DPS Print module to locate the appropriate driver and generates the output image. The DPS Print module puts the output image to an internal output queue and returns control to the DP Server. Further details of these operations are discussed below.

When the DPS Print module returns control to the DP Server, the DP Server calls a Status Monitor module. If the destination device is not connected locally with the Print Service, the Status Monitor writes the output image to a shared repository, in accordance with task 36. It then returns the control to the DP Server. If the destination device is a locally-connected device, the Status Monitor then sends the output image to the device, in accordance with task 38. It then returns the control to DP Server. In accordance with task 40, after the Status Monitor returns the job status to the DP Server, the job status is forwarded back to the Message Center. Local Output Device Management task 42 enables the Print Service to support locally connected output devices. It handles device registration and un-registration to and from the Message Center.

With reference to FIG. 3, the Remote Desktop Client helps to manage devices to connect to Message Centers via Device Registration and Un-registration task 44. To register, it sends a device registration request to establish the association with a Message Center. To un-register, it sends a device un-registration request to remove the association from a Message Center.

The Remote Desktop Client receives job output requests from the Message Center with a reference to the output image file in accordance with task 46. It retrieves the output image file and sends them to the destined output device. When reference is not used, the Message Center transmits the output data to the Remote Desktop Client directly. Upon completion of a job output, the Remote Desktop Client notifies the Message Center to update the job output status and to inform the user in accordance with task 48.

With reference to FIG. 4, each Wireless Data Access Point performs the following major tasks. The Wireless Data Access Point needs to register itself to a Message Center to be linked to the system, which is handled via Component Registration and Un-registration task 50. The purpose of the WDAP registration is to inform the Message Center of the WDAP's Default Output Device (i.e., its closest output device). This helps a Message Center to determine a mobile user's Dynamic Default Printer. To remove the association, task 50 sends a un-registration request to the same Message Center.

In order for a wireless device to access the wired network, there must be an access point to receive the request and to convert the request from wireless packets to landline packets. A WDAP serves is the data access point for the system. Non-cellular device wireless requests enter the system through a Wireless Data Access Point, in accordance with task 52.

When the Wireless Data Access Point receives a connection request, it converts the request to IP packets, and then sends the IP packets to the destination defined by the request, in accordance with task 54. In return, system responses are handled by task 56. When a user moves from a first location proximate to a first WDAP to a second location proximate to a second WDAP, the system returns a different set of device information to the user via the second WDAP. Therefore, one of the key responsibilities of the WDAP is to map out its default output devices and to communicate with the Message Center such that the device information can be generated dynamically, in accordance with Record Output Device Geographical Relations task 58.

As discussed above, the system may use an optional Bluetooth Gateway and Bluetooth device emulation to enable non-Bluetooth devices to work with the system as if they were Bluetooth enabled devices. If desired, the Bluetooth Gateway functions may be built into the Wireless Data Access Point to reduce the hardware cost, as described below.

Theory of Operation

This section describes the common operations of the system as well as the request data flow. Following are some notable features and requirements of the system.

1. Every user is associated with a home Message Center.
2. The system may enforce security between two Message Centers, between Message Centers and Print Services, and between Message Centers and RDC's.
3. A Message Center provides residential user and guest (visitor) user access control of resources.
4. Each WDAP has a configurable default printer associated with it.
5. When accessing the system through a WDAP, if a user specifies in his or her profile to allow dynamic system overwrite, the user's default printer will be changed based on the WDAP that the user is currently connected to.
6. A guest user interfaces may be implemented on a Message Center that supports visitor printing in its zone. Such an interface does not need users to register, nor to create profiles. Hence, it doesn't support static default printer printing. However the system will provide visitors dynamic default printer printing; optionally, the user can specify a destination printer.

The system's modular architecture design and extensible database schema enable sophisticated security schemes to be implemented. First, for user authentication, the subscriber database contains a user profile that is used to validate against user login data that is entered into the system via any supported access device. If the validation fails, a record is logged onto the system for future reference or investigation, and the login request is denied. In addition, the Message Center can implement Public Key Infrastructure support for a higher level of client and server authentication. Second, for data encryption support, each module can implement encryption to protect the content data. The encryption can be enforced between file store to the Message Center, Message Center to Print Service, Print Service to the output repository, and output repository to RDC. Third, under a non-repudiation implementation, the system assigns each subscriber a unique ID. When a user submits a request to the system, the request is immediately tagged with the user's ID and a timestamp. If this is a job submission request, a duplicate copy is generated in the system and is logged and later archived for future reference and billing purposes.

In addition to the aforementioned security implementation, another merit of modular and distributed architecture is that it allows administrators to customize security settings based on particular needs for each organization. For example, a Virtual Private Network (VPN) may be used to link a shared file server to a Message Center. Likewise, a VPN can be implemented between a Message Center and a Remote Desktop Client. The system architecture supports both software and hardware VPN configurations. The overall system can be configured to support a Public Key Infrastructure as well to provide authentication and authorization; to protect data integrity and data privacy; and to satisfy non-repudiation requirements.

Figure 9:
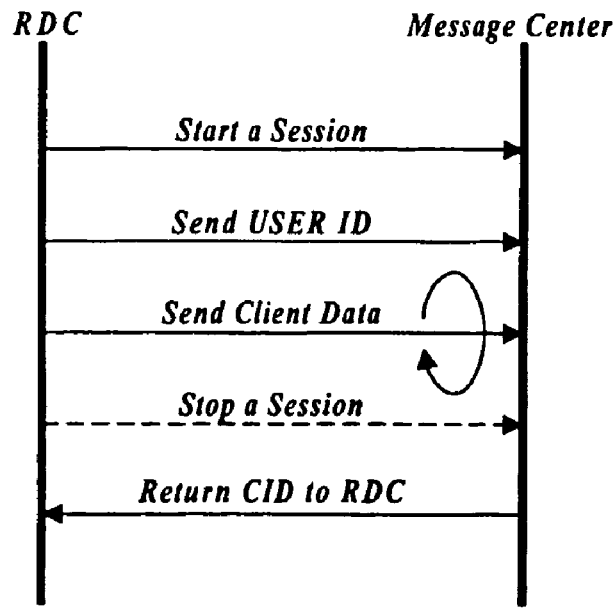
FIG. 9 is a flow diagram illustrating the interactions between an RDC and a Message Center in accordance with an RDC Client Registration Request.

A flow diagram illustrating the interactions between an RDC and a Message Center in accordance with an RDC Client Registration Request is shown in FIG. 9. The RDC sends a session packet to a Message Center to start the client registration process. In one embodiment the session pack includes various parameters to define the client on a Message Center, including a Client Descriptor String, a Client Type, a First Name, a Middle Name, a Last Name, Address1, Address2, City, State, Zipcode, USERID, protected PASSWORD, and EMAIL values. On success, a Client Identifier (CID) is returned to the RDC.

Figure 10:
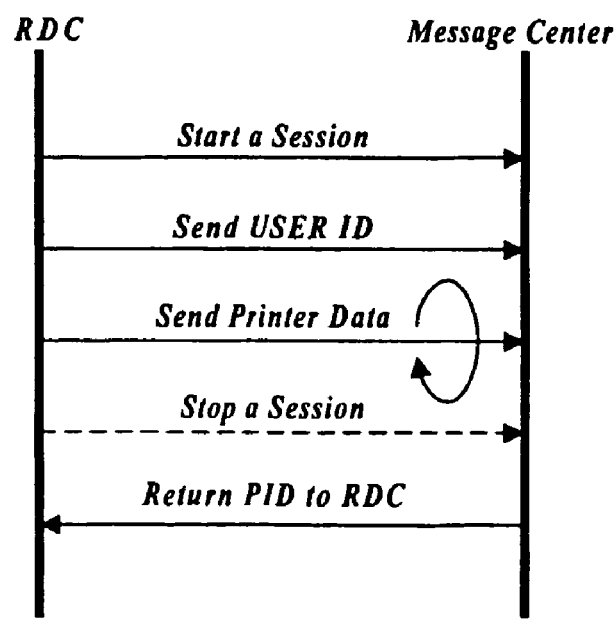
FIG. 10 is a flow diagram corresponding to an RDC Printer Registration Request.

A flow diagram corresponding to an RDC Printer Registration Request is shown in FIG. 10. As in the previous process, the RDC sends a session packet to a Message Center to start the Printer registration process. The packet includes data identifying the client on the Message Center and provides the status of the resource requested to be registered (e.g., output device). On success, a Printer Resource Identifier (PID) is returned to the RDC.

Figure 11:
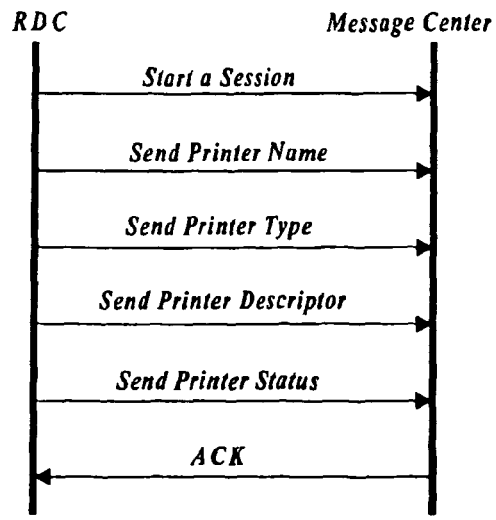
FIG. 11 is a flow diagram corresponding to an RDC submitting a Device Resource Definition to a Message Center.

The Remote Desktop Client needs to register with the MC to access other public resources and to make its resources available. A flow diagram corresponding to an RDC submitting a Device Resource Definition to a Message Center is shown in FIG. 11. The RDC sends the device resource definition packets to the Message Center to have the device resource defined in the Message Center. In general, this information includes device name, device type, device descriptor, and device status.

Figure 12:
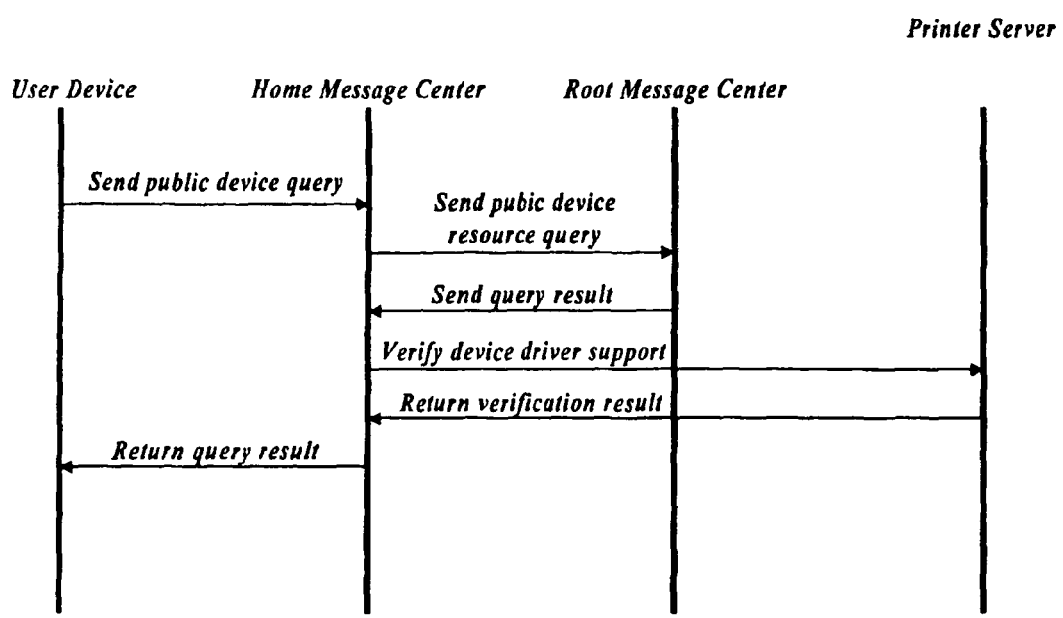
FIG. 12 is a flow diagram of a public device query via a home Message Center to a root Message Center.

When a client wants to access a remote public device, it needs to locate the device first through a public device query. This operation requires the home Message Center to query the root Message Center for a list of available public devices, as illustrated in the flow diagram of FIG. 12. The Message Center then determines if such a public device is supported within the zone. This means the home Message Center needs to locate a registered Print Service that supports such a public device. In response to the query, a list of available public devices is returned to the requestor. If no registered Print Service support for the public device is found, unsupported public device will not be included in the list.

Figure 13:
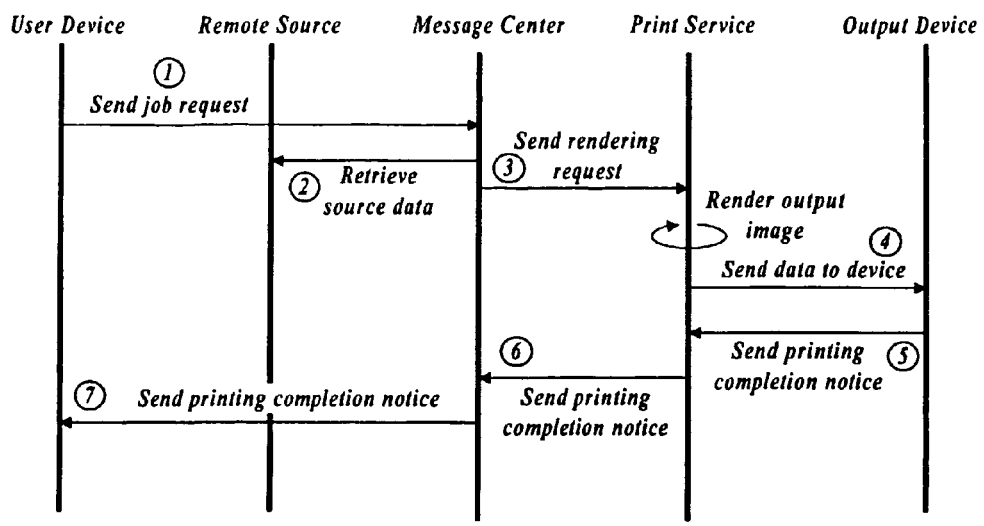
FIG. 13 is a flow diagram corresponding to a Print By Reference (PBR) job request issued by a user in a home domain to an output device directly connected to a Print Service in the home domain.
Figure 14:
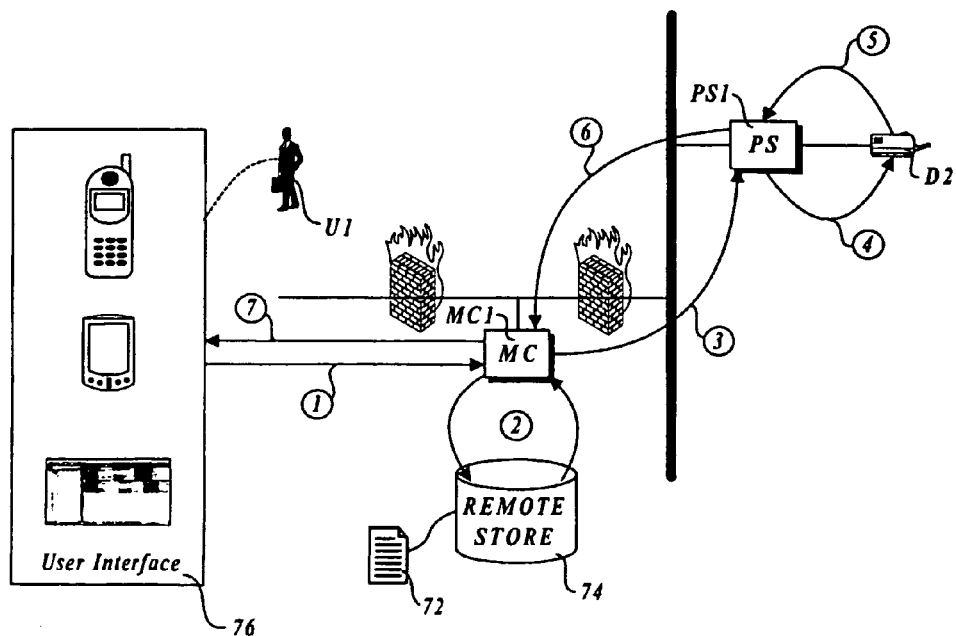
FIG. 14 is a component interaction diagram corresponding to the PBR job request of FIG. 13.

FIGS. 13 and 14 respectfully illustrate a processing flow diagram and component interaction diagram corresponding to a Print By Reference (PBR) job request issued by a user in his or her home domain to an output device that is directly connected to a Print Service in the home domain (e.g., U1→D2 or U1→D3 in FIG. 6). Under a PBR job request, users are enabled to have a document 72 (i.e., the remote source) stored on a remote store 74 printed at a targeted destination printer, wherein the remotely stored document and the destination printer may be selected via a user interface 76.

Figure 15:
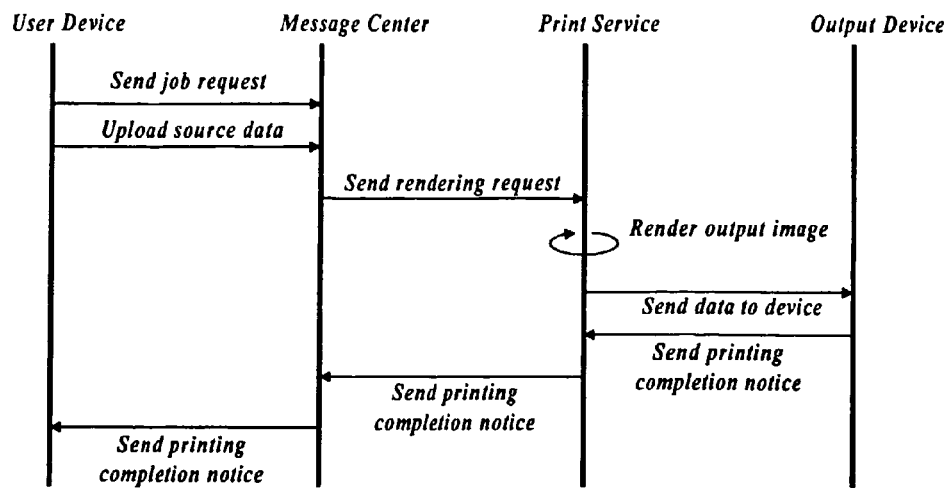
FIG. 15 is a flow diagram corresponding to a non-PBR job request issued by a user in a home domain to an output device directly connected to a Print Service in the home domain.

A processing flow diagram corresponding to a non-PBR job request is shown in FIG. 15. In this instance, all operations are similar to a PBR job request except that the source data is uploaded from the user's device to the Message Center rather than retrieving a remote source.

Figure 17:
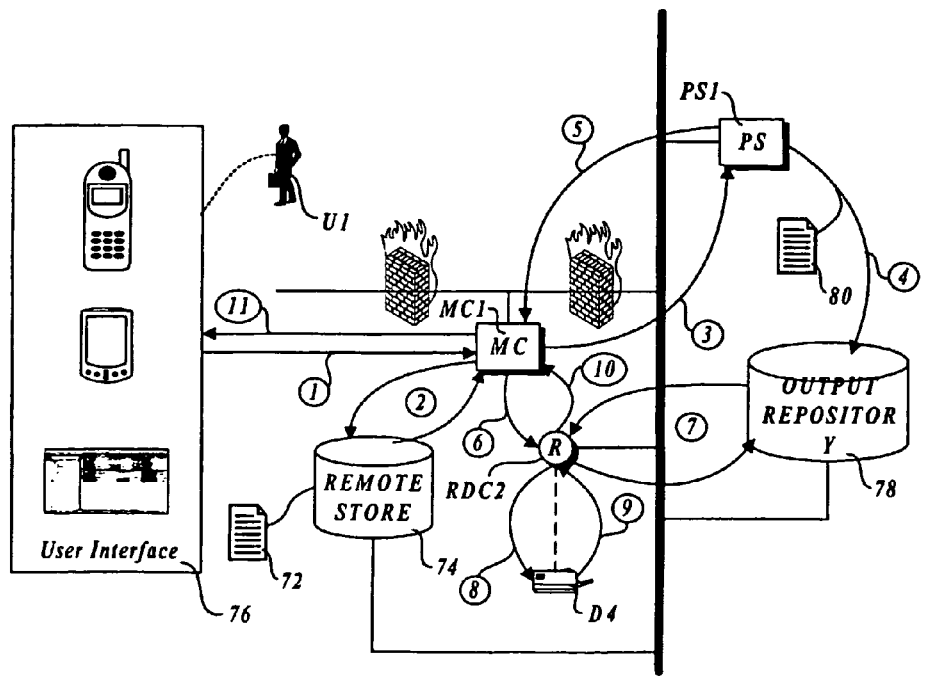
FIG. 17 is a component interaction diagram corresponding to the PBR job request of FIG. 16.
Figure 16:
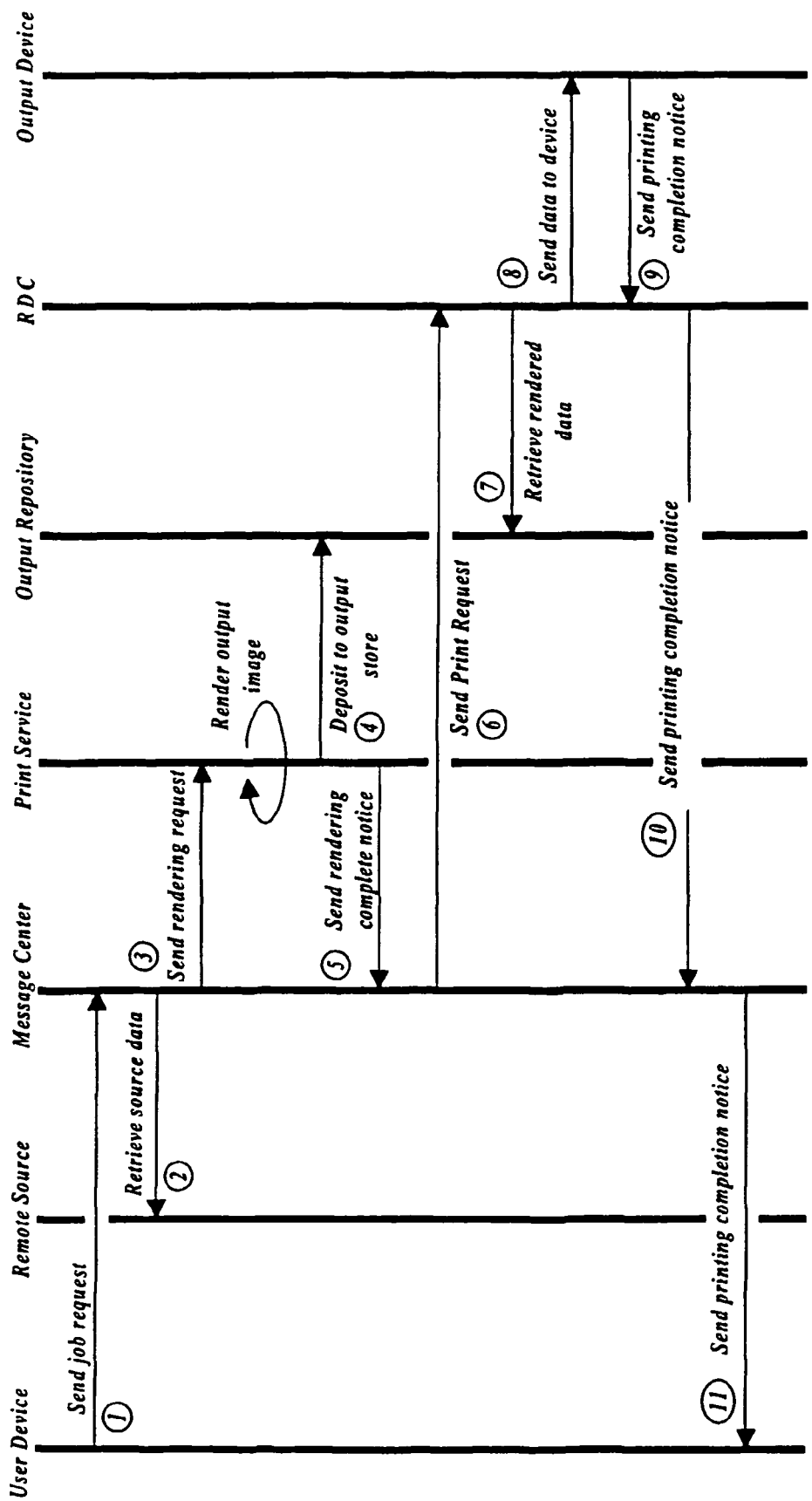
FIG. 16 is a flow diagram corresponding to a PBR job request submitted by a user in a home domain to a local printer that is connected to a Remote Desktop Client in the home domain.

FIGS. 16 and 17 respectfully illustrate a processing flow diagram and component interaction diagram corresponding to a PBR job request submitted by a user in his home domain to a local printer that is connected to a Remote Desktop Client in the home domain (e.g., U1→D4 in FIG. 6). In this case, after the output image is rendered by the Print Service, it is stored in an output repository 78 as an output image file 80. A print request is then sent to the applicable RDC (e.g., RDC2), which then retrieves the output image file from the repository and submits the same to the output device (e.g., D4) to be physically rendered. Upon completion, a print completion notice is sent back to the user via the Message Center and displayed on user interface 76.

Figure 18:
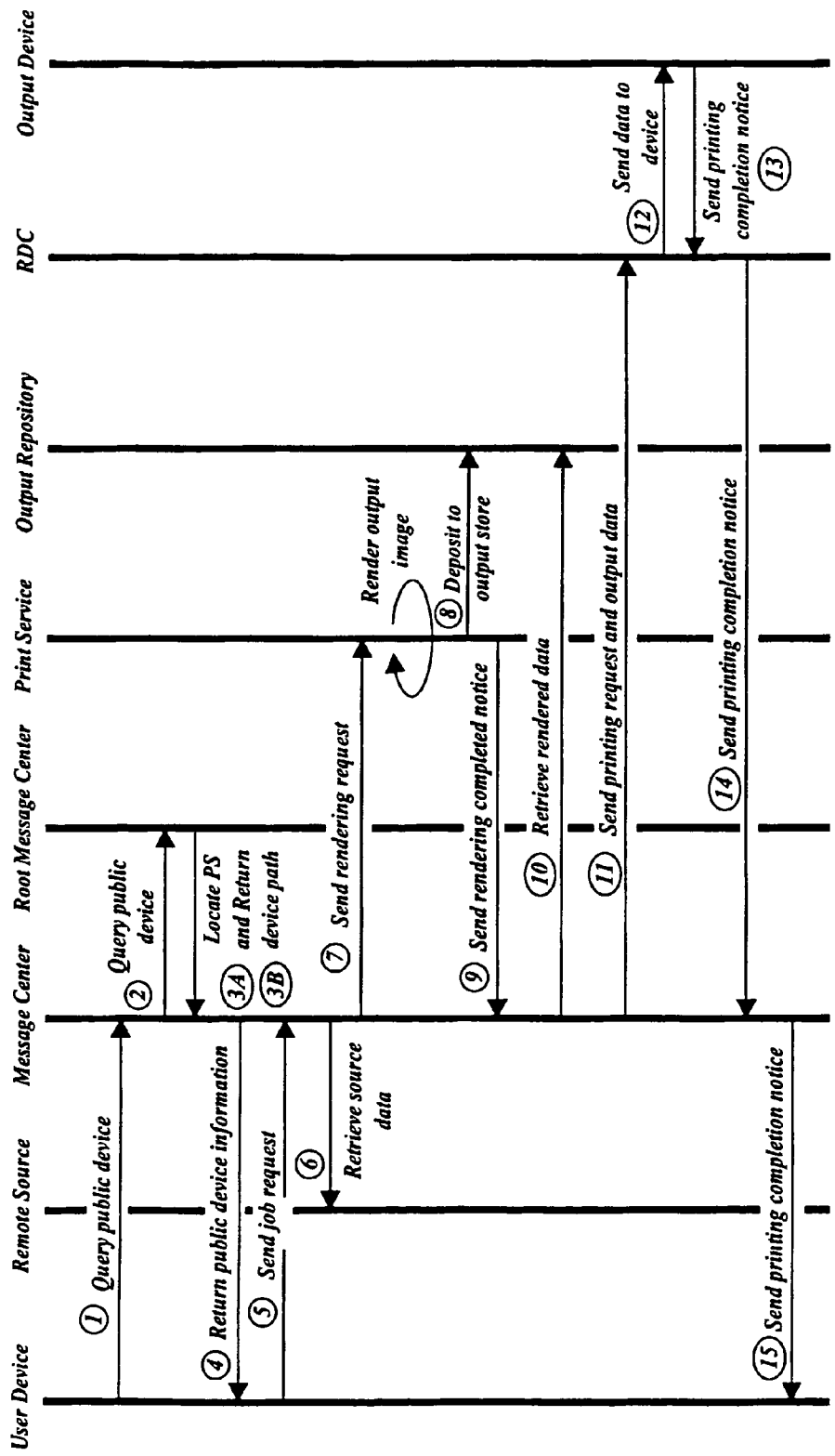
FIG. 18 is a flow diagram corresponding to a PBR job request submitted by a user in a home domain (e.g., Zone 1) to be printed on a root Message Center public output device (D1)
Figure 19:
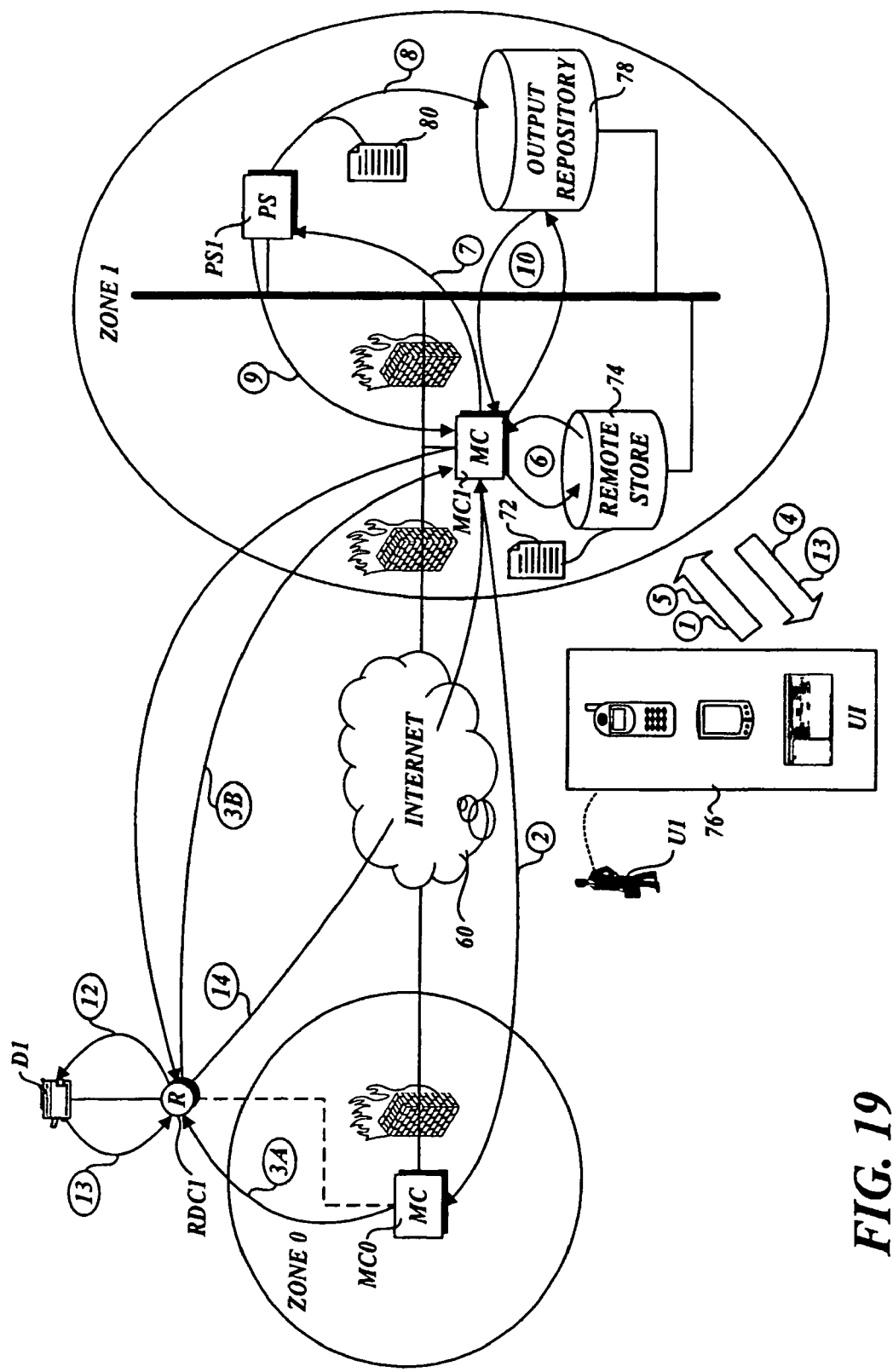
FIG. 19 is a component interaction diagram corresponding to the PBR job request of FIG. 18.

FIGS. 18 and 19 respectfully illustrate a processing flow diagram and component interaction diagram corresponding to a PBR job request submitted by a user in his home domain (e.g., Zone 1) to be printed on a root Message Center public output device (D1). The process begins with use UI activating user interface 76 to perform a public device query. In essence, the query is to return a list of available public devices. Optionally, the user may select a known public device, and the query performs the task of confirming that the device is available for public access. The user submits the query to his or her home Message Center (MC1), and that MC forwards the query to the root MC. The root MC then checks its database to determine all of the available printers for the user (based on user authentication information sent with the query, and the user's previously-configured list of favorite printers). The local print service is identified, along with the output device path to the home Message Center. The public device information is then sent back to the user, and the user is enabled to select a public output device and submit a print job request to the home MC.

Upon receiving the print job request, the home MC retrieves the document to be printed (in this instance, since the document is a local source, it is sent to the MC from the originating device) and sends the document along with a rendering request to the destined Print Service (PS1). The Print Service then renders an output image of the document and saves it in output repository 78. A notification that the rendering has been completed is then sent from the PS back to the home MC, whereupon the home MC retrieves the rendered data (e.g., output image file 80) from the output repository and sends a printing request along with the output image data to the destined Remote Desktop Client (RDC1). The RDC then sends the output image data to the destined output device (D1), whereupon a hard-copy output is rendered and a print completion notice is returned to the RDC. The print completion notice is then forward back to the user via the root and home MCs.

Message Center Access Mechanisms

In general, there are three mechanisms for accessing a home message center. These include a wired network connection, a wireless network connection, and a wireless-web cellular connection. (As used herein, cellular connections include any wireless connection implemented via a cell-based infrastructure, including cellular and PSC networks.) For example, users of wireless-web enabled devices including a cellular phone 100, a PDA 102, and a two-way pager 104 (e.g., Blackberry device) are enabled to access Message Center MCn via a cellular network that includes a plurality of cellular towers 106 and a cellular service provider network operation center 108.

In the United States, wireless Internet (i.e., wireless-web) access is typically provided using the Wireless Application Protocol (WAP), which works with WAP-enabled devices. In Asia, the wireless Internet access is generally provided using the i-mode protocol. In order to access data using the i-mode protocol, the wireless device must be an i-mode device, or provide both i-mode and WAP connectivity. Other lesser-used protocols are also used in various parts of the world. In the embodiment illustrated in FIG. 20, this wireless-web connection is further enabled via a WAP gateway 110 hosted by a WAP gateway server 112. Optionally, other types of wireless-web gateways may be used, such as i-mode gateways, depending on the facilities provided by the wireless service provider.

WAP-enabled devices are able to access data from various Internet sites that provide content that is designed to be used by such devices. This data is generally delivered as Wireless Markup Language (WML) data to the device, as described in further detail below. WML comprises a special markup language that is designed to facilitate limited browsing capabilities in consideration of the low-resolution displays and limited navigation capabilities available on today's handheld devices, such as wireless phones, PDAs, and pocket PCs. WML includes HDML (Handheld Device Markup Language), and can trace its roots to XML (eXtensible Markup Language). It further comprises a meta-language that supports user-defined extensions.

WAP-enabled devices are provided access to various web sites that provide wireless Internet content via a WAP gateway (such as WAP gateway 110), which is implemented through the use of one or more WAP gateway servers 112. Generally, respective WAP gateways are operated by the various service providers in areas that support wireless Internet access, although it is possible for service providers to share WAP gateway facilities. In short, a WAP gateway server runs various software modules and/or applications that provide functions for facilitating interaction with WAP-enabled devices, including converting HTML (HyperText Markup Language) data retrieved via HTTP (Hypertext Transport Protocol) from wireless-web sites (that don't directly encode their wireless-web content in WML) into WML. These functions include a WAP encoder, script compiler and protocol adapters to convert the HTML data into WML.

To create wireless Internet content, a web site generally must create special text-only or low graphics versions of all or a portion of the pages on its site. At present, only a small fraction of Internet web sites provide wireless Internet content, although the number of these sites is expected to grow exponentially as more and more people acquire WAP-enabled devices. A primary reason for this text-only or low graphics content is that WAP-enabled devices generally provide very small low-resolution screens, and typical wireless data transfer rates are much lower than the data-transfer rates available via land-based networks. It is noted that although some of the present wireless Internet content comprises HTML that must be converted into WML at the WAP Gateway, there are many web sites that provide data that is already encoded in WML directly to the WAP Gateways.

A typical WAP session works as follows, with reference to FIG. 20. A user operating a WAP-enabled device, such as PDA 102, opens a "mini-browser" (the SWAP client for the session), which then sends out a radio signal 114 via PDA 102's wireless modem searching for WAP service. In response, a connection is made with a service provider the user has a wireless Internet access subscription service with, via a nearby cellular tower 106. The user then selects a web site the user would like to view by entering the URL for the web site through a UI provided by the mini-browser (as depicted by a mini-browser UI 107). A request to access the site is then sent from PDA 102 to WAP Gateway 110. A WAP Gateway server 112 retrieves the information corresponding to the URL, in this instance as HTML data, via HTTP from the web site, and encodes the HTML data into WML (Wireless Markup Language). As discussed above, for some Internet sites the data may already be in WML format, so no HTML-to-WML encoding will be required.

In accordance with one embodiment of the present invention, each Message Center MCn will host one or more respective URL's via a web server 113, as described in further detail below. URL data hosted by web server 113, as depicted by HTML data 114 and WML data 116, is passed via a communications network, such as Internet 60 or a private network, from the Message Center to the WAP gateway. The WML data is then sent from WAP Gateway server 112 back to PDA 102 via cellular tower 106. In a manner similar to conventional browsing, the user is enabled to browse various pages on the site by activating appropriate UI components presented to the user via the mini-browser, whereby a similar process to that discussed above is performed in response to the user interactions to present content corresponding to that selected by the user.

In addition to wireless-web access, Message Centers may be accessed via direct land-line connections, or via communications links that include a combination of land-line networks and wireless networks (e.g., 802.11b), or land-line networks linked to the user device via a Bluetooth wireless link. For example, users of personal computer (PC) 118 and laptop 120 may access Message Center MCn via a direct network connection to the Message Center (e.g., a LAN connection), or via a WAN connection such as the Internet. Both of these network connections are depicted by computer network 122. In one embodiment, the users are enabled to access services provided by the system via a browser-based user interface 124, as described in further detail below, through a set of web pages 126.

In general, the user-interface is similar for links that further include a 802.11 (also known as a WiFi) connection. For example, in a typical 802.11 implementation, a WiFi-enabled user device, such as a PDA 128 in FIG. 20, is connected to a wired network (e.g., network 122) via a WDAP 130. The WDAP controls all communication from the WiFi-enabled device, while making the device appear to the network to have a normal client connection. Thus, from an operational standpoint, a wired and WiFi client appear the same to the Message Center.

The system also enables Bluetooth-connected clients to print to selected output devices, but using a different mechanism. Under this mechanism, a Bluetooth emulator is implemented to make a Bluetooth-enabled originating device, such as a cellular phone 132, think it is communicating directly with a Bluetooth device, requiring no changes to the originating device's built-in Bluetooth user interface 133. For example, suppose the user desires to print to a non-Bluetooth enabled Print/Fax device. In this case a Bluetooth printer/fax Emulator is implemented that provides a front-end agent to communicate with a nearby Wireless Data Access Point. In one embodiment, the Bluetooth device emulator may be integrated into a WDAP, as depicted by a WDAP+Bluetooth Device Emulator 134. Optionally, the Bluetooth device emulator may be a separate device linked in communication to network 122. In general, the Bluetooth device emulator generates the needed Bluetooth device information (e.g., printing or fax profile) using corresponding output device information retrieved from the Message Center; the profile is built on the fly using the resource information retrieved from the Message Center. Accordingly, in one embodiment the emulator also has a backend communication channel employed to interface (via an integrated or nearby WDAP) with the Message Center. When the Bluetooth-enabled device connects to the system at a different access point the corresponding emulator will respond with the profile information specific to that access point.

Through similar Bluetooth device emulation, such as defined by the Bluetooth Basic Printing or Fax Profile Interoperability Specification, the system enables non-Bluetooth devices to operate as though they were Bluetooth-enabled devices, thereby provides a simple and cost effective way for corporations to manage their non-wireless technology enabled devices in a wireless computing environment. These operations are transparent to both the user and the destined device. Furthermore, the enterprise does not need to modify, replace, or even upgrade the legacy devices at all because these resources are now managed by the Message Center.

The print-by-reference capabilities of the output management system may also be extended to Bluetooth-enabled originating devices. For example, in one embodiment the WML content to render the WAP interfaces described below may be provided to Bluetooth-enabled devices that include a WAP mini-browser 107A designed for WAP over Bluetooth service. It is envisioned that such devices will become common in the not-to-distant future. Under this configuration, the Bluetooth-enabled device user is enabled to interact with the system in substantially the same manner as wireless-web users by serving the same WML content to the Bluetooth-enabled device via a WDAP+Bluetooth device emulator.

Default Device Discovery (WiFi)

The system introduces the concept of static and dynamic default settings to better accommodate the mobile computing protocol. For instance, the Message Center implements default device-setting options in the users' profiles. Using printers as an example, there are two types of default printers for each user; a static default printer and a dynamic default printer. The former is chosen when a user accesses the system through a wired connection (e.g., PC 118) whereas the latter is selected when a user accesses the system through a wireless connection (e.g., Bluetooth, 802.11, etc.) Chances are a user is less likely to send output to his or her office printer when using a mobile station at the user's client site. Using an access method to automatically switch the default setting is rather practical and handy. However, for flexibility considerations, a user has the option to disable the dynamic default printer overwrite feature through profile configuration.

Figure 21:
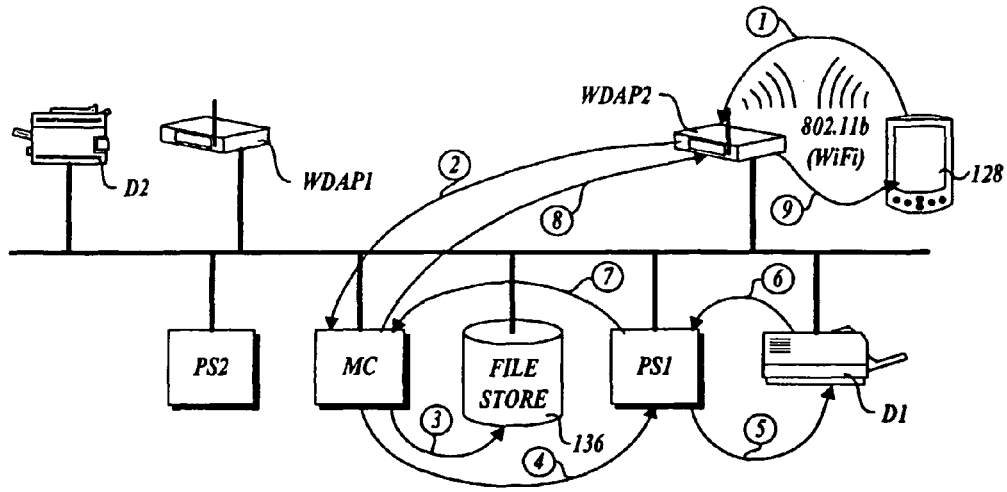
FIG. 21 is a schematic diagram illustrating the operations used to determine a dynamic default printer when a user submits a job request through a WDAP.

FIG. 21 shows a diagram detailing the operations used to determine a dynamic default printer when a user submits a job through a WDAP. First, a user of wireless device 128 enters the system through a wireless connection to Wireless Data Access Point WDAP2. In the illustrated example, it is assumed the user submits a PBR job request. In response, WDAP2 relays the PBR job request to the Message Center. The Message Center retrieves the source data from a File Store 136 corresponding to the PBR job request. The Message Center discovers that the request came from WDAP2, checks its device database, and finds out that the dynamic default printer associated with WDAP2 is output device D1 associated with Print Service PS1. Therefore it sends a rendering request to PS1. The PS1 renders the job request and then sends output image data to output device D1. Output device D1 completes the job output and informs PS1 of task completion. PS1 in turns informs the Message Center. The Message Center sends a response to the WDAP2 to inform the user that the job request has been completed successfully. WDAP2 then relays the response to the user's device.

Default Device Discovery (Bluetooth)

Figure 22A:
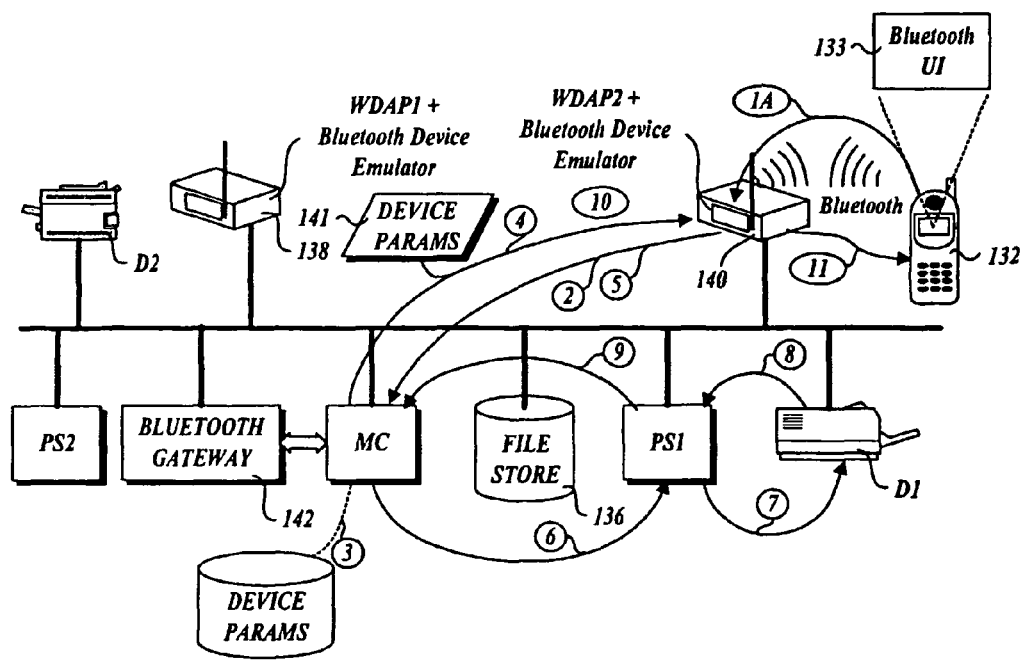
FIG. 22A illustrates the case when a basic Bluetooth UI is provided.

In the following cases depicted in FIGS. 22A and 22B, the network configuration is substantially the same, except that WDAP1 and WDAP2 now include Bluetooth Device Emulators, as depicted by WDAP+Bluetooth Device Emulator devices 138 and 140, respectively. In both cases the process begins with a user of a Bluetooth-enabled originating device 132 seeking initialize communication with another Bluetooth-enabled device. In the examples, the originating device's Bluetooth signal is received by WDAP2+Bluetooth Device Emulator device 140, which establishes a communication link with the Bluetooth-enabled originating device.

At this point there are two general types of interfaces that may be used to enable system interaction with the Bluetooth-enabled device user: basic Bluetooth UI's (e.g., Bluetooth UI 133) and advanced Bluetooth UI's (e.g., WAP over Bluetooth mini-browser UI 107A). Under the basic Bluetooth UI, the emulator operates as a simulated Bluetooth-enabled output device, or a plurality of such output devices. Under the advanced Bluetooth UI, the emulator serves as a conduit to enable WAP content to be served to the Bluetooth-enabled device via WAP over Bluetooth.

Suppose the basic Bluetooth UI is provided. This case is illustrated in FIG. 22A. In this instance, after establishing a Bluetooth link, the user will search for Bluetooth-enabled output devices (or the user will use an output device search to initialize the Bluetooth link). In response, the emulator will connect to a root Message Center (either directly or indirectly) and retrieve information pertaining to output devices that are proximate to the WDAP facilitating the interaction. Since this type of information is stored in the Message Center database, the MC can return Bluetooth emulation parameters 141 back to the emulator corresponding to the various output devices that are available via the WDAP. In an optional embodiment, the emulator may request the user be authenticated (or otherwise identify the user, e.g., through a unique device identifier), and provide a list of output devices specific to the user. The emulator then will emulate the available output devices such that the Bluetooth-enabled originating device "thinks" it is actually communicating directly with one or more corresponding Bluetooth-enabled output devices. For example, if the available output devices include two types of laser printers and a text printer the emulator will provide Bluetooth device emulation for all three printers. If there is only a single device available, then this device becomes the default output device. The user will then select an output device via the Bluetooth UI, and upload the source data to the emulator as if it was uploaded the source data directly to a Bluetooth-enabled output device. The emulator will then forward the source data to the Message Center, which will invoke an appropriate Print Service to generate the output image data, which are then submitted to the selected output device for rendering.

Figure 22B:
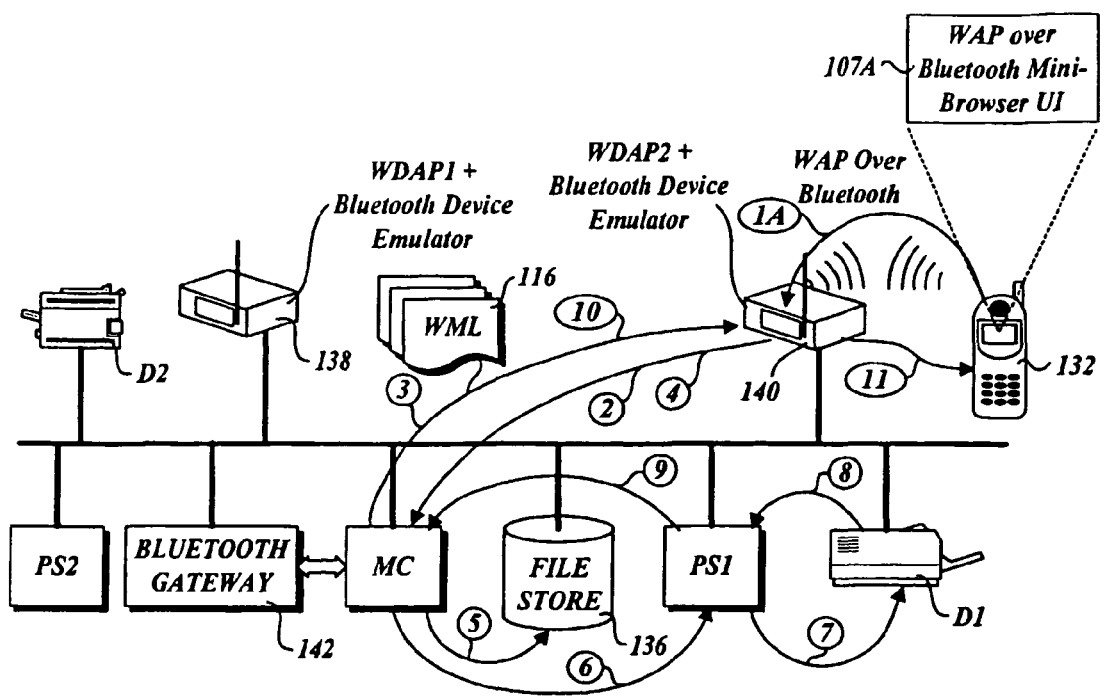
FIG. 22B illustrates the case where the user is provided access to the system via a WAP over Bluetooth service hosted by the Message Center.

In accordance with the example depicted in FIG. 22B, the user is provided access to the system via a WAP over Bluetooth service hosted by the Message Center. Initially, a Bluetooth connection between the Bluetooth-enabled originating device and the emulator is established in the manner described above. The emulator will then contact the Message Center to begin serving WML content to render a user interface via WAP over Bluetooth mini-browser 107A that enables the user to select the source data from file store 136 and to select the output device (D1). All of the remaining operations proceed in substantially the same manner as described above for the PBR example of FIG. 21.

In one embodiment, the system includes an optional configuration that employs a Bluetooth Gateway 142. The gateway helps the Message Center to communicate with the Bluetooth Device Emulator. The Bluetooth Gateway also keeps track of the mapping between the devices and the Wireless Data Access Point, and synchronizes the map with the Message Center. Such mappings are calculated with the input either from the device emulator or by sniffing off the network.

System Connection Topology

Figure 23:
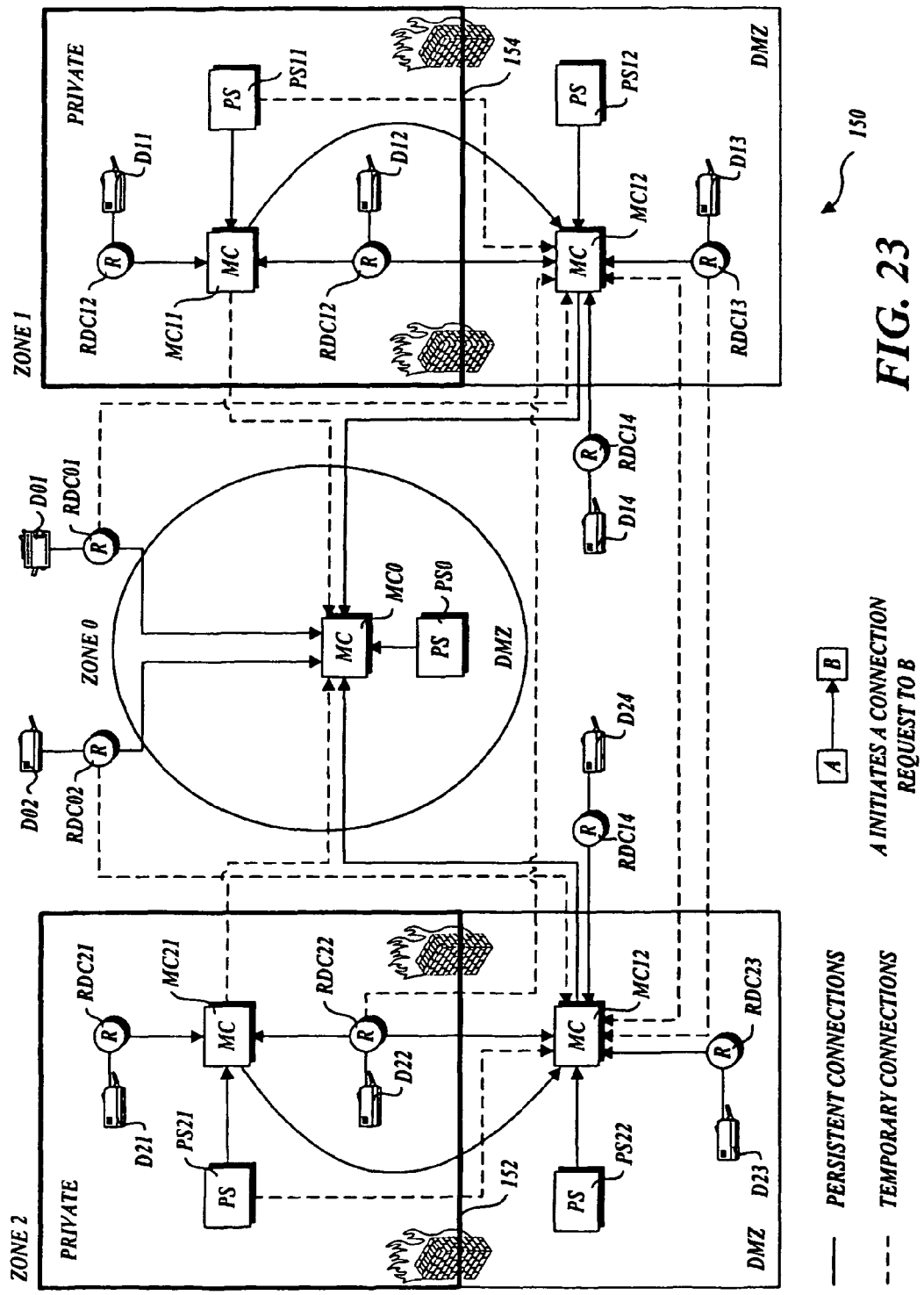
FIG. 23 is a generic system connection topology diagram illustrative of various connection paths and connection types that may be encountered during a typical implementation of an output management system.

A generic system connection topology diagram 150 illustrative of various connection paths and connection types that may be encountered during a typical implementation of an output management system is shown in FIG. 23. A solid line indicates a persistent connection whereas a dashed line indicates a temporary connection. For component communications, the first rule is that PS's and RDC's always initiate a connection to a Message Center. In accordance with a second rule corresponding to peer-to-peer Message Center communications, the connection is always initiated from a more secured network to a less secured network (e.g., from a Private network to DMZ, Zone1 DMZ to Zone0 DMZ, etc.). When both rules are applicable, the first rule takes the precedence.

In diagram 150, a Zone0 disposed in the middle of the diagram includes a root Message Center MC0 that comprises a centralized repository for all MC's to announce and share their public resources (e.g., output devices). Hence the components in Zone0 will preferably be located in a DMZ to accept incoming connection requests with proper security protections. Zone1 and Zone2, which are disposed on opposing sides of Zone 0, comprise two independent networks each having a fully-secured subnet (i.e., private network portion) and a DMZ portion. The MC's in the Zone 1 and 2's DMZ's (MC12 and MC22) manage public and sharable resources, and are therefore referred to as "Public" MC's. The MC's in the Private subnets behind the internal corporate firewalls 152 and 154 (MC21 and MC 11, respectively) manage private resources, and are therefore referred to as the "Private" MC's.

Following is a Component Deployment Location Map table that indicates where these components may reside in accordance with one embodiment of the invention. A "Public Network" refers to a network without firewall protection that is directly connected to the Internet. It usually accepts all incoming connection requests. A "DMZ" refers to a private network with limited protection. It usually accepts incoming connection requests if the requests are patched through to some well-known ports. A "Private Network" refers to a network with strong firewall protections. It usually blocks most, if not all, incoming connection requests. Locating in a private network insinuates that the incoming connection request is blocked; therefore, resource sharing is facilitated through use of a proxy (e.g., a DMZ MC or a root MC) to bridge the job request. MC's and PS's preferably should not be deployed in a public network for apparent security reasons. A root Message Center (e.g., MC0) cannot be deployed in a private network, since it needs to provide at least limited public access to enable public MC's to register. RDC's may be located in a public network to enable broader range of resource sharing; however is not recommended.

TABLE 1

Component Deployment Location Map

|  | Public Network | DMZ | Private Network |
|---|---|---|---|
| MC0 | Not recommended | ✓ | Not allowed |
| MC1 | Not recommended | ✓ | ✓ |
| PS | Not recommended | ✓ | ✓ |
| RDC | Not recommended | ✓ | ✓ |

Following is a Component Deployment Location Classification Map table that explains the component deployment locations in diagram 150.

TABLE 2

Component Deployment Location Classification Map

|  | Public Network | DMZ | Private Network |
|---|---|---|---|
| MC | Not recommended | MC0, MC12, MC22 | MC11, MC21 |
| PS | Not recommended | PS0, PS12, PS22 | PS11, PS21 |
| RDC | RDC01, RDC02, RDC14, RDC24 | RDC13, RDC23 | RDC11, RDC12, RDC21, RDC22 |
| D | D01, D02, D14, D24 | D13, D23 | D11, D12, D21, D22 |

A set of MC Network Connection Maps that describes how components communicate with each other, including the connection types, the connection initiators, and the data transfer types, are shown below in Tables 3-6. For performance reasons, a persistent connection preferably should only be used for control messages exchange (e.g., resource query, resource registration) whereas a temporary connection may used for both control message exchange and non-control message exchange, namely, source file data transfers and the rendered output image data transfers. When a persistent connection is allowed, temporary connection support is implied. The Data Transfer types can be either "By Buffer" or "By Reference". When a "By Reference" transfer is allowed, the "By Buffer" transfer support is implied. Transfer by reference may not be a viable option in the event that a sender's file store is not visible to a recipient. In such cases, an appropriate MC will channel the data to the destination resource.

The following table corresponds to a MC0 Intra-Zone Network Connection Map. This table describes how a root MC communicates with other components within the same Zone. Since this is in the Zone0, "Private" MC's and PS's are not allowed.

TABLE 3

MC0 Intra-Zone Network Connection Map

|  | Connection Type | Initiator | Data Transfer |
|---|---|---|---|
| MC0-MCn (DMZ) | Persistent | MC (DMZ) | Buffer, Reference |
| MC0-MCn (Private) | N/A | | |
| MC0-PSn (DMZ) | Persistent | PS | Buffer, Reference |
| MC0-PSn (Private) | N/A | | |
| MC0-RDCn (Public)* | Persistent | RDC (Public) | Buffer only* |
| MC0-RDCn (DMZ) | Persistent | RDC (DMZ) | Buffer, Reference |
| MC0-RDCn (Private) | N/A | | |

*Viewing a DMZ file store from a public RDC is not allowed.

Following is an MC0 Inter-Zone Network Connection Map that is similar to TABLE 3 above, except it is for inter-zone communications. This table describes how the root MC communicates with other components in a different Zone.

TABLE 4

MC0 Inter-Zone Network Connection Map

|  | Connection Type | Initiator | Data Transfer |
|---|---|---|---|
| MC0-MCn (DMZ) * | Persistent | MC (DMZ) | Buffer only |
| MC0-MCn (Private) ** | Temporary | MC (Private) | Buffer only |
| MC0-PSn (DMZ) | Not allowed | | |
| MC0-PSn (Private) | Not allowed | | |
| MC0-RDCn (Public) *** | Persistent | RDC (Public) | Buffer only |
| MC0-RDCn (DMZ) | Temporary | RDC (DMZ) | Buffer only |
| MC0-RDCn (Private) | Temporary | RDC (Private) | Buffer only |

* A DMZ MC needs to maintain a persistent connection to MC to enable resource sharing and to support public device query.
** A Private MC may establish a temporary connection to MC0 for device query purpose or to bridge a data transfer to a public RDC.
*** Viewing a DMZ file store from a public RDC is not allowed.

Following is a non-Zone0 MC Intra-Zone Network Connection Map. This table describes how a non-Zone0 Message Center communicates with other components within the same Zone.

TABLE 5

Non-MC0 Intra-Zone Network Connection Map

|  | Connection Type | Initiator | Data Transfer |
|---|---|---|---|
| MCx (DMZ)-MCy (DMZ) * | Not allowed | | |
| MCx (DMZ)-MCy (Private) ** | Persistent | MC (Private) | Buffer only |
| MC (DMZ)-PS (DMZ) | Persistent | PS (DMZ) | Buffer, Reference |
| MC (DMZ)-PS (Private) | Temporary | PS (Private) | Buffer only |
| MC (DMZ)-RDC (Public) | Persistent | RDC (Public) | Buffer only |
| MC (DMZ)-RDC (DMZ) | Persistent | RDC (DMZ) | Buffer, Reference |
| MC (DMZ)-RDC (Private) | Persistent | RDC (Private) | Buffer, Reference |
| MCx (Private)-MCy (DMZ) *** | Persistent | MC (Private) | Buffer only |
| MCx (Private)-MCy (Private) * | Not allowed | | |
| MC (Private)-PS (DMZ) | Not allowed | | |
| MC (Private)-PS (Private) | Persistent | PS (Private) | Buffer, Reference |
| MC (Private)-RDC (Public) | Not allowed | | |
| MC (Private)-RDC (DMZ) | Not allowed | | |
| MC (Private)-RDC (Private) | Persistent | RDC (DMZ) | Buffer, Reference |

* Uncommon and unnecessary configuration.
** MCx helps MCy channel output to a RDC that is not registered to MCy.
*** MCy helps MCx channel output to a RDC that is not registered to MCx.

Following is a non-Zone0 MC Inter-Zone Network Connection Map that is similar to the above table except it is for inter-zone communications. This table describes how a non-Zone0 MC communicates with other components in a different Zone.

TABLE 6

Non MC0 Inter-Zone Network Connection Map

|  | Connection Type | Initiator | Data Transfer |
|---|---|---|---|
| MCx (DMZ)-MCy (DMZ) * | Temporary | Whoever initiates the device query | N/A |
| MCx (DMZ)-MCy (Private) ** | Temporary | MCy (Private) | N/A |
| MC (DMZ)-PS (DMZ) | Not allowed | | |
| MC (DMZ)-PS (Private) | Not allowed | | |
| MC (DMZ)-RDC (Public) | Temporary | RDC (Public) | Buffer only |
| MC (DMZ)-RDC (DMZ) | Temporary | RDC (DMZ) | Buffer only |
| MC (DMZ)-RDC (Private) | Temporary | RDC (Private) | Buffer only |
| MCx (Private)-MCy (DMZ) *** | Temporary | MCx (Private) | N/A |
| MCx (Private)-MCy (Private) | Not allowed | | |
| MC (Private)-PS (DMZ) | Not allowed | | |
| MC (Private)-PS (Private) | Not allowed | | |
| MC (Private)-RDC (Public) | Not allowed | | |
| MC (Private)-RDC (DMZ) | Not allowed | | |
| MC (Private)-RDC (Private) | Not allowed | | |

* For device query purpose only.
** For device query purpose and for MCy to channel output to a public RDC associated with MCx.
*** For device query purpose and for MCx to channel output to a public RDC associated with MCy.

In general, the components in a system will communicate with each other using a network message protocol. For example, there is an RDC network message protocol designed for communication between a Remote Desktop Client and the Message Center servers. In one embodiment, connections between and RDC and an MC server are initiated by a socket connect from the RDC to port 5190 on the MC server. These socket connections are persistent for the life of the session. A session is defined as a connected dialog between client and server. The majority of sessions are basically quiescent between client and server unless there is a print job destined for a remote printer associated with the client. During session initiation, the client provides a number of session parameters to the client in order to establish a connected session.

Data Transfer Type Support

This section describes briefly how job request data are processed and transferred to each component. The basic job request process flow can be summarized into the following operations: 1) Upload the input file data to an Message Center; 2) MC locates a proper Print Service for output image rendering based on the identified destination output device; 3) MC delivers the input data to PS or have PS access the file by reference; 4) PS renders the output image; 5) PS transfers the output image to MC or deposits the output image into a common repository; 6) MC sends the output data to RDC or have the RDC access the file by a reference to the common repository. Depending upon the actual job request origin and the destination, a staging MC may be required to bridge the data transmission. The transfer types are classified into "By Reference" and "By Buffer". In general, transfer by reference appears to be more efficient than transfer by buffer (due to reduced file spooling); however it may not be feasible when different components residing on different parts of the network cannot view each other's reference due to security restricts (e.g., firewalls). In such cases, transfer by buffer is the only option for data transmission. The following table defines the data transfer types.

TABLE 7

Component Data Transfer Type Definition

| | Reference Transfer Name | Buffer Transfer Name |
|---|---|---|
| User File Input (Upload) | Upload By Reference (UBR) | Upload By Buffer (UBB) |
| MC-PS (Deliver) | Deliver By Reference (DBR) | Deliver By Buffer (DBB) |
| PS-MC (Transfer) | Transfer By Reference (TBR) | Transfer By Buffer (TBB) |
| MC-RDC (Print) | Print By Reference (PBR) | Print By Reference (PBR) |
| MC-MC (Shuffle) * | Shuffle By Reference (SBR) | Shuffle By Buffer (SBB) |

* Only applicable to Intra-Zone

Intra-Zone MC (DMZ)—RDC (Public). The purpose of this type of communication is to send a print request from a DMZ MC to a device attached to the RDC in a public network registered to the same MC in the same DMZ within the same zone. For example, a transfer from MC12→RDC14.

Figure 24:
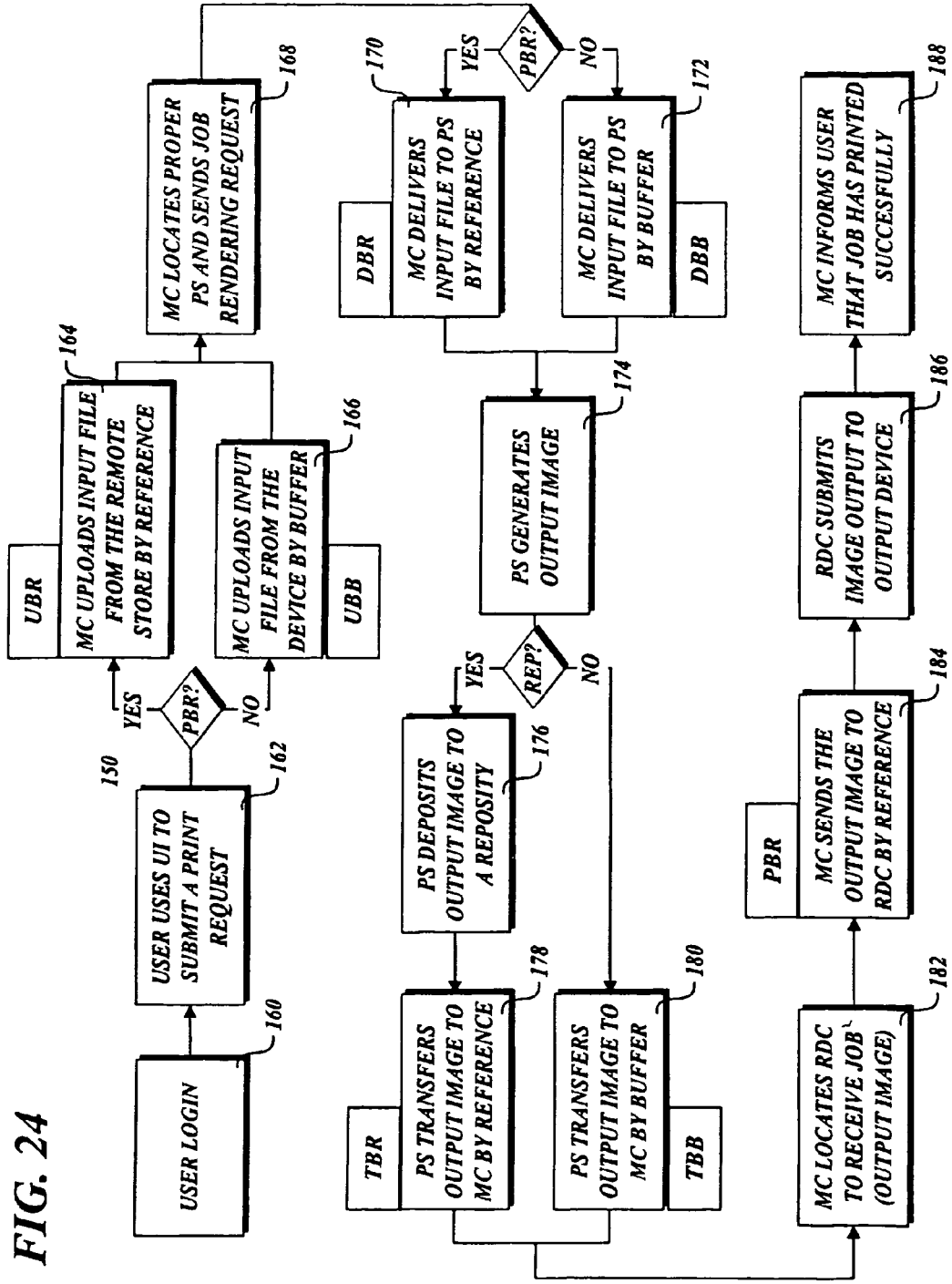
FIG. 24 is a flowchart illustrating the operations performed during processing of a job request that is handled via an Intra-Zone Message Center and Public RDC.

With reference to the flowchart of FIG. 24, the process begins in a block 160 in which a user connects to the user's home Message Center and a login operation is performed. In a block 162 the user submits a print request via a user interface corresponding to the originating device the user connects to the system with. If the print request corresponds to a print by reference (PBR), the MC uploads the source data (e.g., a "input" file in which the source data are contained) from the remote store designated via the UI and identified by the PBR request in a block 164. If the print request corresponds to non-PBR request (i.e., the source data to be printed resides on the originating device), the MC uploads the source data from the device by buffer in a block 166.

Next, the MC locates an appropriate Print Service and sends it a job-rendering request in a block 168. In general, an appropriate Print Service will correspond to a PS that is within the same Zone as the destination output device and provides print service support for the particular characteristics of the destination output device and the source data (e.g., has driver support for the output device and has an application it can run to generate image output data corresponding to the source data). If the request is a PBR, the MC delivers a reference identifying the network storage location of the input file to the Print Service in a block 170. If the request is not a PBR, the MC delivers the input file to the PS by buffer in a block 172. Upon retrieving or receiving the input file, the Print Service generates output image data (an output image file) in a block 174.

If a repository is to be used, the PS deposits the output image file to a repository in a block 176 and the PS transfers the output image to the MC by reference in a block 178. In this case, the output image data are stored in a file in the repository and the transfer by reference means that the PS provides a path, file name an network location of the output image file to the MC. If a repository is not used, the PS transfers the output image to the MC by buffer in a block 180.

At this point, in a block 182, the MC locates an appropriate remote desktop client to receive the output image. This will generally be through a database lookup based on the destination output device, to identify any RDC's that may be used to submit output images to the destination output device. The MC then sends the output image to the identified RDC by reference in a block 184. Upon receiving the reference, the RDC retrieves the output image and submits it to the output device in a block 186 to be rendered by the output device. Upon being information that the job has printed successfully, the MC then sends a notification back to the user to inform the user that the print job has printed successfully. In a block 188. In shorthand notation, the foregoing process may be described by: (UBR, UBB)→(DBR, DBB)→(TBR, TBB)→PBB.

Intra-Zone MC (DMZ)—RDC (DMZ). The purpose of this type of communication is to send a print request from a Message Center located in a DMZ to a device attached to an RDC in the same DMZ registered to the same MC within the same zone as the MC (e.g., MC12→RDC13). The corresponding shorthand notation is: (UBR, UBB)→(DBR, DBB)→(TBR, TBB)→(PBR, PBB).

Intra-Zone MC (DMZ)—DC (Private). The purpose of this type of communication is to send a print request from a DMZ MC to a device attached to an RDC in a private network registered to the same MC within the same zone (e.g., MC12→RDC12). The corresponding shorthand notation is: (UBR, UBB)→(DBR, DBB)→(TBR, TBB)→(PBR, PBB)

Intra-Zone MC (Private)—RDC (Public). The purpose of this type of communication is to send a print request from a private MC to a device attached to an RDC in a public network registered to another MC in a DMZ within the same zone (e.g., MC11→RDC14). The corresponding shorthand notation is: (UBR, UBB)→(DBR, DBB)→(TBR, TBB)→SBB→PBB.

Intra-Zone MC (Private)—RDC (DMZ). The purpose of this type of communication is to send a print request from a private MC to a device attached to the RDC in a DMZ registered to another MC in the same DMZ within the same zone (e.g., MC11→RDC13. The corresponding shorthand notation is: (UBR, UBB)→(DBR, DBB)→(TBR, TBB)→SBB→(PBR, PBB).

Intra-Zone MC (Private)—RDC (Private). The purpose of this type of communication is to send a print request from a private MC to a device attached to the RDC in a private network registered to the same MC within the same zone (e.g., MC11→RDC11). The corresponding shorthand notation is: (UBR, UBB)→(DBR, DBB)→(TBR, TBB)→(PBR, PBB).

Inter-Zone MC (DMZ)—RDC (Public). The purpose of this type of communication is to send a print request from a DMZ MC to a device attached to the RDC in a public network registered to another MC in a foreign DMZ from a different zone (e.g. MC12→RDC24). The corresponding shorthand notation is: (UBR, UBB)→(DBR, DBB)→(TBR, TBB)→PBB.

Inter-Zone MC (DMZ)—RDC (DMZ). The purpose of this type of communication is to send a print request to a device attached to the RDC in a different DMZ registered to another MC in the same foreign DMZ from a different zone (e.g., MC12→RDC23). The corresponding shorthand notation is: (UBR, UBB)→(DBR, DBB)→(TBR, TBB)→PBB.

Inter-Zone MC (DMZ)—RDC (Private). The purpose of this type of communication is to send a print request from a DMZ MC to a device attached to the RDC in a private network registered to another MC in a different DMZ from a different zone (e.g., MC12→RDC22). The corresponding shorthand notation is: (UBR, UBB)→(DBR, DBB)→(TBR, TBB)→PBB.

Inter-Zone MC (Private)—RDC (Public). The purpose of this type of communication is to send a print request from a private MC to a device attached to the RDC in a public network registered to another MC in a different DMZ from a different zone (e.g., MC11→RDC24). The corresponding shorthand notation is: (UBR, UBB)→(DBR, DBB)→(TBR, TBB)→SBB→PBB.

Inter-Zone MC (Private)—RDC (DMZ). The purpose of this type of communication is to send a print request from a private MC to a device attached to the RDC in a DMZ registered to another MC in the same foreign DMZ from a different zone (e.g., MC11→RDC23). The corresponding shorthand notation is: (UBR, UBB)→(DBR, DBB)→(TBR, TBB)→SBB→PBB.

Inter-Zone MC (Private)—RDC (Private). The purpose of this type of communication is to send a print request from a private MC to a device attached to the RDC in a different private network registered to another MC in a different foreign DMZ from a different zone (e.g., MC11→RDC22). The corresponding shorthand notation is: (UBR, UBB)→(DBR, DBB)→(TBR, TBB)→SBB→PBB.

System Hardware Multi-Tier Architecture

Figure 25:
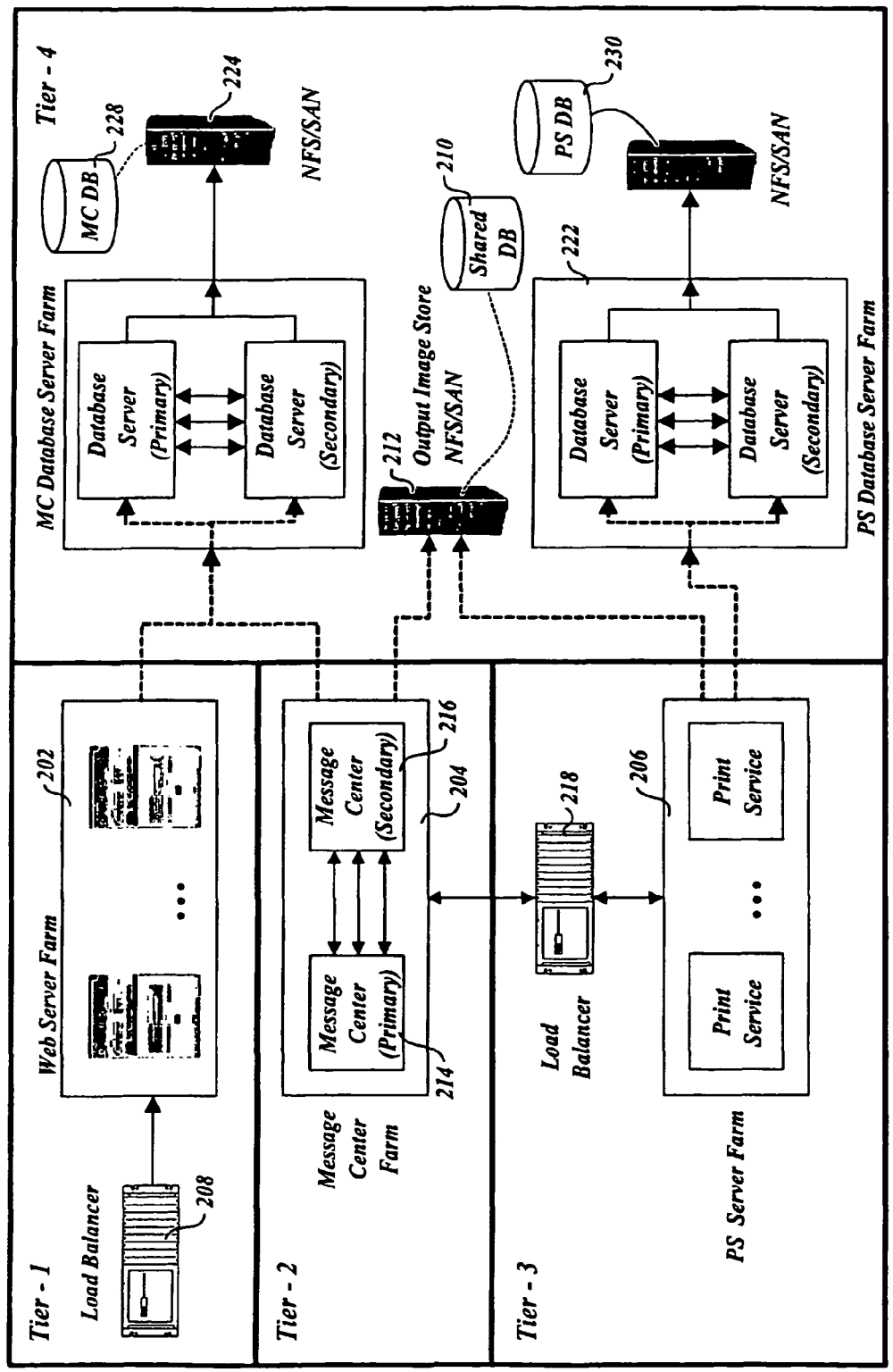
FIG. 25 is a block schematic diagram corresponding to a 4-tier architecture in accordance with one embodiment of the invention.

In one embodiment, the system may be implemented using a four-tier architecture design, as shown by a multi-tier architecture 200 in FIG. 25. The first tier of the architecture includes a Web Server Farm (WSF) 202; the second tier comprises a Message Center Farm (MCF) 204; the third tier comprises a Print Service Server Farm (PSSF) 206; and the fourth tier comprises a Database Server Farm (DBSF). Following is a description of each tier.

Tier-1 Web Server Farm (WSF). This tier consists of a Load Balancer (LB) 208 and a Web Server Farm 202. The Load Balancer takes the incoming requests and distributes them to one of the Web server in the Web Server Farm. The Web servers share the same URL; accordingly, the users only need to remember one URL to access the system. The distribution of the request depends upon the configuration of Load Balancer 208. The Load Balancer takes care of the Web server location and request dispatch. The assigned Web server executes the scripts locally and updates a database 210 stored on an NFS (network file system) or SAN (storage area network) device 212 by calling a common database access interface to the corresponding Database Server Farm. In addition, the Load Balancer may send out warning messages to administrators to indicate any errors in the Web Server Farm.

Tier-2 Message Center Farm (MCF). The Message Center Farm contains two running copies of the Message Center software components. One comprises the primary MC 214 running in processing mode and the other is the secondary MC 216 running in standby mode. The primary MC always responds to the incoming request first. If the primary MC were not responding, the secondary MC would toggle itself to processing mode to handle the request. It then sends out a warning message to the system administrator to indicate the error. This fail-over switch is done automatically without human intervention. When the problem is resolved and the primary MC is back online, the secondary MC switches itself back to standby mode then informs the primary MC to take over.

The system implements "heartbeat checking" between the primary and the secondary MC's in order to support the automatic fail-over switch. To implement this, each MC has two Ethernet interfaces and a serial port. All four Ethernet Interfaces are connected in the same subnet and the serial ports are connected to each other. Upon installation, the MC's are assigned with the same floating IP address on one of their Ethernet interfaces (Floating Interface) and a different static IP address on the other inters (Static Interface). The Primary MC brings up both Ethernet interfaces at the system startup. However the secondary MC only brings the Static Interface up to avoid the conflict. The secondary MC checks the availability of the primary MC by sending out test packets through its Static Interface. If the Floating Interface of the Primary MC is not reachable, as an assurance, the secondary checks again using the locally connected serial port to better understand the problem. The secondary then brings up its Floating Interface to service the incoming requests and sends out a warning message to the system administrator. Meanwhile it continues the heartbeat checking to detect the recovery of the primary MC. When the primary MC is back online, the secondary MC toggles its Floating Interface down, and sends a request to ask to primary to bring up its Floating Interface. To ensure the secondary is on standby at all time, the primary MC does the same checking against the secondary except it only sends a warning message to the administrator when the secondary MC has problems. The heartbeat checking continues for as long as the system is up and running. The interval of the heartbeat can be configured to fine-tune the system reliability and performance.

Tier-3 Print Service Server Farm (PSSF). This tier consists of a Load Balancer 218 Print Service Server Farm 206. The Load Balancer takes the incoming requests from Message Center Farm 204 and distributes them to one of the Print Service servers in PSSF 206. The MCF always uses the same Destined IP to access the Print Service. The distribution of the request depends upon the configuration of Load Balancer 218. The Load Balancer takes care of the Print Service server location and request dispatch. The assigned Print Service server processes the rendering request, deposits the output image data to the shared NFS or SAN device when necessary, then returns the result back to the MCF. The Load Balancer also sends out warning messages to the administrators to indicate any errors in the Print Service Server Farm.

Tier-4 Database Server Farm (DBSF). This tier consists of two database server farms, including a Message Center Database Server Farm (MCDSF) 220 and a Print Service Database Server Farm (PSDSF) 222. Each of these server farms is respectively connected to an NFS server or a Storage Area Network (SAN) server 224 and 226, hosting respective databases 228 and 230.

The database server farms implement heartbeat checking to each other in a similar fashion as described above for the Tier-2 Message Center Farm. However, some of the advanced commercial database system may have built-in server fail-over switch. In such case, the reliability can be achieved without implementation of the "Server Farm heartbeat examination."

Scalability. Creation of more running instances in Tier-1 and Tier-3 can help the entire system to scale. An optional load balancer can be placed in Tier-2 as well to fully extend the system. In such a case, the heartbeat checking mechanism would not be necessary since the load balancer can bear the responsibility to ensure the accessibility of each component.

Security. The modular architecture design and extensible database schema allow sophisticated security implementation. First, for user authentication, the subscriber database contains a user profile that is used to validate against when a user login to the system occurs through any supported device. If the validation fails, a record is logged onto the system for future reference or investigation, and the login request is denied. In addition, the Message Center can implement Public Key Infrastructure support for higher level of client and server authentication. Second, for data encryption support, each module can implement encryption to protect the content data. The encryption can be enforced between file store to the Message Center, Message Center to Print Service, Print Service to the output image repository, and file image repository to RDC. Certainly too much encryption may degrade the overall performance where as insufficient encryption could compromise the user data. Third, in the non-repudiation implementation, the system assigns each subscriber a unique ID. When a user submits a request to the system, the request is immediately tagged with his or her ID and a timestamp. If this is a job submission request, a duplicate copy is generated in the system and is logged and later archived for future reference and billing purpose.

In addition to the aforementioned security implementation, another merit of the system's modular and distributed architecture is that it allows administrators to customize the security settings based on an organization's needs. For example, a Virtual Private Network (VPN) may be implemented as a standard setup between a shared file server and the Message Center. Likewise, a VPN can be implemented between a Message Center and a Remote Desktop Client. The system architecture supports both software and hardware VPN configurations. The overall system can be configured to Public Key Infrastructure as well to provide authentication and authorization; to protect data integrity and data privacy; and to satisfy non-repudiation requirements.

Message Center

Figure 26:
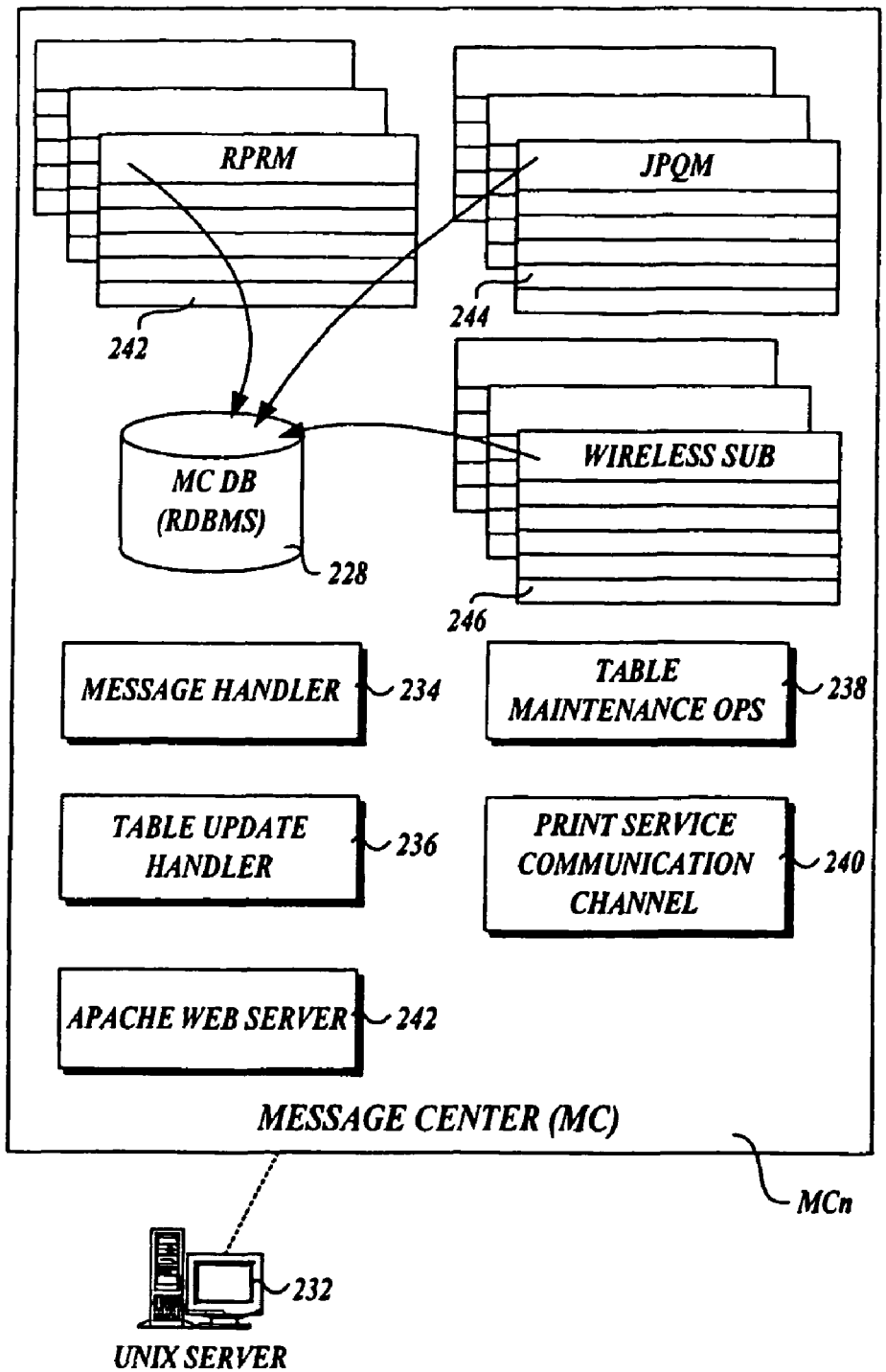
FIG. 26 is a block schematic diagram illustrating various software modules and a database schema corresponding used to implement the operations provided by a Message Center.

A Message Center consists of one or more networked servers that provide (generally) public access (e.g., via the Internet) and that implement an RDBMS (relational database management system) database. With reference to FIG. 26, in one embodiment a Message Center MCn is hosted on a UNIX server 232. In general, various server classes may be used as a Message Center host, including servers running UNIX, Microsoft Windows Server, and Linux operating systems. Preferably, the server should implemented redundant components and high availability hardware, such as RAID 5 disk subsystems and the like.

Message Center MCn includes an RDBMS database 228 in which data pertaining to the operation of the Message Center and other system components are stored. In general, the RDBMS database may be hosted by SQL RDBMS database software provided by one of several vendors, including Oracle (e.g., 8i or 9i), Microsoft (e.g., SQL Server 7 or 2000), IBM (DB2), Informix, and Sybase. In a current implementation, a MySQL RDBMS with network socket connections and PERL and C language programming API's is used. Optionally, database 228 may be hosts by a non-SQL RDBMS.

Each Message Center also includes various software modules for handling the tasks discussed above with reference to FIG. 1. These include a Message Handler 234, a Table Update Handler 236, Table Maintenance Operations 238, and a Print Service Communications Channel 240. In addition, the Message Centers include a Web server component for interfacing with Web traffic. In one embodiment an Apache Web Server with PHP4 and SSL server extensions and associated CGI applications to support remote server maintenance & administration as well as Print Service communication operations is used.

Message Handler 234 executes as a service that gets bound to a specific network port (e.g., system port 5190). The Remote Desktop Clients connect to the Message Center using this port and maintains a persistent connection for the life of the session. Communication between the Message Center and an RDC is connection oriented and each session consists of specific phases using a Network Message Protocol. The communication between the Message Center and a Remote Desktop Client begins when the RDC initiates a session start process and is terminated either by an abrupt disconnect (that results from a loss of a network connection or an error on the RDC when the RDC host machine (e.g., PC) gets shut down or the RDC application aborts) or when the RDC initiates a session stop process.

Table Update Handler (TUH) 236 consists of a set of database methods written in the native API of the RDBMS system (e.g., for the MySQL RDBMS implementation C and PERL language API's will be utilized; for an Oracle RDBMS implementation PLSQL stored procedures will be utilized, etc.). Methods in this module consist of functions to modify remote printer resource status; add, delete, and modify wireless subscriber profiles; Print Service job queue management table updates and other miscellaneous functions.

Table Maintenance Operations (TMO) module 238 contains a series of discrete database operations that perform maintenance functions necessary to generate logs and reports, purge tables periodically, and correct database table problems. Some of these functions execute on an ad hoc basis while others are scheduled to be performed periodically, e.g., on an hourly, daily, or weekly basis. Some functions in this module are available via the CGI interface on port 80 (or SSL).

Print Service Communication Channel 240 implements a message channel for access to the Message Center by Print Service components. This channel enables Print Services in the system to connect to Message Centers to update job queue management status. In one embodiment this channel is implemented via port 80 or an SSL port on the Message Center and the API that provides the messaging capability comprises CGI scripts.

Database Schema

In general, the Message Center RDBMS Schema contains three separate databases, including a Remote Printer Resource Management (RPRM) database 242, a Job Print Queue Management (JPQM) database 244, and a Wireless Subscriber (SUB) database 246. The RPRM database contains tables related to the printer resource registry, the RDC processes, and printer asset management. The JPQM database contains tables related to the submission of print jobs that are processed by Print Services. The Wireless Subscriber database contains tables related to wireless subscribers.

SUB Database Tables

Subscriber Table. This table contains specific information about wireless subscribers in the system. The subscriber fills in fields in this table during a one-time registration sequence. The fields corresponding to descriptions beginning with "HTTP_X_UP_DEVCAP" contain device capability values returned from the wireless device in HTTP GET headers that define some of the capabilities of the wireless device. The SUB_NO field will contain a unique subscriber number that is associated with the Mobile Phone Number entered by the subscriber during registration and is used to identify the subscriber for every session. The indexing field SUB_ID is unique for each record and is used to reference (i.e., link to) the NETWORK SITES and PRINTERS tables described below.

TABLE 8

Subscriber Table Description

| Field | Data Type | Description |
| --- | --- | --- |
| SUB_ID | INT UNSIGNED | Auto-incrementing unique Subscriber ID value |
| SUB_NO | VARCHAR(255) | HTTP_X_UP_SUBNO string from phone browser |
| USERNAME | VARCHAR(32) | Subscriber User Name |
| FNAME | VARCHAR(32) | Subscriber First Name |
| MNAME | VARCHAR(32) | Subscriber Middle Name |
| LNAME | VARCHAR(32) | Subscriber Last Name |
| ADDR1 | VARCHAR{48} | First Address string |
| ADDR2 | VARCHAR(48) | Second address string |
| CITY | VARCHAR(48) | City string |
| STATE | VARCHAR(2) | State Abbreviation |
| ZIP | VARCHAR(10) | ZipCode |
| EMAIL | VARCHAR(48) | E-mail address String |
| PIN | VARCHAR(32) | Four digit PIN number |
| CELLPHNUM | VARCHAR(10) | Mobile Phone number w/ area code |
| CAP_COLOR | ENUM('Y','N') | HTTP_X_UP_DEVCAP_ISCOLOR |
| CAP_PIX_X | INT UNSIGNED | HTTP_X_UP_DEVCAP_SCREENPIXELS "x" |
| CAP_PIX_Y | INT UNSIGNED | HTTP_X_UP_DEVCAP_SCREENPIXELS "y" |
| CAP_DEPTH | INT UNSIGNED | HTTP_X_UP_DEVCAP_SCREENDEPTH |
| CAP_MAXPDU | INT UNSIGNED | HTTP_X_UP_DEVCAP_MAX_PDU |
| SUB_STATE | INT UNSIGNED | State or status of subscriber (<TBD>) |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

Network Sites Table. This table contains several fields that define network sites added by subscribers, and includes login information for each site.

TABLE 9

Network Sites Table Description

| Field | Data Type | Description |
| --- | --- | --- |
| SITE_ID | INT UNSIGNED | Auto-incrementing unique Network Site ID value |
| SUB_ID | INT UNSIGNED | Subscriber ID reference mapped from Subscriber table |
| SITE_NAME | VARCHAR(32) | Site Name String |
| SITE_ADDR | VARCHAR(64) | Alpha or Numeric Network Site Identifier |
| USERNAME | VARCHAR(32) | Username for Network Site |
| PASSWORD | VARCHAR(32) | Password for Network Site |
| TYPECODE | INT UNSIGNED | Code defining the type of Network Site (<TBD>) |
| CURRENT | ENUM('Y','N') | Boolean: Current = Y Otherwise N |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

Printer Resources Table. This table contains several fields of information required to define Printer Resources for a specific subscriber.

TABLE 10

Printer Table Description

| Field | Data Type | Description |
| --- | --- | --- |
| PRINT_ID | INT UNSIGNED | Auto-incrementing unique Printer Resource ID value |
| SUB_ID | INT UNSIGNED | Subscriber ID reference mapped from Subscriber table |
| NAME | VARCHAR(32) | Printer Name |
| MCID | INT UNSIGNED | Message Center Identifier |
| PID | INT UNSIGNED | Remote Printer Resource Identifier |
| CURRENT | ENUM('Y','N') | Boolean: Current = Y Otherwise N |
| STATUS | INT UNSIGNED | Printer Status (<TBD>) |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

TABLE 11

FAX/E-mail Table (FET)

| Field | Data Type | Description |
| --- | --- | --- |
| FET_ID | INT UNSIGNED | Auto-incrementing unique Printer Resource ID value |
| SUB_ID | INT UNSIGNED | Subscriber ID reference mapped from Subscriber table |
| NAME | VARCHAR(32) | FAX/E-mail Name |
| FET_TYPE | INT UNSIGNED | Type enumeration (FAX, EMAIL, other?) |
| RESOURCE | VARCHAR(255) | Type-specific information |
| STATUS | INT UNSIGNED | Status of this resource |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

RPRM Database Tables

Master Printer Resources Table. This table contains system wide remote printer resource configuration and status information for every printing resource that is registered on a particular Message Center.

TABLE 12

Master Printer Resource Table

| Field | Data Type | Description |
| --- | --- | --- |
| PID | INT UNSIGNED | Auto-incrementing unique Printer Resource ID value |
| NAME | VARCHAR(32) | Printer Name |
| ZID | INT UNSIGNED | Zone Identifier (Zone Ownership) |

TABLE 12-continued

Master Printer Resource Table

| Field | Data Type | Description |
|---|---|---|
| CID | INT UNSIGNED | Client ID related to remote printer resource |
| MPID | INT UNSIGNED | MagicPrint Server Identifier for Driver Typing |
| TYPE | VARCHAR(32) | Printer resource type |
| PRINT_DESC | VARCHAR(255) | Free format printer descriptor string |
| STATUS | INT UNSIGNED | Current status of printer resource |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

Zone Descriptor Table. This table defines parameters for zones defined in the system wide network. Records in this table are referenced by a zone identifier (ZID) value. The ZONE_DESC descriptor, ZONE TYPE, and STATUS fields describe characteristics of the Zone.

TABLE 13

Zone Descriptor Table

| Field | Data Type | Description |
|---|---|---|
| ZID | INT UNSIGNED | Auto-incrementing unique ZONE ID value |
| ZONE_DESC | VARCHAR(64) | Zone descriptor string |
| ZONE_TYPE | INT UNSIGNED | Zone Type Enumeration (public/private) |
| STATUS | INT UNSIGNED | Status enumeration |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

Message Center Table (MCT). This table contains information used to reference the Message Centers in the system. These processes are identified by Message Center Identifiers (MCID) and are unique system wide values. Note that for all PUBLIC resources there is a Master Message Center that always is referenced with an MCID equal to 0; all other Message Centers have non-zero positive MCID values. The MCT contains information that identifies the ZONE and network address of the Message Center. Note that the Master Message Center has a ZONE Identifier (ZID) equal to 0; all other Message Centers have non-zero positive MCID values.

TABLE 14

Message Center Table

| Field | Data Type | Description |
|---|---|---|
| MCID | INT UNSIGNED | Auto-incrementing unique Message Center ID value |
| ZID | INT UNSIGNED | ZID Zone Identifier value |
| MC_IPADDR | VARCHAR(15) | Numeric IP address |
| MC_PORT | INT UNSIGNED | Port number of machine at MC_IPADDR |
| STATUS | INT UNSIGNED | Message Center Status value |
| NAME | VARCHAR(64) | Message Center Name String |
| SECURITY | VARCHAR(32) | Security string for authentication |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

Client Descriptor Table. This table defines individual Clients related to remote printer resources. Records in this table are referenced by a client identifier (CID). The CLIENT_DESC, CLIENT_TYPE, and Name and address fields define attributes of the client. Information stored in this table is generated during a registration process that occurs when the desktop client software is installed by an individual or on a PC that is behind a corporate firewall. Print Job queue information contains CID identifiers that associate the client process with a job to be printed.

TABLE 15

Client Descriptor Table

| Field | Data Type | Description |
|---|---|---|
| CID | INT UNSIGNED | Auto-incrementing unique CLIENT ID value |
| CLIENT_DESC | VARCHAR(64) | Client Descriptor string |
| CLIENT_TYPE | INT UNSIGNED | Client Type Enumeration |
| NAME_FIRST | VARCHAR(16) | Client first name |
| NAME_MID | VARCHAR(16) | Client middle name |
| NAME_LAST | VARCHAR(16) | Client last name |
| ADDRESS1 | VARCHAR(32) | Client Address |
| ADDRESS2 | VARCHAR(32) | Client Address |
| CITY | VARCHAR(12) | Client City |
| STATE, | VARCHAR(12) | Client State |
| ZIP | VARCHAR(12) | Client Zip Code |
| USERID | VARCHAR(16) | Client USER ID |
| PASSWORD | VARCHAR(16) | Client password |
| EMAIL | VARCHAR(32) | Client E-mail address |
| STATUS | INT UNSIGNED | Status: (ONLINE, OFFLINE, DISABLED, ERROR) |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

Job Print Queue Management Database Tables

Print Service Table. This table contains registered Print Services installed in the network Records in this table are referenced by an MPID Identifier. (In a current implementation, Print Service Servers are referred to as "MAGICPRINT"™ servers; thus the use of the identifier name MPID. These print servers are also referred to as Driverless Print Servers (DPS) herein.) Name descriptor, IP Address, status, and Server descriptor string fields are used to define the attributes of each Print Service. Note that an entry is made for each Driver Type on a Print Service Server. For servers that are situated in specific locales a ZID identifier is used to reference an associated Zone.

TABLE 16

MagicPrint Server Table

| Field | Data Type | Description |
|---|---|---|
| MPID | INT UNSIGNED | Auto-incrementing unique MagicPrint server ID value |
| NAME | VARCHAR(32) | MagicPrint Server Name |
| IPADDR | VARCHAR.(12) | MagicPrint Server IP Address |
| STATUS | INT UNSIGNED | Server Status Enumeration |
| ZID | INT UNSIGNED | ZONE Identifier |
| MP_Desc | VARCHAR(62) | Server Descriptor string |
| PRINT_DESC | VARCHAR(255) | Printer Driver Descriptor string |
| SECURITY | VARCHAR(32) | Pass Code value for security access |
| CREATEDATE | DATETIME | Date/time string: 'YYYY-MM-DD HH:MM:SS' |
| UPDATEDATE | DATETIME | Date/time string: 'YYYY-MM-DD HH:MM:SS' |

Print Queue Table. This table manages the printer queues for the network. Each record in this table represents a single print job referenced by the QID identifier. The overall system design promotes deferred print job capability and the QDATE and DQDATE fields track job queue entry and exit dates and times. Most of the identifiers in this table are copied into the JOB Queue Log table after the print job has been processed from this table. The DRIVERDESC string contains information that defines the type of printer driver that was used to process the document as well as the remote printer resource referenced by the PID identifier and associated with the desktop client referenced by the CID identifier.

TABLE 17

Printer Queue Table

| Field | Data Type | Description |
| --- | --- | --- |
| QID | INT UNSIGNED | Auto-incrementing unique QUEUE ID value |
| MPID | INT UNSIGNED | Print Service Server ID value |
| CID | INT UNSIGNED | Client ID of Printer Resource |
| PID | INT UNSIGNED | Printer resource ID (related to CID) |
| JOBOWNER | VARCHAR(32) | Name or ID of Print Job originator |
| CHECKSUM | INT UNSIGNED | Queue File checksum value |
| QFILENAME | VARCHAR(32) | Queue File name string |
| QFILESIZE | INT UNSIGNED | File size of queue file |
| QSTATUS | INT UNSIGNED | Queue entry status |
| DRIVERDESC | VARCHAR(255) | Print driver descriptor string |
| QDATE | DATETIME | Date/time string: 'YYYY-MM-DD HH:MM:SS' |
| DQDATE | DATETIME | Date/time string: 'YYYY-MM-DD HH:MM:SS' |

JOB Queue LOG Table. The JOB Queue LOG table contains information to log processed print jobs. Jobs in this log are referenced by a JOB Log ID (JID) value. Fields from the Print Queue table are transferred to this table. The Print Service server is referenced by the MPID identifier. The Client used to print the Job is referenced by the CID identifier. The remote printer resource associated with the CID is referenced by the PID identifier. In addition the JOB Owner descriptor string is included to identify the originator of the print job.

TABLE 18

JOB Queue Log Table

| Field | Data Type | Description |
| --- | --- | --- |
| JID | INT UNSIGNED | Auto-incrementing unique JOB Log ID value |
| MPID | INT UNSIGNED | MagicPrint Server ID value |
| CID | INT UNSIGNED | Client ID of Printer Resource |
| PID | INT UNSIGNED | Printer resource ID (related to CID) |
| JOBOWNER | VARCHAR(32) | Name or ID of Print Job originator |
| STATUS | INT UNSIGNED | Job Completion Status Enumeration |
| PROCDATE | DATETIME | Date/time string: 'YYYY-MM-DD HH:MM:SS' |

Figure 27:
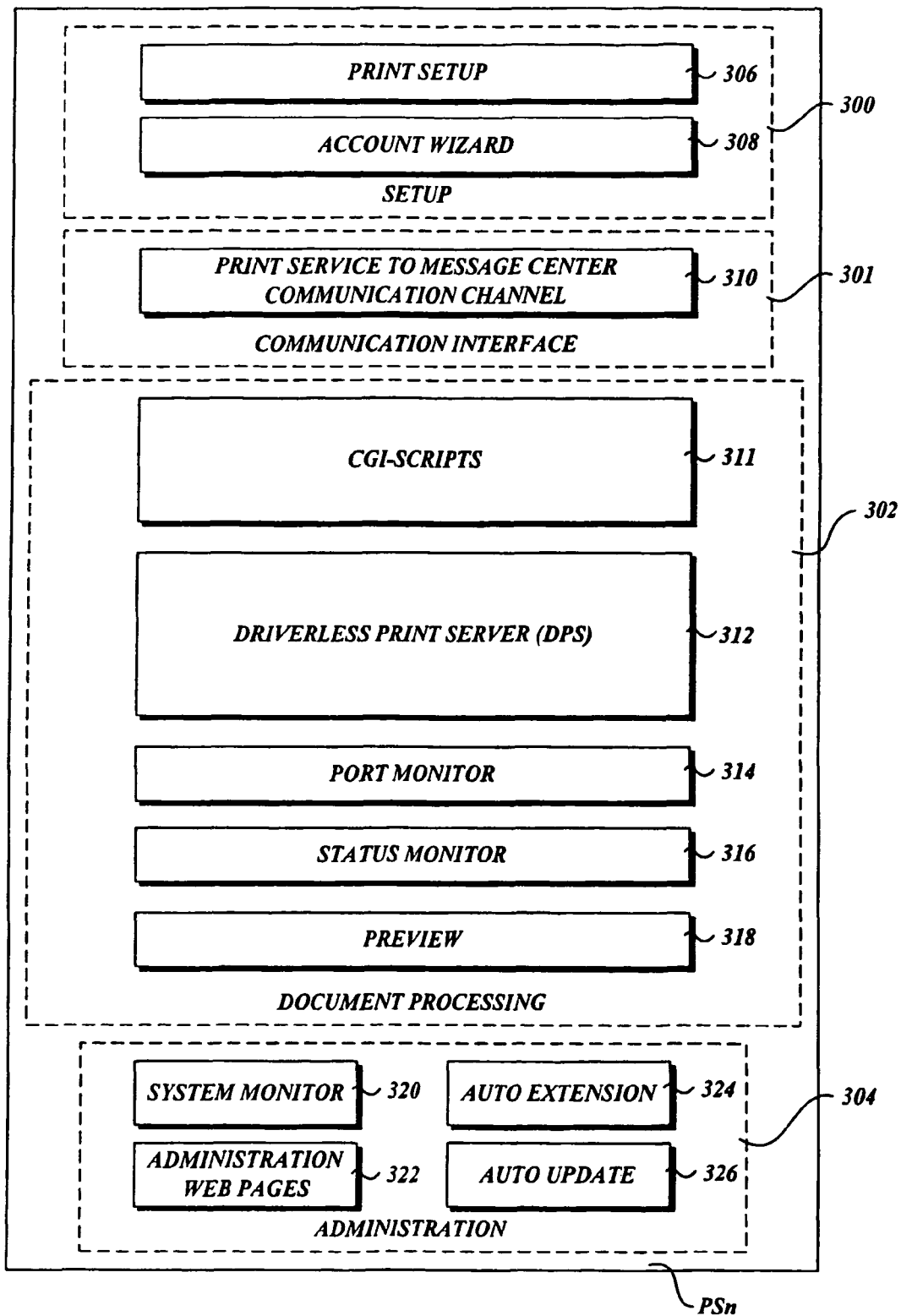
FIG. 27 is a block schematic diagram illustrating various software components implemented by a Print Service.

Further details of one embodiment of the software components used for Print Service PSn are shown in FIG. 27. The software components are logically divided into four groups, including a setup component 300, a Message Center Communication Interface 301, a document processing component 302, and an administration component 304. Each of these components further include one or more software applications, scripts, components and/or modules. Setup component 300 includes a Print Setup module 306 and an Account Wizard module 308. Message Center Communication Interface 301 includes a Print Server to Message Center Communication Channel 310. Document processing component 302 includes CGI scripts 311, a Driverless Print Server component 312, a Port Monitor 314, a Status Monitor 316, and a Preview module 318. Administration component 304 includes a System Monitor 320, Administration (control panel) Web pages 322, an Auto Extension module 324, and an Auto Update module 326.

In one embodiment, Print Setup module 306 comprises a Microsoft (MS) Windows application run by a system administrator to change the configuration of a Windows Printer that is used by the system. The application may be used to convert an existing printer, install a new printer, or delete a printer. Conversion of an existing printer comprises taking an existing printer installation and replacing the operations provided by MS Window's port monitor with Port Monitor 314. The use of Port Monitor 314 allows the spool file to be manipulated by the DPS system and allows Status Monitor 316 to send the spool file to a selected destination output device.

Print Setup module 306 may also be used to install a new printer with an appropriate printer device driver. For example, an administrator can set up a postscript printer by installing an Adobe PostScript™ driver for use with the DPS system by using the printer's PostScript Printer Description (PPD) file. If the administrator can provide a PDD, the printer setup module will install the PostScript driver and configure it for use by the DPS system. In other cases, the administrator may provide appropriate printer device driver software for the new printer. Print Setup module 306 may also be used to delete a printer. In such an event, the Windows port monitor can be restored as the system's port monitor or a DPS server's support for a selected printer can be completely removed.

Account Wizard module 308 applies security to a set of Administrative Web pages 322 so that the administrator's login will determine which set of Web pages are accessible. In one embodiment, the system implements three administrative levels, including monitor, manager, and administrative levels. In one embodiment, the account wizard creates these three groups as MS Windows user groups. Furthermore, the account wizard creates MS Windows user accounts and places them into one of the administrative user groups. In one embodiment, Account Wizard module 308 is a MS Windows application.

Print Service to Message Center communication channel 310 enables communication between Print Services and Message Centers. The communication includes Print Service registration and unregistration; job rendering request; job print request; device registration and unregistration; device status query; etc.

Figure 28:
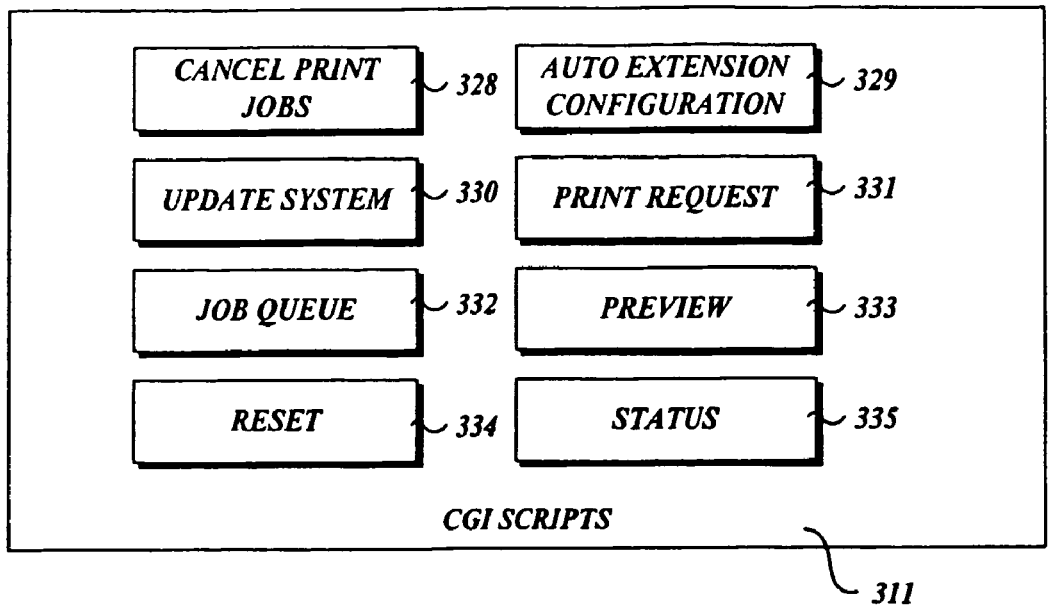
FIG. 28 is a block schematic diagram illustrating various CGI scripts used by a Print Service.

Further details of the CGI scripts 311 are shown in FIG. 28. A cancel print jobs CGI script 328 is used to remove a print job request from a system. From Administrative Web pages 322, the script can be called for any print job that has been submitted to the system and has yet to have its spool file sent to the printer. The script may also be called from a Message Center.

An automatic extension configuration CGI script 329 searches the Print Service host for installed applications, discovers which document types can be supported by the applications found, and configures the Print Service to allow print job requests of the file types discovered. This information may be forwarded to a Message Center to update its resource configuration information. An update system CGI script 330 is used to compare the installed system components against the latest available components, downloads any new components (when applicable), and installs them on the PS host.

A Print Request CGI script 331 takes source data (e.g., a document file, graphical image file, or URL from a Message Center as an input and creates a print job request to be processed by the Print Service. A Job Queue CGI script 332 reads the queue of print job requests from the system and returns the list to the script's caller (e.g., an MC). A Preview CGI script 333 takes a document file, graphical image file, or URL from a Message Center and creates a print job request on the system in a manner similar to the print request CGI script. However, when the Preview CGI script is called, the system converts the document, image, or Web page to a format for viewing in the user's originating device's user interface rather than sending it to the printer for printing. The Preview CGI script can be called a second time for the document, image or Web page to instruct the system to send the previewed item to a selected output device.

A Reset CGI script 334 closes the system applications and starts them again. This script is used as a last resort attempt by the system administrator to clear any program errors that may have occurred. A Status CGI script 335 provides Administrative Web pages 322 with the progress status of a print job request.

Figure 29:
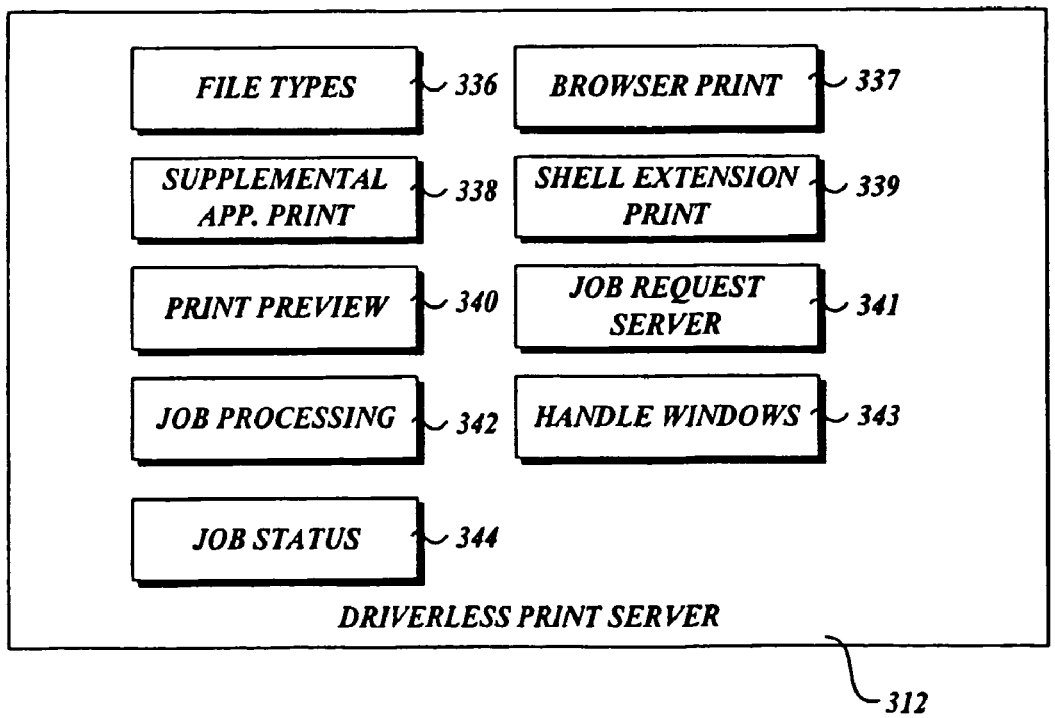
FIG. 29 is a block schematic diagram illustrating various software components implemented by a Driver Print Server.

The components implemented by Driverless Print Server 312 are shown in FIG. 29. The Driverless Print Server is the main software component used by a Print Service. It comprises an application that runs on the Print Service host (i.e., server computer) that accepts job requests, queues the requests and directs the print process for the document, image or URL from request to final printing. The Driverless Print Server components include a File Types Configuration list 336, a Browser Print component 337, a Supplemental Application Print component 338, a Shell Extension Print component 339, a Print Preview Component 340, a Job Request Server component 341, a Job Processing component 342, a Handle Windows component 343, and a Job Status component 344.

File Types Configuration list 336 is maintained by the Driverless Print Server. The configuration list has, for each file type, the extension, and the method used to print that file type. When the printing method is provided by Supplemental Application Print component 338, the list contains the path to the application used for printing, the menu commands the application uses to print, and the menu commands the application uses to close the application.

The Browser Print component 337 comprises one of three methods the Driverless Print Server uses to generate output image data. In one embodiment, this component uses the application-programming interface (API) provided by the Microsoft Internet Explorer (IE) Web browser. Using the IE API, the component runs the browser within a window on the Driverless Print Server application. To print a URL, the Driverless Print Server uses the provided navigate programming interface to load a Web page into the window. Once the page is loaded, the component uses IE's provided printing programming interface to instantiate a print operation.

Document and image files can be printed using this method if the IE browser instance on the DPS server computer is configured with a browser plug-in for the type of document or image file requested. For example, consider the IE plug-in for Adobe Acrobat™. Adobe Acrobat document files have a PDF extension. If the Acrobat plug-in is installed on the server computer, IE's navigate programming interface allows PDF files to be loaded in IE and IE's print programming interface will allow printing of the file.

The Supplemental Application Print component 338 provides another method used by the Driverless Print Server to generate output image data. This component uses File Types Configuration list 336 to find the application associated with the file extension, load the file into the application, execute the print menu command for the application, and close the application upon completion of the printing operation. With the combination of the File Types Configuration list and the Supplemental application Print method, the system administrator can add support for additional document or image types by installing the application on the server machine and editing the File Types Configuration list.

The Shell Extension Print component 339 provides a third method used by the Driverless Print Server to print. This component uses the MS Windows Shell Extensions programming interface to print. The MS Windows Shell Extensions interface is an operating system feature that allows a user to print a document type with a command sent to the application that supports the document type. If the application supports the Shell Extension interface, the application will load the document, print it, and close itself. With the combination of the File Types configuration list and the Shell Extension Print method, the system administrator can add support for additional documents or image types by installing the application on the server machine and editing File Types configuration list 336.

The Print Preview component 340 converts the print job requested document, image or URL into a document format file so the consumer users can view an example of the requested document, image or URL. This component works in unison with Preview CGI script 333. One of the conversions the Driverless Print Server performs pertains to the Adobe Acrobat document format. Through use of the Print Preview component, the Driverless Print Server creates a spool file by the same methods it would use to create a spool file for printing. However, instead of sending the spool file to status monitor 316 for sending to an output device or repository, it runs the spool file through the Adobe Acrobat Distiller application, which converts the document into the Acrobat PDF format. This conversion requires that the printer driver is an Adobe PostScript driver. The Driverless Print Server keeps the spool file created in the preview process so that if the consumer user wants to print the document, the DPS can simply send the spool file to status monitor 316, which will then send it to the printer for printing.

The Job Request Server component 341 takes print job requests from Print Request CGI script 331 and queues them for processing. The Job Processing component 342 manages print job requests from insertion into the job queue until the output image data spool file is generated. This component reads the queued job requests, determines which one of the three printing methods will be used for printing, submits the document, image, or URL to the determined printing method, handles executing the print command, and submits the spool file to the status monitor for storage. During the stages of the output image generation process, the status is tracked and made available to any Status CGI script 335 calls that may be made.

The Handle Windows component 343 is used to provide reliable printing. Many applications display message boxes and/or dialogs during the printing process to inform or gather information from the user who is requesting printing services. In order to support automatic processing of print requests, there needs to be a mechanism to respond to any message box or dialog that might appear in the application used to print the request. This mechanism is provided by Handle Windows component 343. The Driverless Print Server watches the host server application during the printing process for messages boxes and dialogs that might appear. When a new message box or dialog appears, the Handle Windows component reads the information, compares it with known messages or known statements, and closes the message box or dialog according to its programmed logic. Further details of the Handle Windows component are discussed below with reference to FIG. 32.

The Job Status component 344 is provided to maintain a memory-mapped file of all of the jobs in each Driverless Print Server queue. At periodic intervals, job status information is written to the memory-mapped file so that the Status CGI script can read the status of job requests.

A Port Monitor comprises a standard component in the MS Windows printing subsystem. The port monitor receives spooled data from the printer driver via the printing subsystem. A traditional port monitor is responsible for taking the spooled data from the printer driver and delivering it to a printer. In the Driverless Print Server, Port Monitor module 314 (FIG. 27) writes the spooled data to a file. Once the entire spool file has been written to a file, Port Monitor module 314 messages the Driverless Print Server with the name and location of the spooled file.

Status Monitor 316 comprises an application that runs on the server computer. It performs a plurality of functions, but it is primarily responsible for sending spool files to printers. After the Driverless Print Server is messaged form Port Monitor 314 with the location of a spool file, the Driverless Print Server messages Status Monitor 316 with the location of the spool file, the URL of the printer where the spool file should be send, and protocol information for sending the spool file to the printer. Status Monitor 316 creates a queue for each requested printer URL. Since the printer can only receive one spool file at a time, it serializes the spool file transmittals. Status Monitor 316 can create and maintain multiple queues simultaneously.

After the output image has been successfully generated, Status Monitor 316 messages the Driverless Print Server that the job is complete. The job history is updated, and the job is removed from the Driverless Print Server queue. Status Monitor 316 can be configured to send a message to external components when during and/or after an output image has been generated. For example, it may be used to inform a Message Center that initiated a print job that the output image corresponding to the print job is complete.

System Monitor component 320 comprises an application that monitors all the other Print Service components, watching for failures and listening for specific requests. When print job requests arrive from Print Request CGI script 331, if the Driverless Print Server application is not running, the Print Request CGI script can request that System Monitor 320 start the Driverless Print Server, thus allowing the print job request to be serviced. System Monitor 320 periodically sends messages to the Driverless Print Server to get the status of the program and any print jobs in its queue. If the System Monitor detects a failure, it will attempt to clear the problem.

System Monitor 320 may also be used to download and install newer Print Service system components. It collects the version numbers of all components in the system and sends them to a system's Update Web site. If the Update Web site replies with information about the availability of newer components, it will retrieve those components and install them on the system. The System Monitor accepts update requests from its menus or from Update System CGI script 330.

Administrative Web pages 322 allow remote configuration and monitoring of a system by administrative users. A security feature is used to prevent access of these Web pages by consumer users.

When a file is submitted for output image generation, the Driverless Print Server opens an application corresponding to the file's file type. For example, if the file has a .doc extension an MS Word application will generally be opened. The application then opens the file, and through its built-in print commands, sends the submitted file to a selected printer. An extension Web page (not shown) displays rows (entries) that list file type information (in an "Extension" column) and the software application corresponding to the file type (in an "Application Name" column). Each of the entries also displays a priority level for the extension (to define an order in which file types with the same extension are evaluated to determine the appropriate application for the submitted file), a Registry Location that identifies where in the OS registry information pertaining to the application is stored, a Default Path for the application, an Executable Name for the application, and internal codes to print and close the application. An administrator can add a new file type via activation of an "add new entry" button, which will render a Web page (not shown) with corresponding edit controls for each of the columns in the prior Web page. The user may also update file types and edit existing file type information.

The Driverless Print Server uses an Extensions Table corresponding to the file type values to determine which applications installed on the server computer to use for printing files of each file type listed in the Extensions Table. The information in the table is also used to determine the location of the executable files on the Print Service server computer. In one embodiment, the Extensions Table and various other configuration and print job data is maintained in a database. Typically, the database will be hosted on the same machine as hosts the DPS software, although a separate machine may also be used to host the database, as will be recognized by those skilled in the art.

Processing a Print Request

Figure 30:
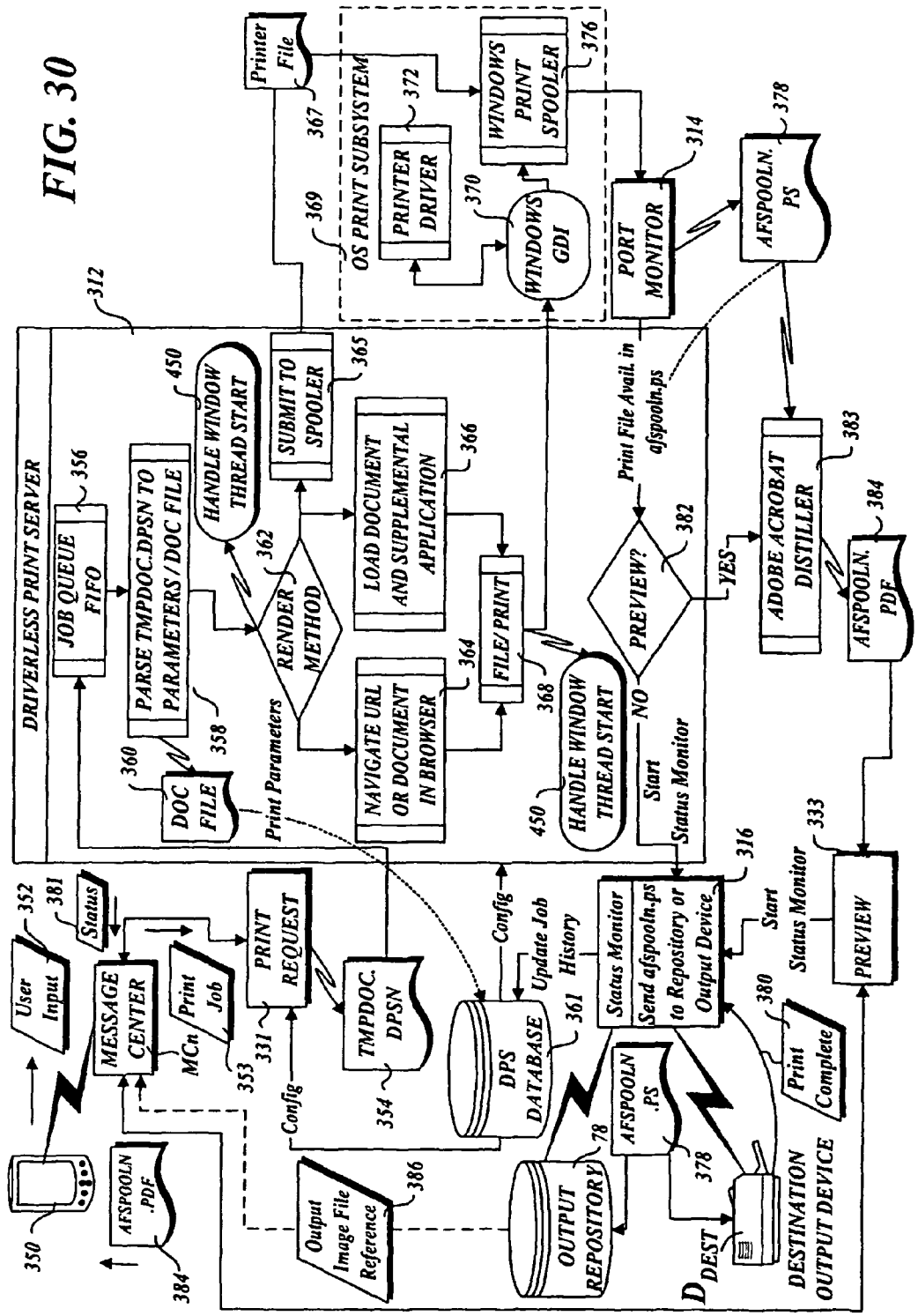
FIG. 30 is a schematic diagram illustrating a typical data flow process corresponding to a print request submitted to a Print Service.

A data flow diagram that illustrates data flows and operations performed by the Print Service DPS system software components in response to a print request is shown in FIG. 30. Initially, the user of an originating device 350 will connect to a system and select source data to print, either from a local store or a remote store, and an output device on which the source data are to be printed in the manner discussed above. This information, comprising user input 352 will be received by a corresponding Message Center, which will process it to generate a print job 353. In general, the print job will include the source data or a reference to the source data, and will identify whether the output image generated by the Print Service is to be stored in a repository or directly submitted to an output device. The print job is initially processed by Print Request CGI script 331, which generates a tmpdoc.dpsn document 354 containing print parameters and other data corresponding to the print job. The tmpdoc.dpsn document is then sent via the Print Request CGI script to a job queue 356. In one embodiment, the job queue comprises a first-in first-out (FIFO) type of job queue. Optionally, other types of job queues may also be used, as will be recognized by those skilled in the art. As discussed above, job queue operations are performed by job processing component 342.

The job queue submits job requests to be processed by the Print Service. Each request is processed by a block 358 in which the tmpdoc.dpsn file is parsed to retrieve print job parameters corresponding to the print request, which are stored in a document file 360. For example, parsed information may include a printer selection, number of copies, identity of consumer user, document name, Message Center submitting print job, etc. A portion of the print job parameters is then stored in a DPS database 361.

In a decision block 362, a determination is made to what type of document was requested to be printed, e.g., an application file, an image, or a Web page URL. If the document pertains to a browsable document, such as a Web page, image or a PDF file, the logic flows to a block 364, wherein the Web page, image or PDF document is loaded via the Driverless Print Server's browser. Otherwise, the logic flows to a block 366 in which the document and an appropriate supplemental application that can be used to print the document is loaded.

For example, if the document comprises a MS Excel spreadsheet, an instance of the MS Excel application is loaded, along with the Excel document. In a block 368, an internal command is generated to simulate a user requesting a print operation to request that the URL, image or document be printed by either the browser or supplemental application. For example, most applications provide a File->Print menu option that initiates a printing process for the application.

In response to an internal application or browser print request, various printing and document information is passed internally to operating system components that handle printer operations. As discussed above, in one embodiment the Driverless Print Server is operated in an MS Windows OS environment. Accordingly, this environment provides an OS print subsystem 369 including a Graphical Device Interface (GDI) component 370 that interacts with a printer device driver 372 corresponding to the selected printer to generate appropriate printer (i.e., output device) data that will be sent to a target printer 374 to produce an output document. The printer data is internally handled by an MS Windows print spooler component 376 that outputs a print spool file that Is received by Port Monitor 314. In the illustrated example, it is assumed that a destination output device $D_{DEST}$ comprises a PostScript printer. Accordingly, Port Monitor 314 outputs a PostScript file 378.

While the foregoing operations are going on, the user of originating device 350 may select to preview a simulated printed output of the document, image or Web page prior to having the source data printed. In a decision block 380, a determination is made to whether the user requested to preview the printer output. If the answer is YES (TRUE), in one embodiment an instance of Adobe Acrobat Distiller 382 is launched, which is used to generate an Adobe portable document format (PDF) document 384. The PDF document is then handled by Preview CGI script 333, which sends the document back to originating device 350 via Message Center MCn, where it is rendered on the browser running on the originating device via an Adobe PDF plug-in. The rendered display (not shown) will provide a preview of what the printed document will look like and include user interface (UI) controls that will enable the consumer user to select to have the document printed or canceled.

If the consumer user desires to have the document printed, a print notification is sent back to Message Center MCn, where it is processed by Preview CGI script 333. In response to receiving the print notification, Preview CGI script 333 starts Status Monitor 316 and submits the print document 378 to either destination output device $D_{DEST}$ or output repository 78, dependent on where the output image data are to be sent. In conjunction with this event, job history information is updated in a DPS database 361. Additionally, once the output image is printed, a print completed notification 380 is sent back to Status Monitor 316, which then forwards the notification back to Message Center MCn as job status message 381.

In the event that the print preview option is not selected by the consumer user, the answer to decision block 382 is NO (FALSE), which results in starting up Status Monitor 316 and submitting print document 378 to either destination output device $D_{DEST}$ or output repository 78. During the print process, Status Monitor 116 monitors the progress of the process and updates DPS database 361. Status CGI-script 335 is used to provide Message Center with print status information by retrieving the progress information from the database and generating appropriate HTML to send back to the Message Center that submitted the corresponding print job, as depicted by job status message 381.

In one embodiment, the Driverless Print Server supports direct printing of printer files. For instance, if the print job file comprises a printer file, it can be directly printed if it corresponds to a printer file type of the destination output device. For example, PostScript files may be printed on PostScript printers. Similarly, printer files for other types of printers may have been previously created by selecting a "save to file" option during a print process. If the file is determined to be a printer file in decision block 362, the logic proceeds to a block 367, wherein the printer file (depicted by a printer file 367) is directly sent to Windows print spooler 376.

If the output image is deposited in output repository 78 rather than sent to an output device, Status Monitor 316 sends Message Center MCn indicia via job status message 381 that an output image file corresponding to the print job has been stored in the repository, along with the name and location of the output image file, as depicted by output image file reference 386.

Figure 31:
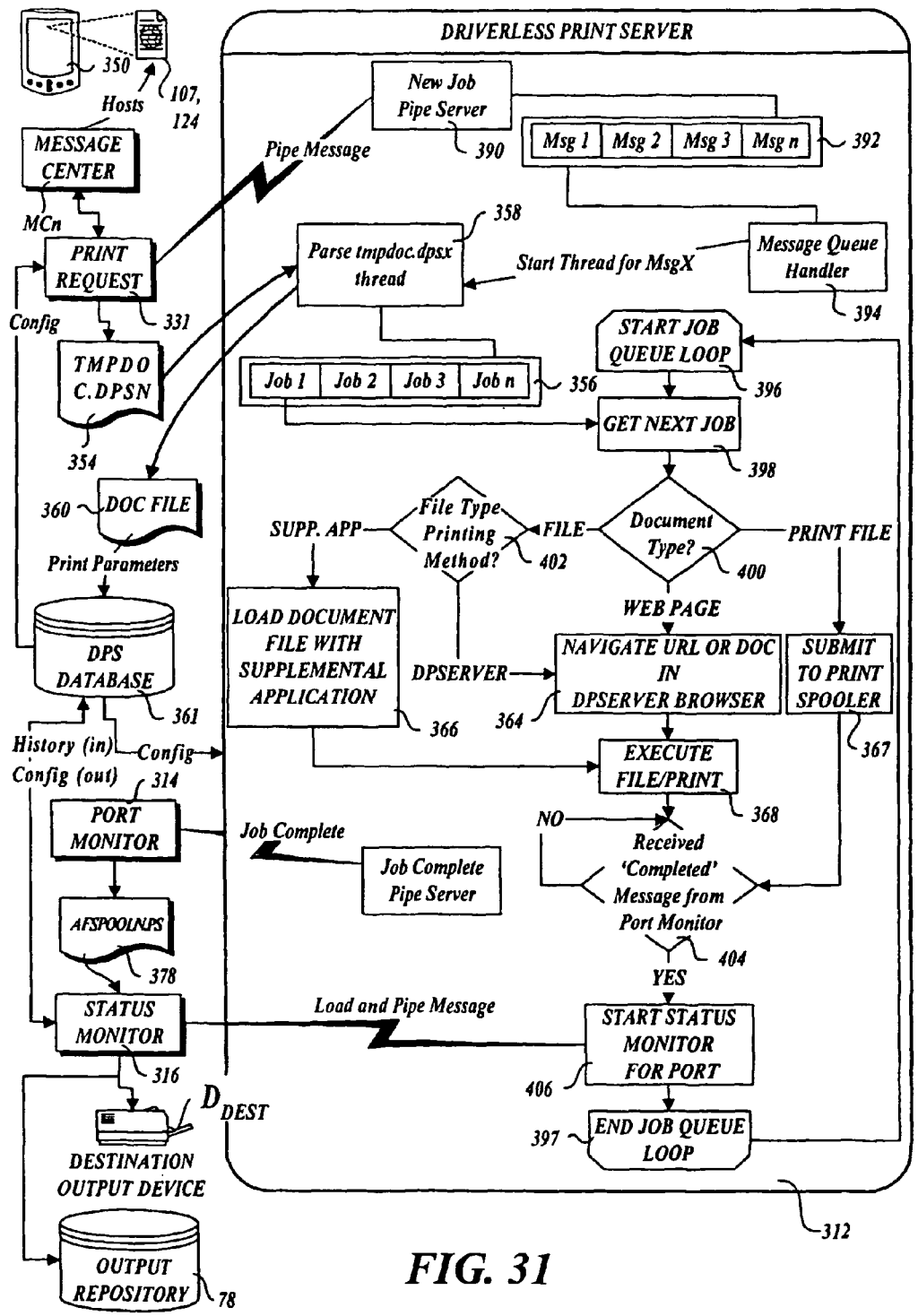
FIG. 31 is a combination schematic diagram and flow chart illustrating further operations and logic provided by the driverless print server software of a Print Service.

Further details of the internal operations of Driverless Print Server software 46 are shown in FIG. 31. As before, a consumer user operating originating device 350 requests to print source data (e.g., a document, image file, or a Web page) via a user interface appropriate to the originating device (e.g., mini-browser UI 107 or browser UI 124). In response to activation of a "print now" button on appropriate UI page, user input data is processed by Print Request CGI script 331, which creates tmpdoc.dpsn document 354. The Print Request CGI script also pipes a message containing a print request to a New Job Pipe Server 390, which stores the messages in a message queue 392. For each print request message, a Message Queue Handler 394 starts a corresponding thread that parses the corresponding tmpdox.dpsn document 354, thereby generating document file 360 and submitting a print request to job queue 356.

As depicted by a start job queue loop block 396 and end job queue loop block 397, the following operations and logic displayed between these loop ends is performed for a print job. First, in a block 398, the next job is retrieved from job queue 356. In a decision block 400, a decision is made to what type of document the print job corresponds to. If the document is an application file, the logic proceeds to a decision block 402 in which a determination is made to what type of file type printing method should be used. If the file requires a supplemental application (e.g., MS Word, MS Excel, AutoCAD, etc.), the logic proceeds to block 366 where the document and appropriate supplemental application is loaded in the manner discussed above. Once the file is loaded in the supplemental application, a file printing command is internally generated in block 368 to submit the file for printing by the OS, as before.

Next, in a decision block 404 a determination is made to whether a "Completed" message is received from Port Monitor 314. This determination is made on a periodic basis or through a software interrupt mechanism until the "Completed" message has been received. Status Monitor 316 is then started in a block 406, which sends print document 378 to target printer 374 and updates the job history data in DPS database 386, as before.

Returning to decision blocks 400 and 402, if the document type is a Web page or a file type that can be printed directly by the Driverless Print Server computer without requiring a supplemental application (e.g., a PDF document or various types of image files), the logic proceeds to block 364, wherein the DPS computer's browser is navigated to the URL for the Web page or the browser is otherwise used to render the PDF file or image file. Once rendered, the remaining print operations are performed in the manner discussed above, beginning with block 368. As discussed above, if the document type is a printer file, the document is directly sent to Windows Print Spooler 376.

Figure 32:
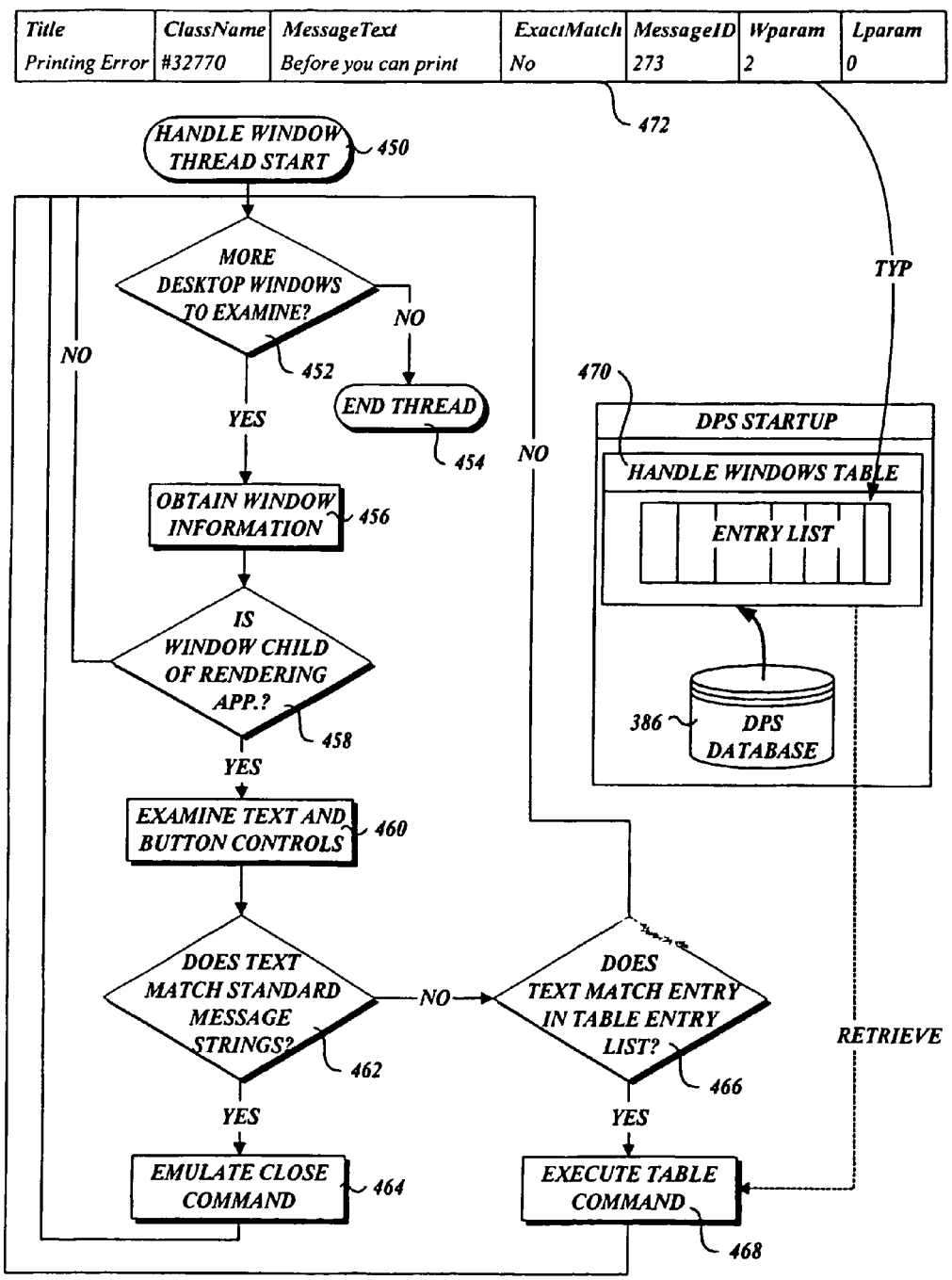
FIG. 32 is a flowchart and schematic diagram illustrating the operations and logic employed by a Handle Windows component to handle various dialog and message boxes that may be launched when processing a print job.

A flowchart detailing the logic and operations provided by Handle Windows component 343 is shown in FIG. 32. As shown by start blocks 450 in FIG. 30, a Handle Windows thread is launched at the start of decision block 362 and immediately after the print action has been invoked in block 368. As discussed above, the Handle Windows component is used to handle various dialog and messaged boxes that may be launched when an application is loaded, when a document is loaded into an application, when a print action is initiated, during the printing process, etc.

Returning to the flowchart of FIG. 32, upon being launched, the Handle Window thread makes a determination to whether there are any more desktop windows to examine in a block 452. Such windows will generally include dialog boxes and message boxes. If there are no more windows to examine, the thread is ended, as depicted by and end thread end block 454. If there are more windows to examine, the logic proceeds to a block 456 in which window information for a window is obtained. Under MS Windows operating systems, window information may be obtained by making an appropriate Windows API call.

Next, in a decision block 458 a determination is made to whether the window is a child window of a rendering application (i.e., was it produced by a supplemental application or a browser). If the decision is no, the window does not correspond to the rendering application, and the logic proceeds to decision block 452 to evaluate the next window. If the answer to decision block 458 is Yes (TRUE), the logic proceeds to a block 460 in which text and control buttons for the window are examined.

As determined by a decision block 462, if the text matches a standard message string the logic proceeds to a block 464 in which a window close command is internally provided to emulate a user activating either a close button on the window or the window close icon in the window's frame. The logic then returns to decision block 452 to process the next window.

If the text does not match a standard message string, the answer to decision block 462 is No (FALSE), and the logic proceeds to a decision block 466 in which a determination is made to whether the text matches a corresponding an entry list MessageText value stored in a Handle Windows Table 470 in DPS database 386. If there is a matching value, the logic proceeds to a block 468 in which the table command is executed by retrieving the data in the row of the matching MessageText value and issuing a corresponding message to the Windows API based on the parameters provided by the data. For example, a typical entry list row 472 is shown at the top of FIG. 472. The row contains information pertinent to the Windows API, including a MessageID, Wparam, and Lparam value. These parameters are used to make a corresponding API call to effectuate the desired operation for handling the window. Once the table command is executed, or if the answer to decision block 466 is No (FALSE), the logic returns to decision block 452 to begin processing the next window.

User Account Setup

With reference to FIGS. 33-37, the system provides various user interface screens to enable users to setup their accounts and configure various parameters, such as networks, printers, faxes, and contacts. As discussed above, these UI screens will typically comprises HTML-based web pages for wired and wireless network access, and WAP-based cards for those devices that access the system via cellular infrastructure. A setup process comprising multiple operations is displayed at the top of a web page 500 in FIG. 33. These operations include a begin setup operation 502, a file server access setup operations 504, a favorite printer setup 506, a fax setup operation 508, a contact list setup operation 510, and an end setup operation 512. Prior to setting up the various parameters enabled through these operations, a user will have registered with the system using a typical user authentication scheme involving a user name and personal identification number (PIN).

The user begins the setup process by logging into the system and navigating to either an account setup screen or a settings screen. Various screens containing content similar to those discussed below may be accessed via several navigation schemes. During the setup operations, a user will define parameters concerning one or more file servers the user may desire to access source data from during subsequent user sessions. In accordance with web page 500, the user is enabled to define a server name (i.e., alias) and corresponding server address in edit boxes 514 and 516. The user will also enter an account name and password in edit boxes 518 and 520 respectively, while entering a confirmation password in an edit box 522. Finally, the user will select a file server type via a pulldown list 524. After all of the parameters have been entered, the user will activate an "ADD SERVER NOW" button 526, thereby causing the web page to return the parameters to a Message Center that hosts the web page. The parameters are then stored in the Network Sites table in Message Center database 228.

Figure 33:
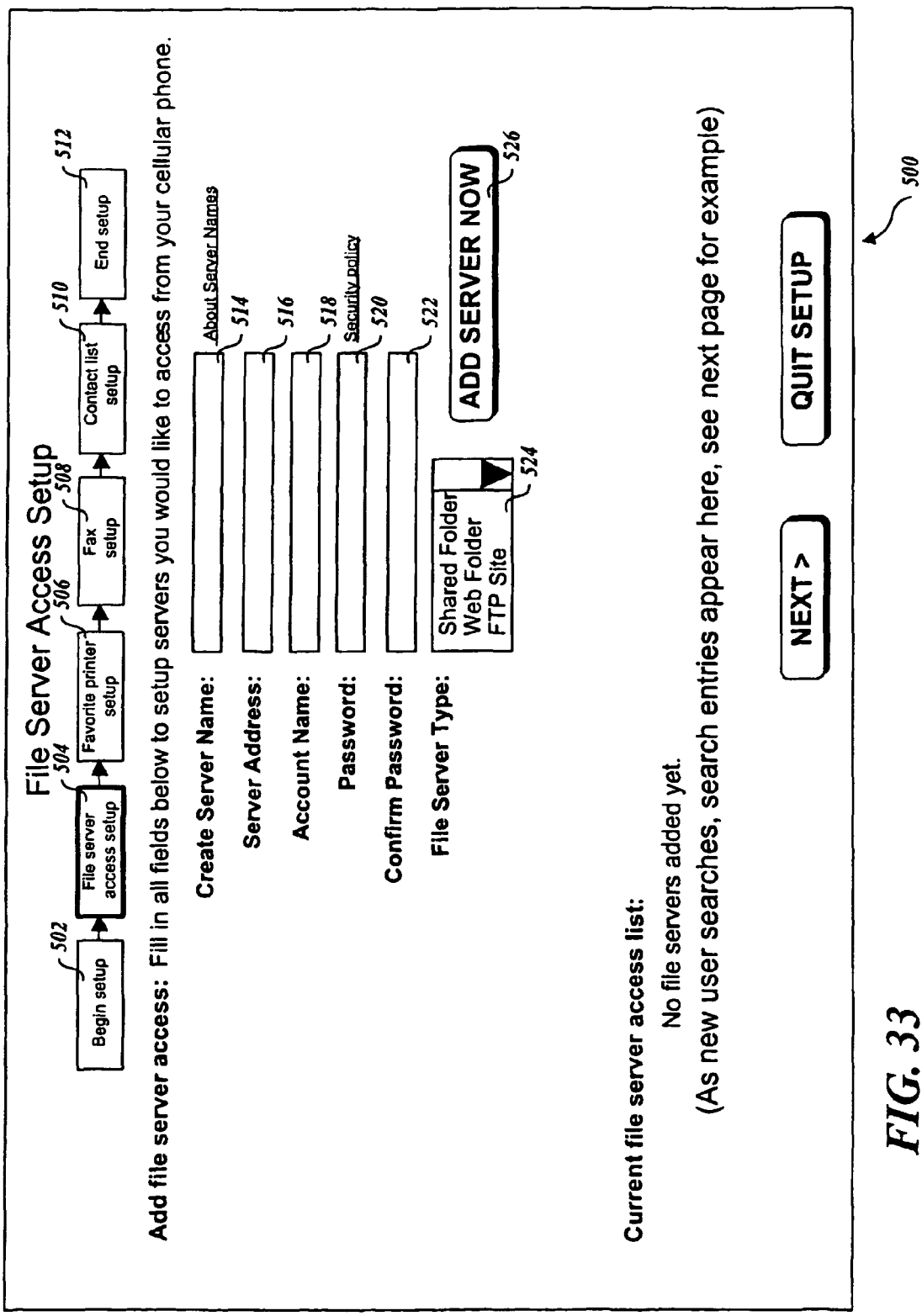
FIG. 33 is a representation of a Web-based user interface (UI) that enables users to set up file server access via the output management system.
Figure 34:
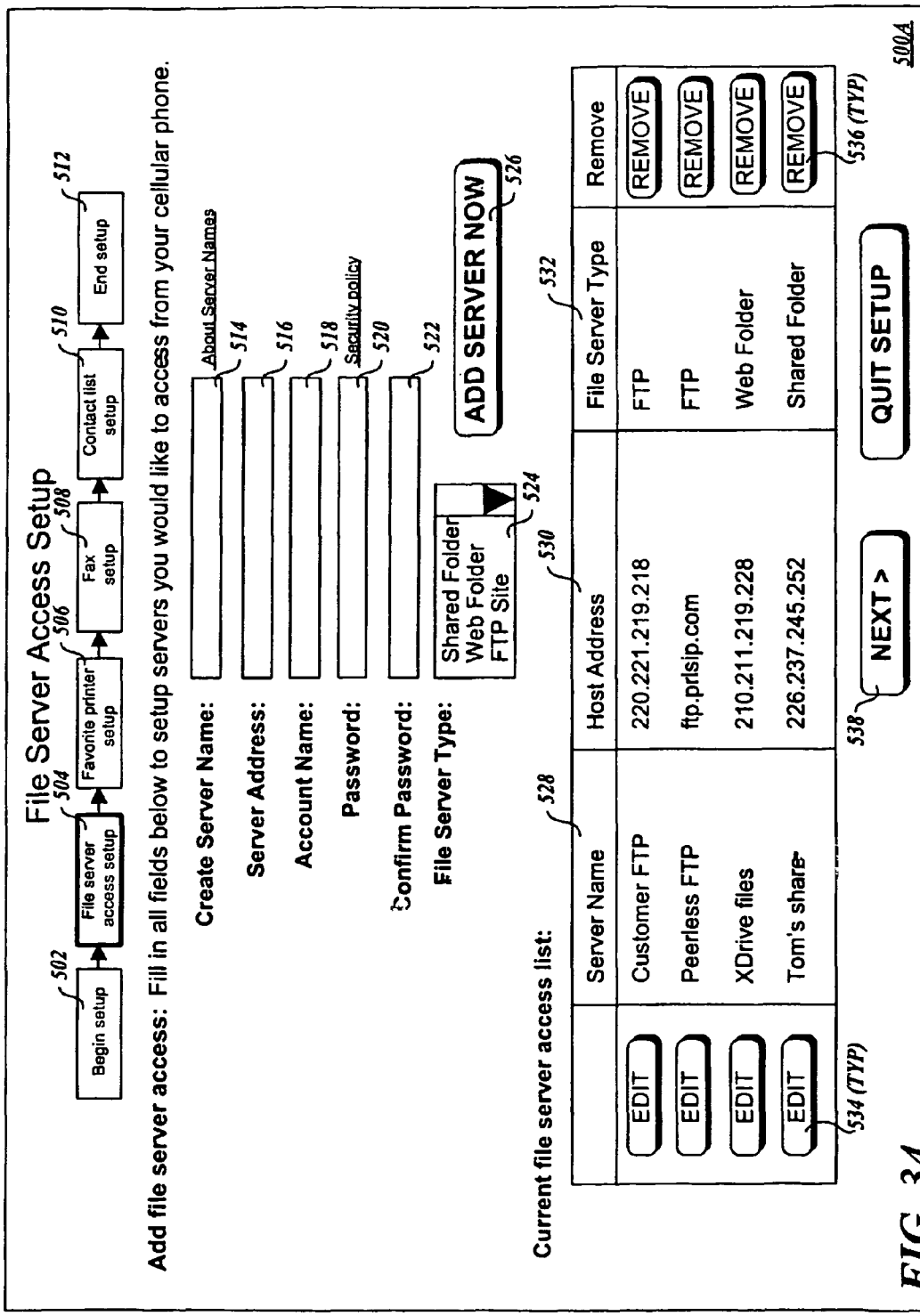
FIG. 34 is a representation of the Web-based UI of FIG. 33 after several file servers have been set up for access.

FIG. 33 illustrates a web page 500A depicting how web page 500 might appear after a user has added several servers. As shown in a server name column 528, the user may name the server any name the user desires (within a reasonable length limitation, such as 32 letters). Since the Network Sites table references the Subscriber table via a SUB_ID foreign key and uses a surrogate primary key (SITE_ID), multiple users can use identical server names without causing confusion, such as myServer, home_network, etc. However, the only servers visible to the user will be those the user has previously registered.

The user may identify a server (host) address using either an IP address (e.g., 200.221.219.218) or a domain name (e.g., ftp.prlsip.com), as shown in a Host Address column 530. A File Server Type column 532 lists the server type of the servers that the user has added. Changes to these parameters may be made through activation of an "EDIT" button 534, while a server may be removed via a "REMOVE" button 536.

Figure 35:
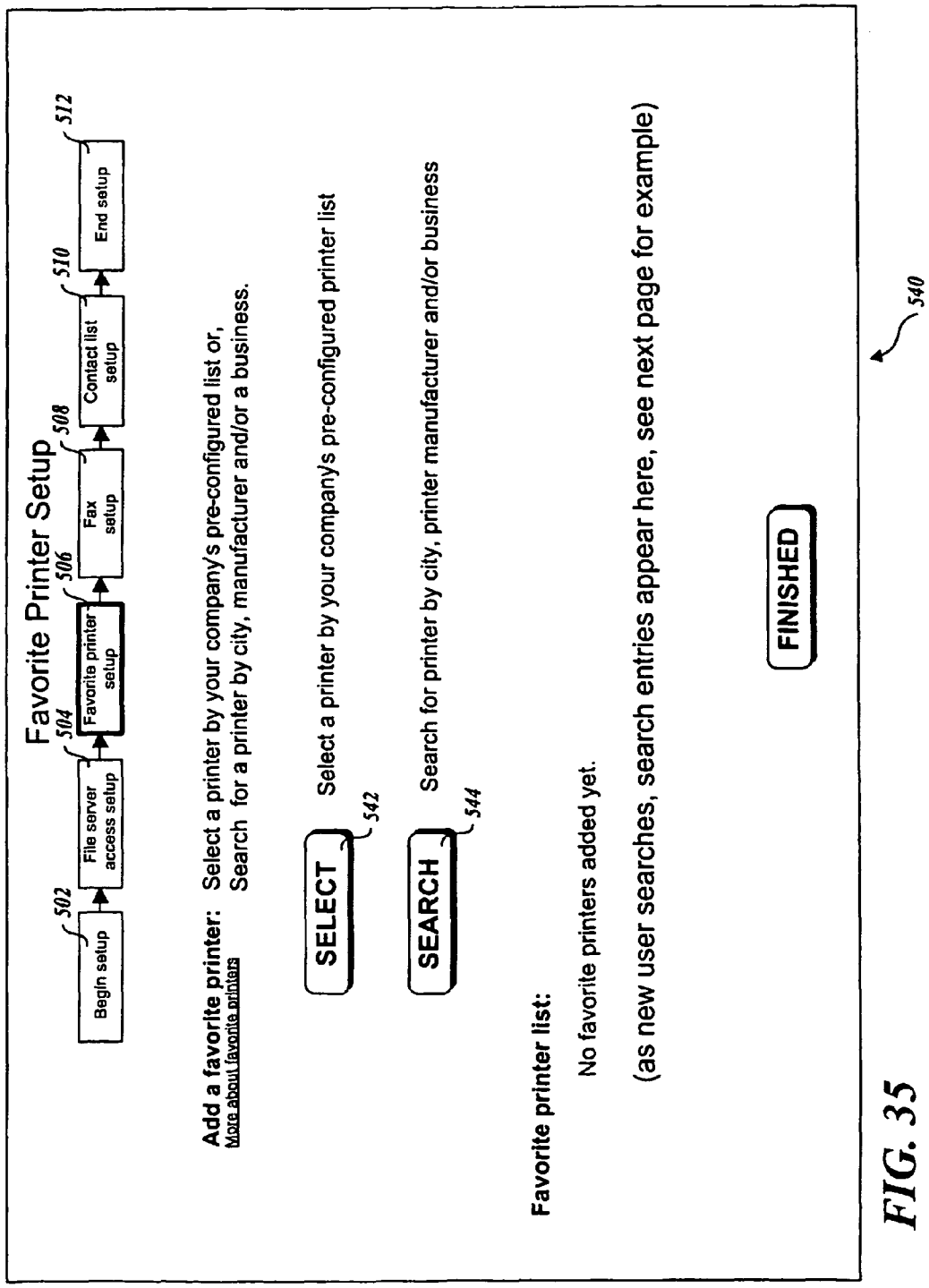
FIG. 35 is a representation of a Web-based UI that enables users to set up a list of favorite printers.
Figure 36:
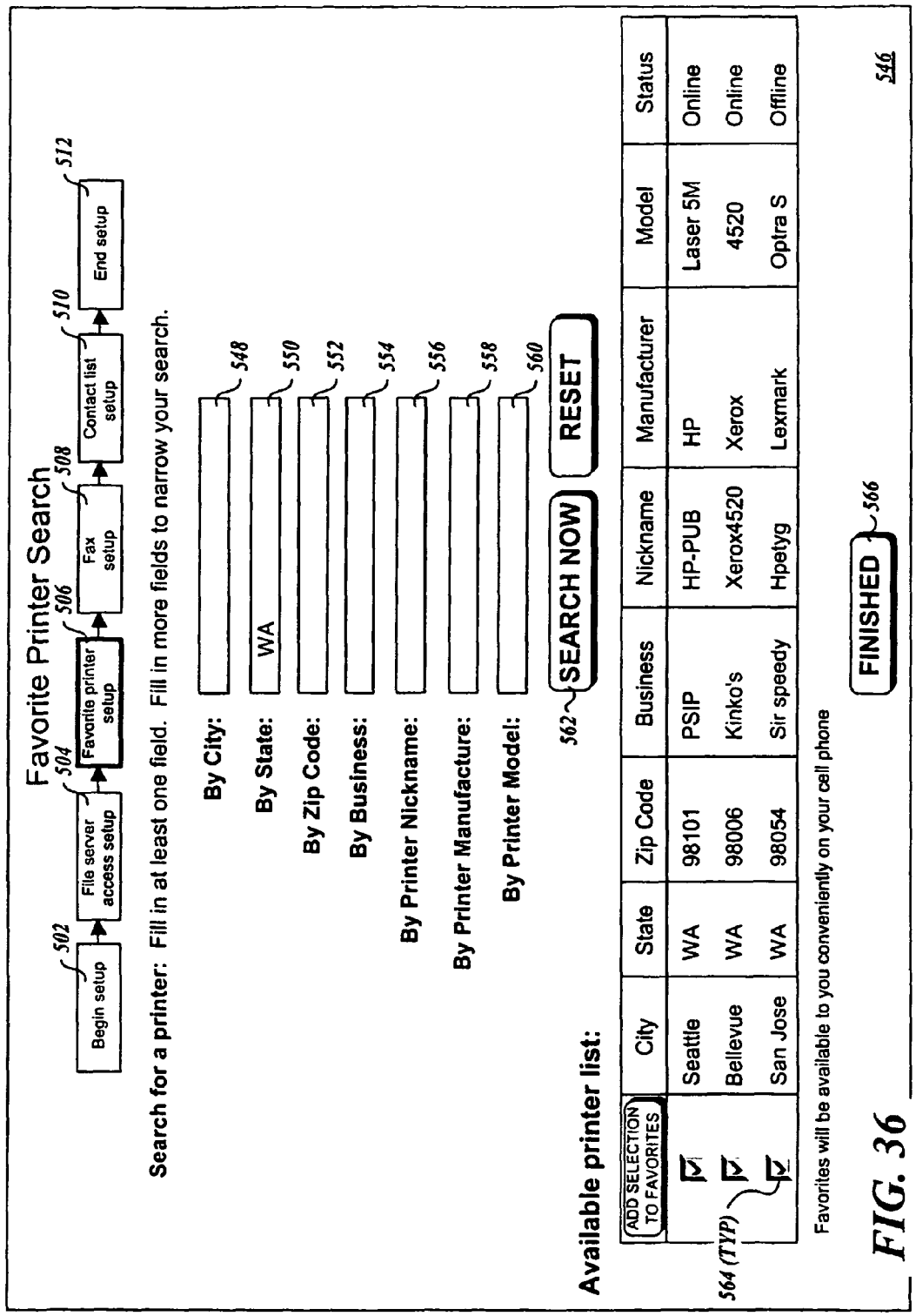
FIG. 36 is a representation of a Web-based UI that enables users to search a printer that has been previously configured by a system administrator.
Figure 37:
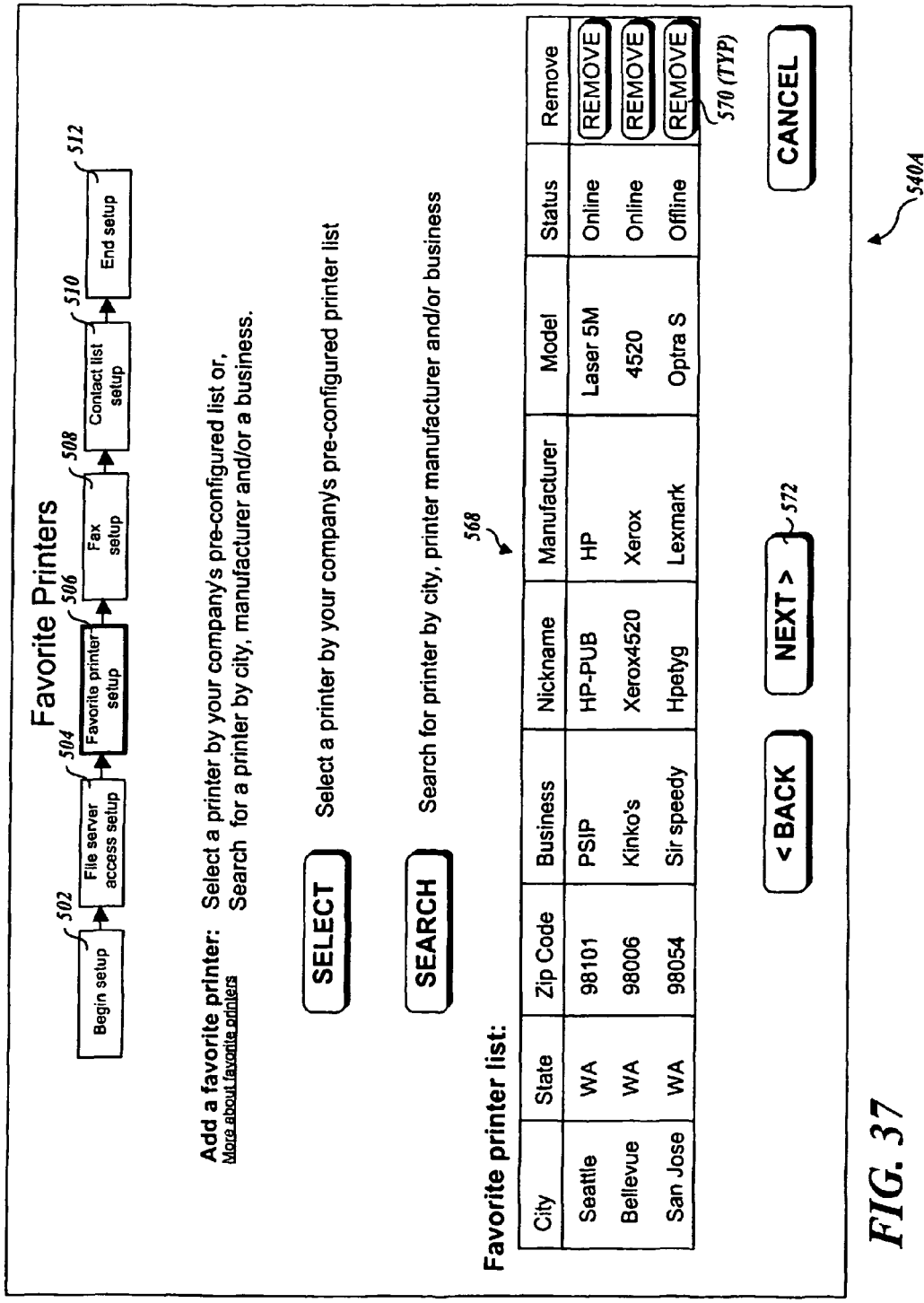
FIG. 37 is a representation of the Web-based UI of FIG. 35 after several printers have been added to a list of favorite printers.

After the user has set up his or her servers, the user will activate a "NEXT>" button 538, advancing the setup process to favorite printer setup operation 506, as illustrated by a Web page 540 in FIG. 35. At this point, the user is presented with two options for selecting printers (i.e., output devices). Activation of a "SELECT" button 542 enables the user to search for printers in a pre-configured print list, while activation of a "SEARCH" button 544 enables the user to search for a printer via one or more input parameters. In general, the pre-configured print list will be configured by an administrator for the company or enterprise the user works for via a separate set of administration web pages only available to administrators. The user will be presented with a list of printers, and may select one or more printers in the list as "favorite" printers.

Activation of SEARCH button 544 will cause a Web page 546 to be served to the user. This Web page includes several edit boxes in which the user can selectively enter search information, including a "By City" edit box 458, a "By State" edit box 550, a "By Zip Code" edit box 552, a "By Business" edit box 554, a "By Printer Nickname" edit box 556, a "By Printer Manufacture" edit box 558, and a "By Printer Model" edit box 560. In response to activation of a "SEARCH NOW"

button 562, the system will attempt to identify any registered printers that are both available to the user and meet the users search criteria. For example, an exemplary set of three printers is returned in response to a search criteria value of Washington entered in "By State" edit box 550. Printers in the returned list can then be selected to be added to a user's printer list by checking a checkbox 564 corresponding to each row in the list. The user will then activate a "FINISHED" button 566 to save the selected printers, returning the user to back to the Web page 540(A). This time, the Web page will show any previously selected printers in a favorite printer list 568. If desired, the user may remove a printer from the list via an activation button 570.

After the user has added printers to his or her favorites list, the user will activate a "NEXT>" button 572, causing the setup process to proceed to fax setup operation 508. This will forward the user to a series of fax setup Web pages (not shown). These pages enable users to select default outgoing faxes and to pre-configure facsimile cover pages. Subsequently, the user may selectively add contact information during contact list setup operation 510 through use of a set of contact list setup Web pages (not shown). The contact information enables users to more easily send documents and faxes to people listed in their contact lists.

WAP UI Examples

Figure 20:
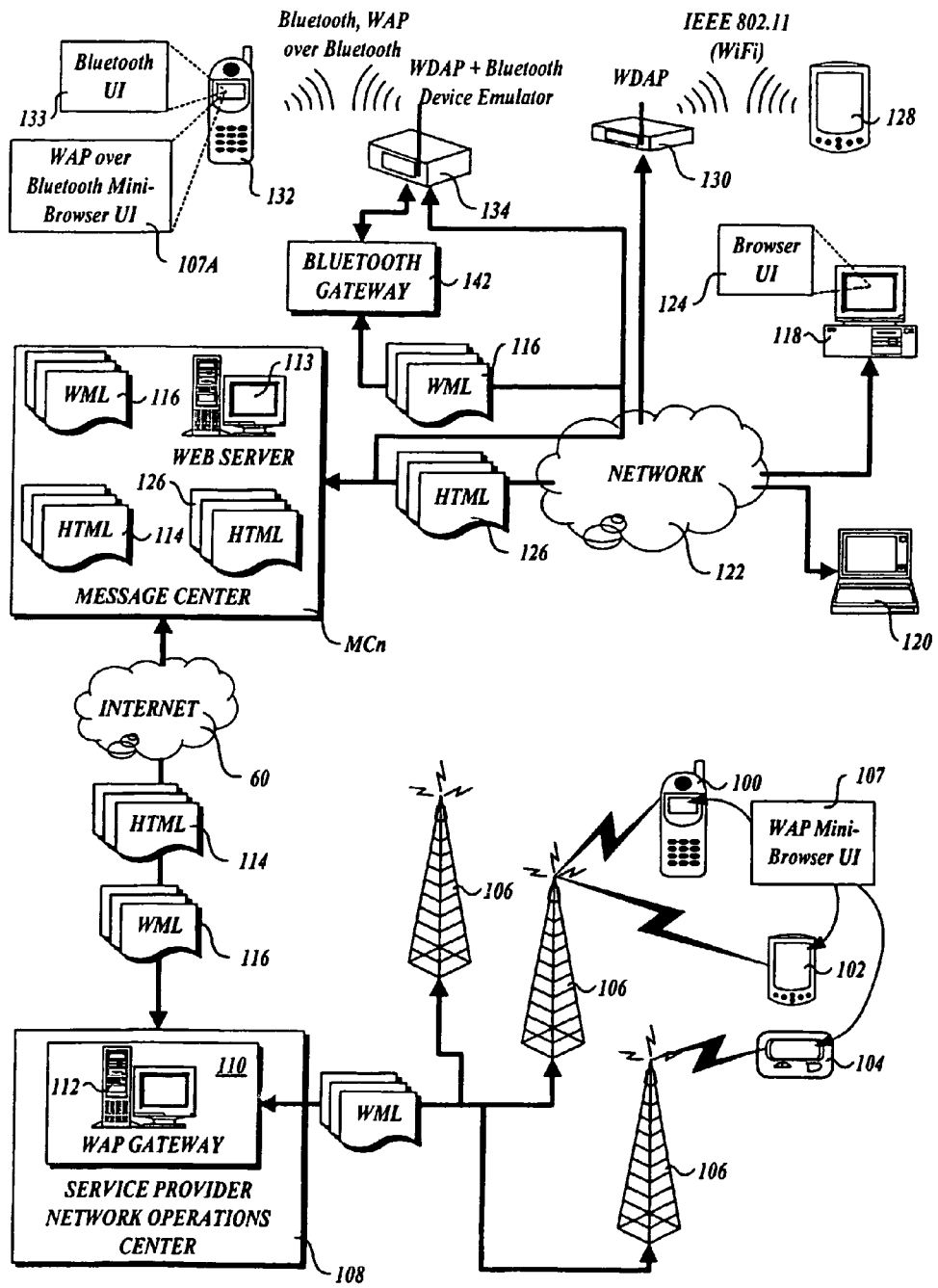
FIG. 20 is a schematic diagram illustrating the three primary access mechanism for interacting with the Message Centers in the system.

As discussed above, in one embodiment wireless-web enabled devices are enabled to access the system via WAP gateway 110 (FIG. 20). WAP interfaces comprises a "deck" of "cards" that are roughly analogous to HTML-based Web pages, except that they are encoded in WML and contain significantly less data. Furthermore, WAP cards are designed so that they can be navigated with a minimal user interface. With reference to the legend of FIG. 38, details of various WAP cards and operations corresponding an exemplary WAP-based user interface are shown in FIGS. 39-52. In one embodiment, a set of CGI scripts are used to automatically generate the WAP cards.

Figure 39:
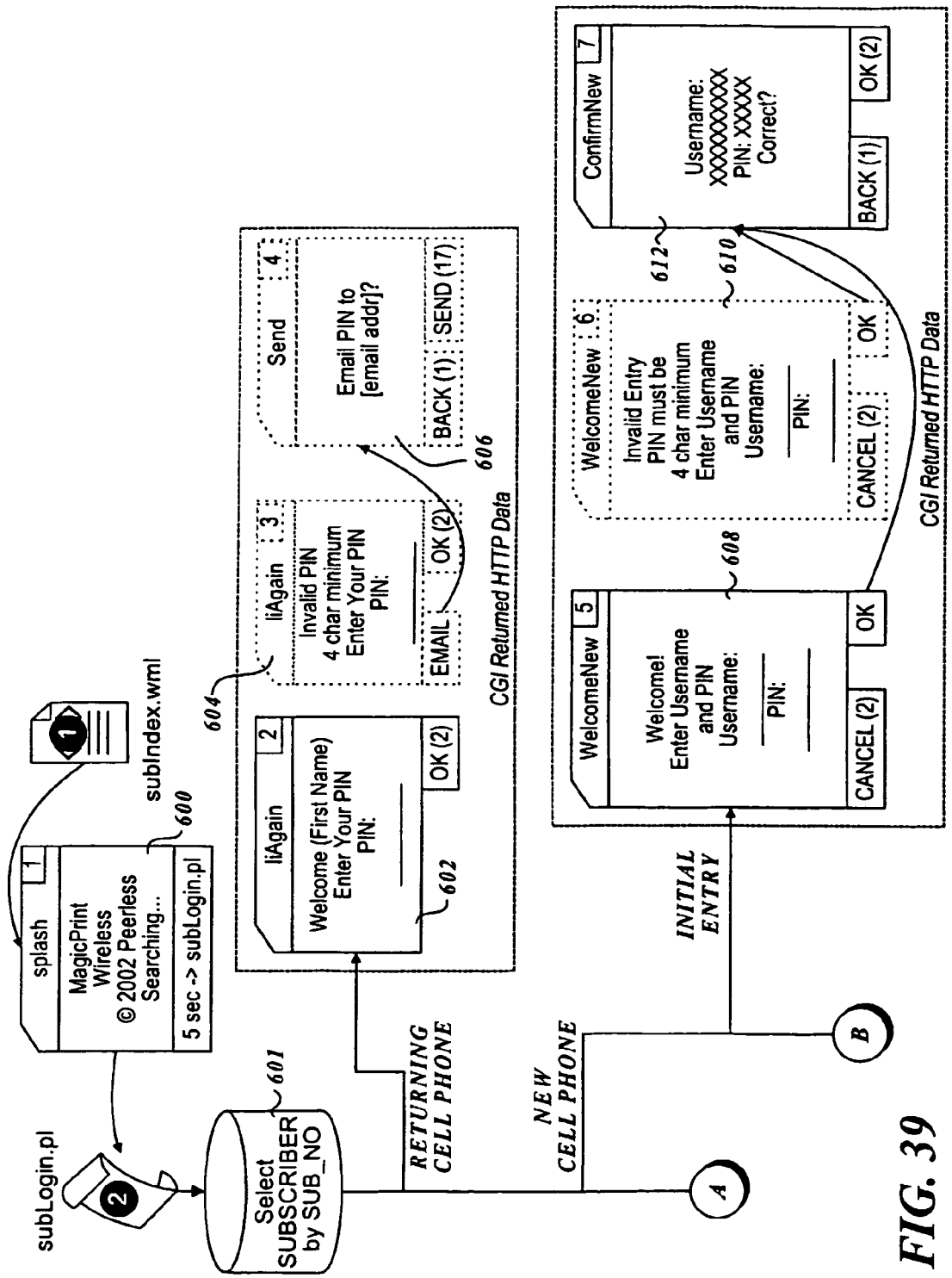
FIG. 39 is a first portion of a WAP UI flow diagram corresponding to a subscriber login process.
Figure 40:
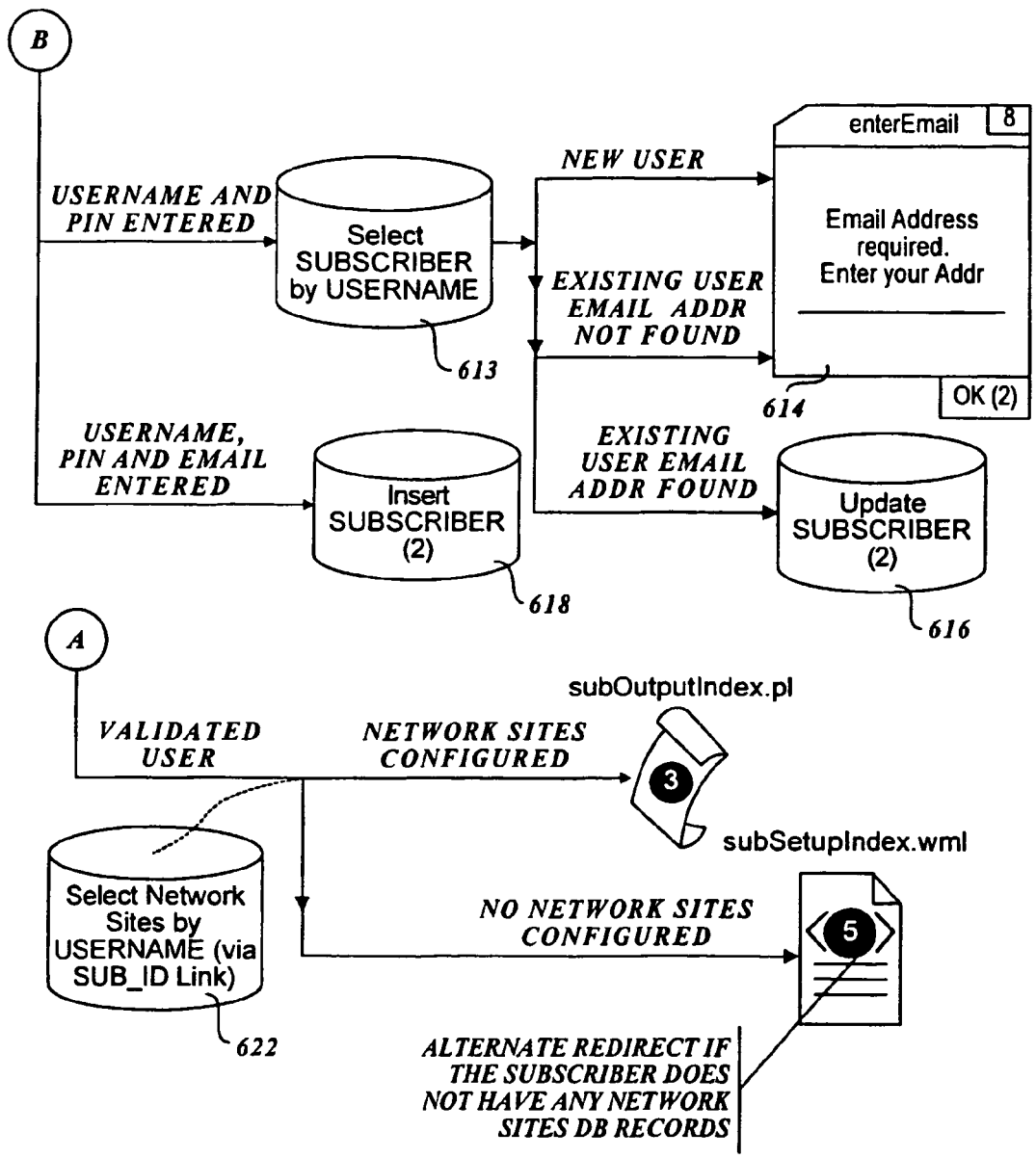
FIG. 40 is a second portion of the WAP UI flow diagram of FIG. 39.

With reference to FIGS. 39 and 40, a user accesses the system with a WAP-enabled device in the following manner. First, the user access his or her wireless Internet gateway in the manner discussed above. The user will then enter the URL for the system, either directly or through a recalled link (i.e., favorite link, etc.) A splash screen 600 will then be served to the user corresponding to a WAP card 1. During the initial portion of the login, the system will identify the wireless device (e.g., through the devices phone number or other unique identifier) and attempt to retrieve information corresponding to the device via the Subscriber table in Message Center database 228 via a database query 601. If the device is recognized, the user has previously registered the device with the system. Accordingly, the user will be presented with a login screen 602 corresponding to a WAP card 2. The users first name (or other identifier) will be presented on the screen based on previously entered information in the Subscriber table and the user will be asked to enter his or her PIN. If the entered PIN matches the stored PIN the user will be logged into the system. If not, the user will be presented with a screen 604 requesting re-entry of the PIN. If the PIN entry fails again, the user will be presented with a screen 606 asking if the user desires the PIN to be e-mailed to the user.

If the user's wireless device is new to the system, the result of database query 601 will be Null, and the logic will proceed to an initial entry screen 606 in which the user enters a Username and PIN. If an invalid PIN is entered, a screen 610 will be displayed on the device requesting entry of a new PIN. Upon a successful PIN entry, a confirmation screen 612 will be presented to the user. With reference to FIG. 40, once the Username and PIN have been entered, a database query 613 is made of the Subscriber table to retrieve the user's e-mail address. If the user is a new user or the e-mail address isn't found, the user is requested to enter an e-mail address via a screen 614. If an existing user e-mail address is found, the Subscriber table entry for the new device will be updated via a database query 616. Alternately, once the new Username, PIN and e-mail address is entered, a new subscriber record is inserted into the Subscriber table via a database query 618.

Once the user is validated, a determination is made to whether the user has any previously configured network sites via a database query 622. If the user has previously configured network sites the logic proceeds to execute a CGI script 3, details of which are shown in FIG. 41; otherwise the logic jumps to a navigation location 5 shown in FIG. 43.

With reference to FIG. 41, in response to execution of CGI script 3, the user will be presented with a site selection screen 624 that enables the user to select a network site from which the source data corresponding to a document the user desires to print is located. If desired, the user may select to setup a new network site, which will jump the logic to navigation location 5.

Figure 42:
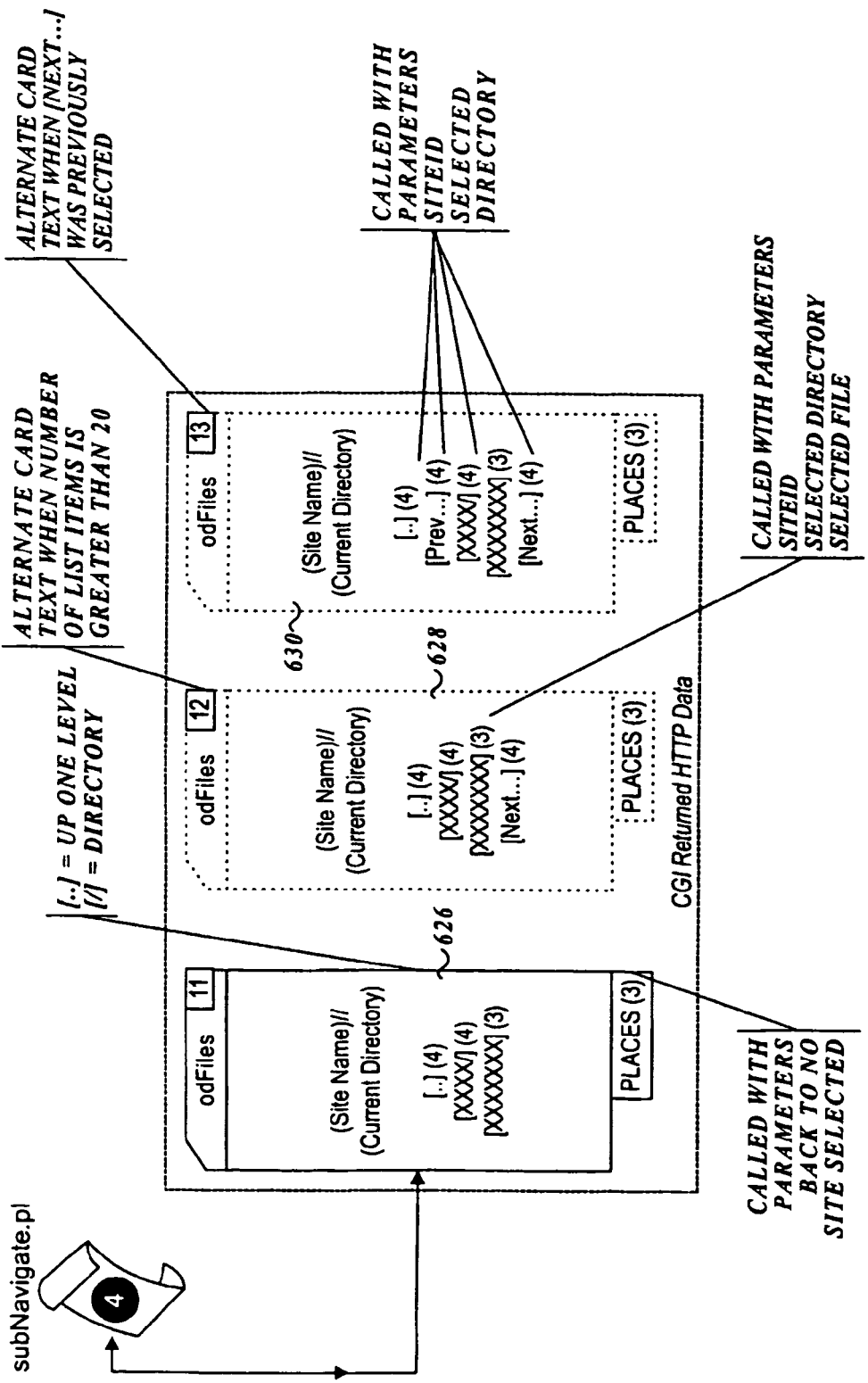
FIG. 42 is a WAP UI flow diagram corresponding to a set of cards that enable navigation of a network to search for documents to output.
Figure 43:
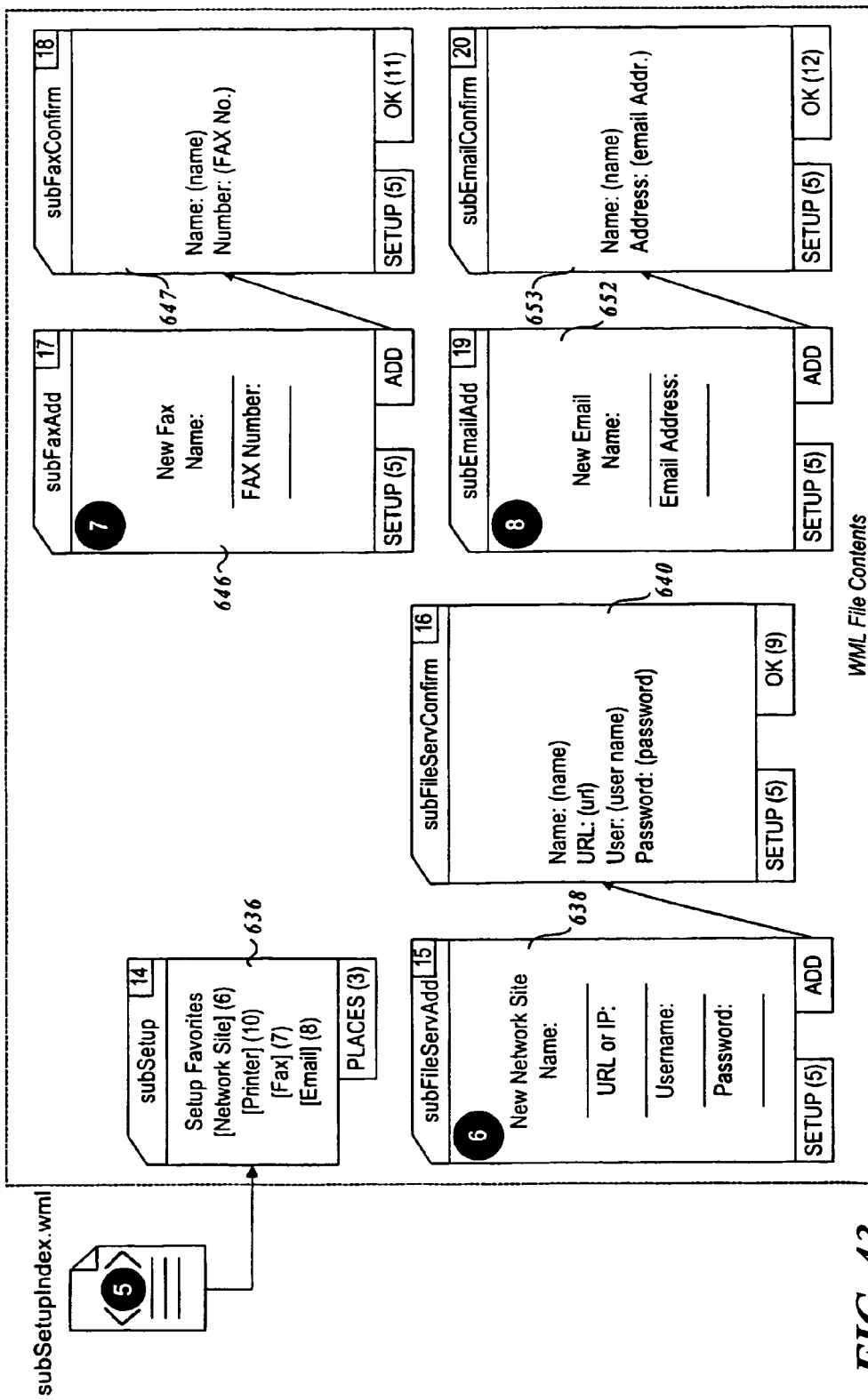
FIG. 43 is a WAP UI flow diagram corresponding to adding Network sites, Fax machines, and e-mail addresses.

Once a network site has been selected, execution of a CGI script 4 begins, which generates the network navigation screens 626, 628, and 630 shown in FIG. 42. These screens enable the user to navigate a network site to browse for the document file the user desires to print. Once the user has selected the document, CGI script 3 is used to generate a screen 632 in which the network site name and document file name are displayed. This screen further enables the user to select what type of output the user desires, via Print, FAX and Email options 634.

Figure 44:
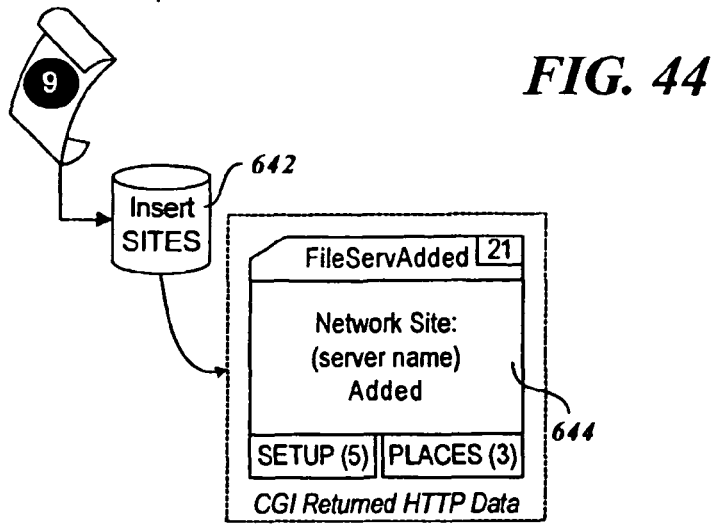
FIG. 44 is a WAP UI used to inform a user that a Network site has been added to the user's list of network sites.

With reference to FIG. 3, upon jumping to navigation location 5, the user is presented with a setup screen 636. This screen enables the user to setup various favorites, including Network Sites, Printers, and define Fax and E-mail information. Selection of the Network Site option advances the user to a file server add screen 638 via which the user can add a new network site by providing a URL or IP address, Username and Password in a manner similar to that discussed above with reference to adding new network sites via Web page 500. As before, the Username and Password pertain to the particular network that is to be added. Upon selecting to add the network site, the user is presented with a confirmation screen 640. As shown in FIG. 44, once a user has selected to add the network site via the OK option, CGI script 9 is executed to store the entered data into the Network Sites table via a database query 642, whereupon a screen 644 is rendered on the user's device confirming that the server has been added.

Figure 46:
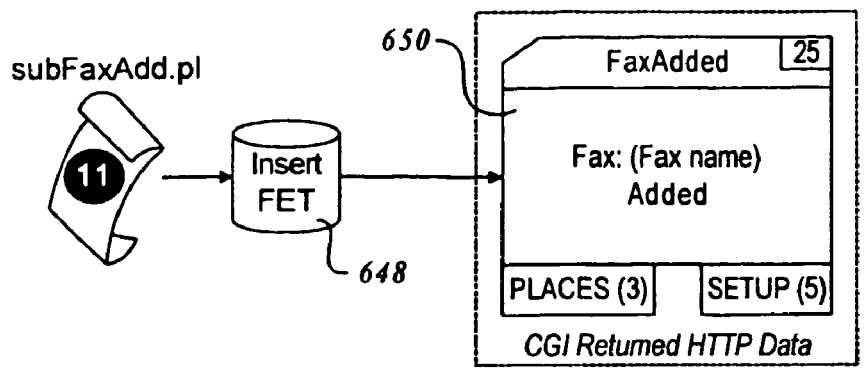
FIG. 46 is a WAP UI used to inform a user that a Fax machine has been added to a user's list of Faxes.

In response to selection of the FAX option from screen 636, the user is presented with an add fax screen 646, via which a user can enter a new fax by specifying a name and fax number. Once the user selects to add the fax data the user will be presented with a confirmation screen 647, and, upon selection of the OK option CGI script 11 is executed to insert a new record in the FAX/E-mail Table (FET) via a database query 648, as shown in FIG. 46. The user is then presented with a screen 650 that confirms the fax data has been added.

Figure 47:
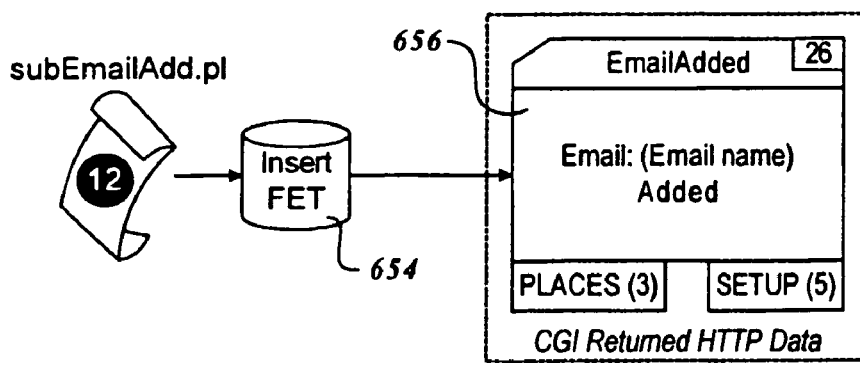
FIG. 47 is a WAP UI used to inform a user that an e-mail name has been added to a user's list of contacts.
Figure 48:
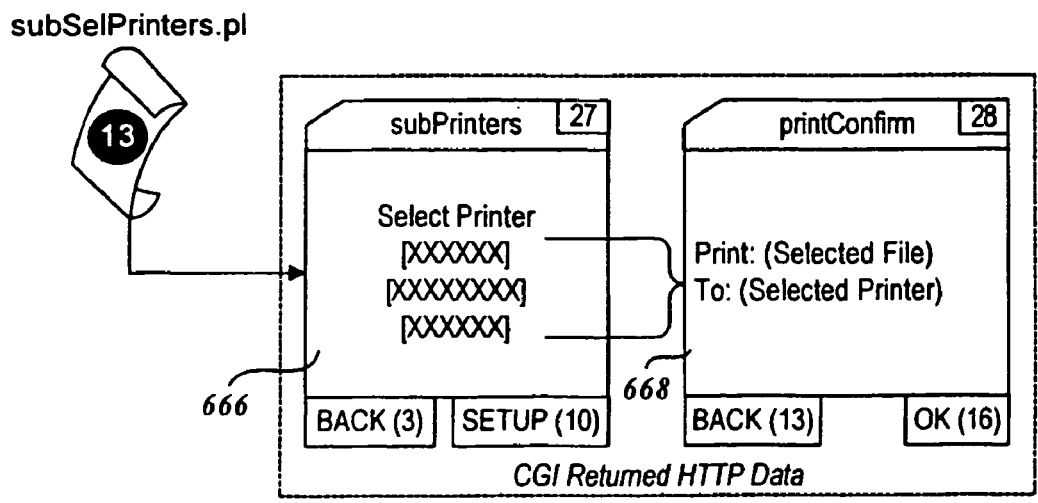
FIG. 48 is a WAP UI flow diagram corresponding to a confirmation of a selected document and output device.

Similarly, in response to selection of an Email option from screen 636, the user will be presented with an e-mail add screen 652, wherein the user will enter an e-mail name (i.e., alias) and E-mail address and then select to add the new e-mail information, whereby the user will be presented with a confirmation screen 653. Upon acceptance via the OK option, CGI script 12 is executed to insert a new record in the FET table via a database query 654, as shown in FIG. 47. The user is then presented with a screen 656 that confirms the e-mail data has been added.

Figure 45:
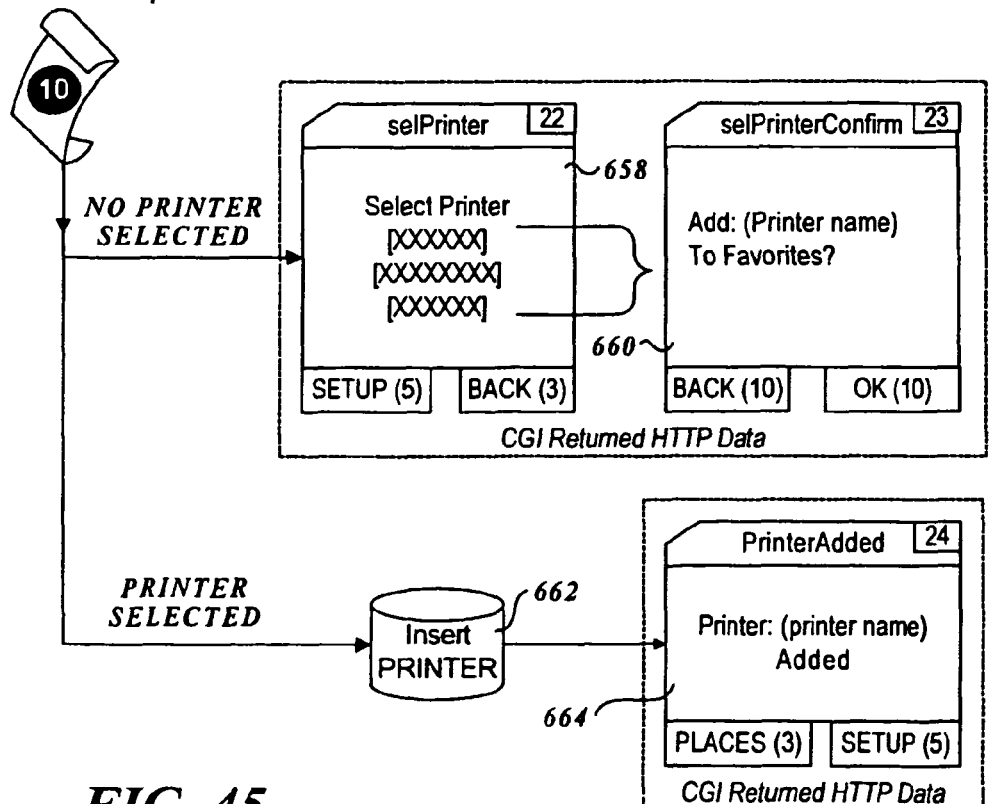
FIG. 45 is a WAP UI flow diagram corresponding to adding a new printer to a list of favorite printers.

As shown in FIG. 45, in response to selection of the Printer option from screen 636, the user is presented with an add printer screen 658, via which a user can select a printer to add via search criteria similar to that discussed above with reference to Web pages 540 and 546. Once the user selects to add a printer via the returned selection list, the user will be presented with a confirmation screen 660, and, upon selection of the OK option a new record in the Printer table will be added via a database query 662. The user is then presented with a screen 664 that confirms the new printer has been added.

Figure 52:
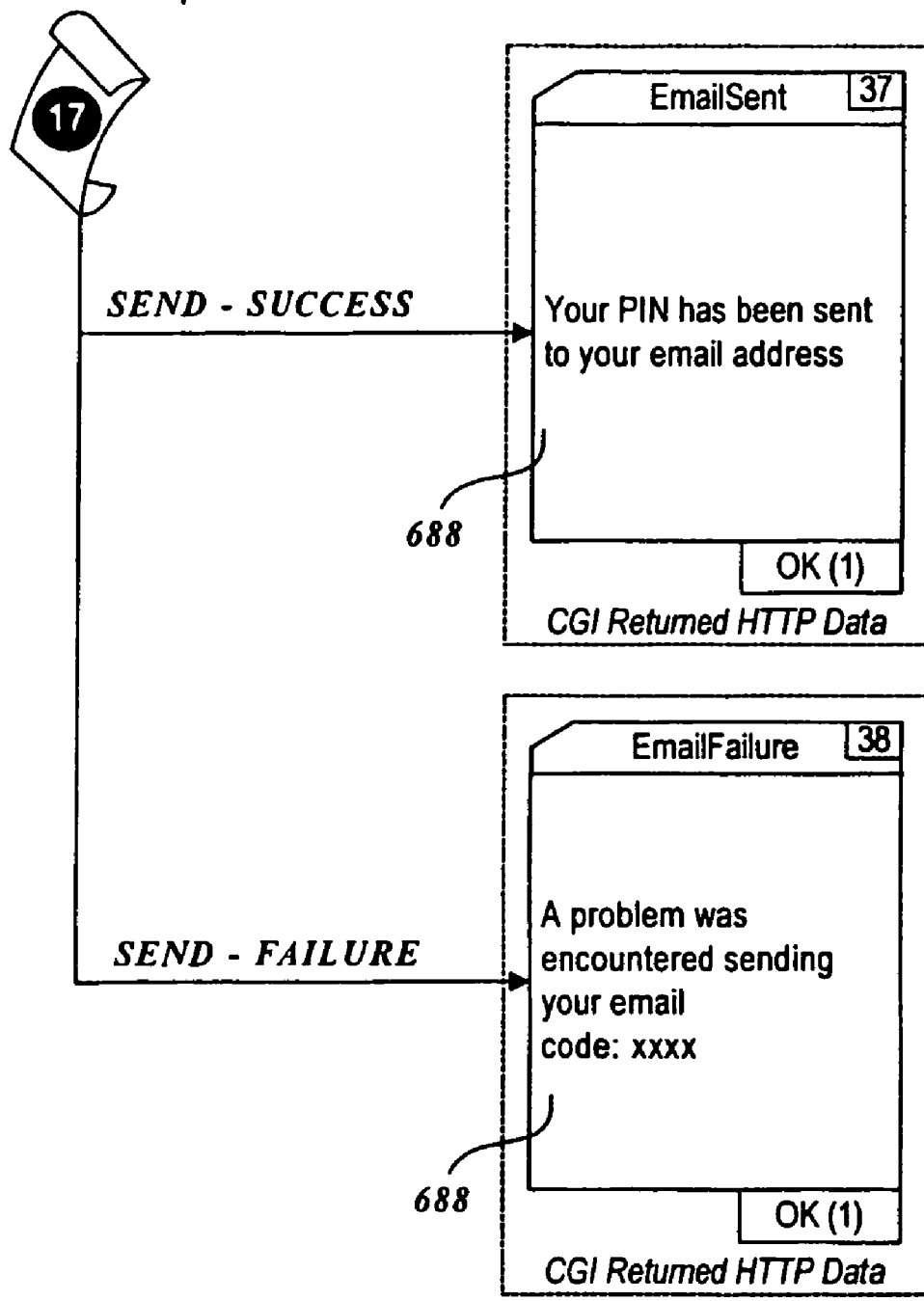
FIG. 52 is a WAP UI flow diagram indicating whether a PIN was successfully sent to a user via e-mail in response to a user request to do so.

Returning to screen 632 in FIG. 41, once a the document file has been selected, the user may either Print the document on a selected print, fax the document to a selected fax machine (via the machine's fax number), or e-mail the document to a selected e-mail recipient via Print, FAX and Email options 634. Activation of the Print option launches CGI script 13, which generates a printer selection screen 666 shown in FIG. 48. This screen enables the user to select a printer from among printers that have been previously added to a user's favorite printer list. Upon selection of a printer in the list, the user is presented with a configuration screen 668 identifying the document to be printed and the selected printer. Activation of the OK option causes CGI script 16 to be executed, as shown in FIG. 52. In accordance with a print request, a corresponding print job will be placed in the Print Queue table via a database query 670, and a job queue confirmation screen 672 will be presented to the user. Once the print job has been queued, it is processed by an appropriate combination of Message Centers, RDC's and a Print Service to cause the document to be printed on the selected printer in the manner discussed above.

Figure 49:
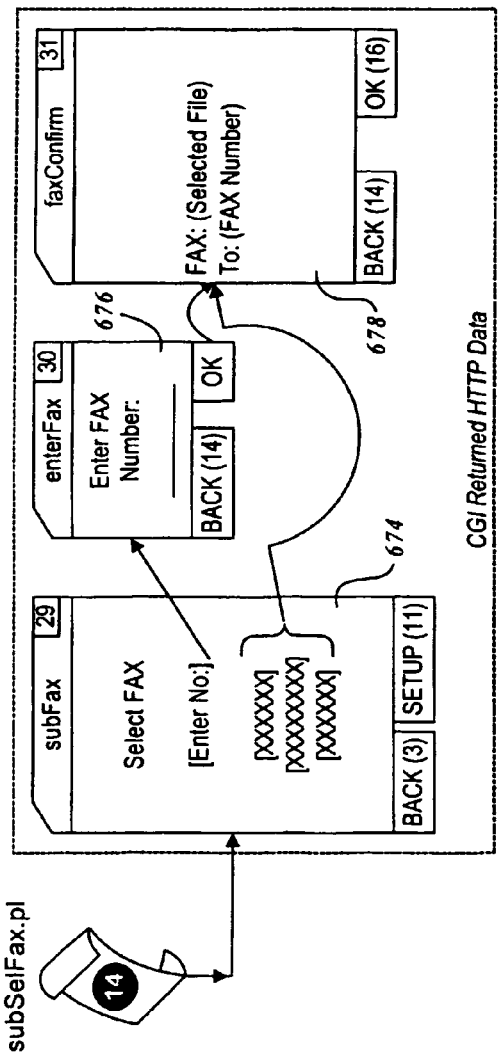
FIG. 49 is a WAP UI flow diagram corresponding to adding a new Fax to a user's list of favorite Faxes.

Activation of the FAX option from screen 632 launches CGI script 14, which generates a FAX selection screen 674 shown in FIG. 49. This screen enables the user to select a Fax from among Faxes that have been, previously added to a user's favorite Fax list, or to enter a number for a Fax machine that isn't already setup in the Fax list. If the user selects to enter the number for the latter, the user is presented with a screen 676 by which the number can be entered. Selection of the OK option from screen 676 or selection of a pre-configured Fax from screen 674 will cause a confirmation screen 676 to be rendered. Upon selection of the OK option, CGI script 16 will be executed, wherein in this instance Fax job information will be inserted into a Fax/Email Queue table via a database query 678. Once the fax job has been queued, it is processed by an appropriate Message Center, which will generate fax data corresponding to the document in a manner somewhat similar to how a Print Service processes a document for printing, and send the fax data to the destined fax machine based on its fax number.

Figure 50:
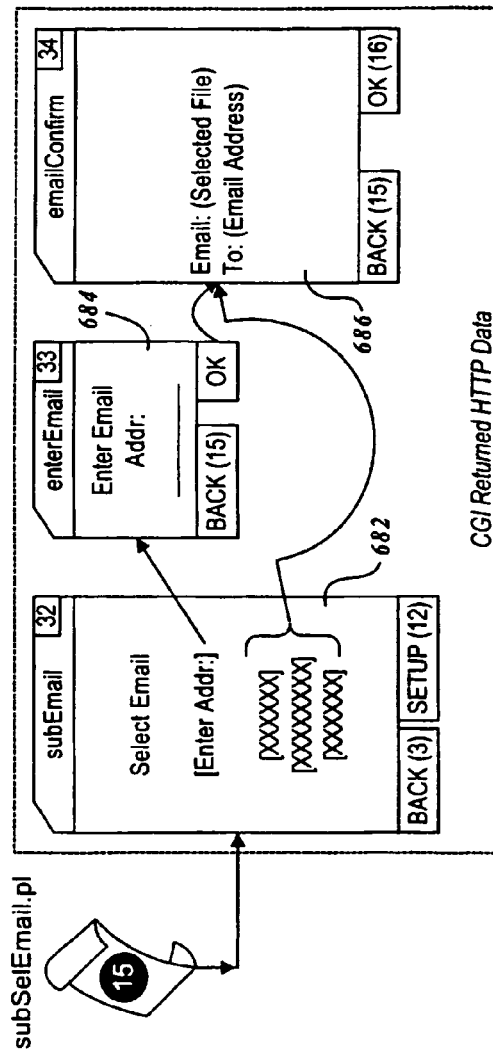
FIG. 50 is a WAP UI flow diagram corresponding to adding a new e-mail contact to a user's list of contacts.
Figure 51:
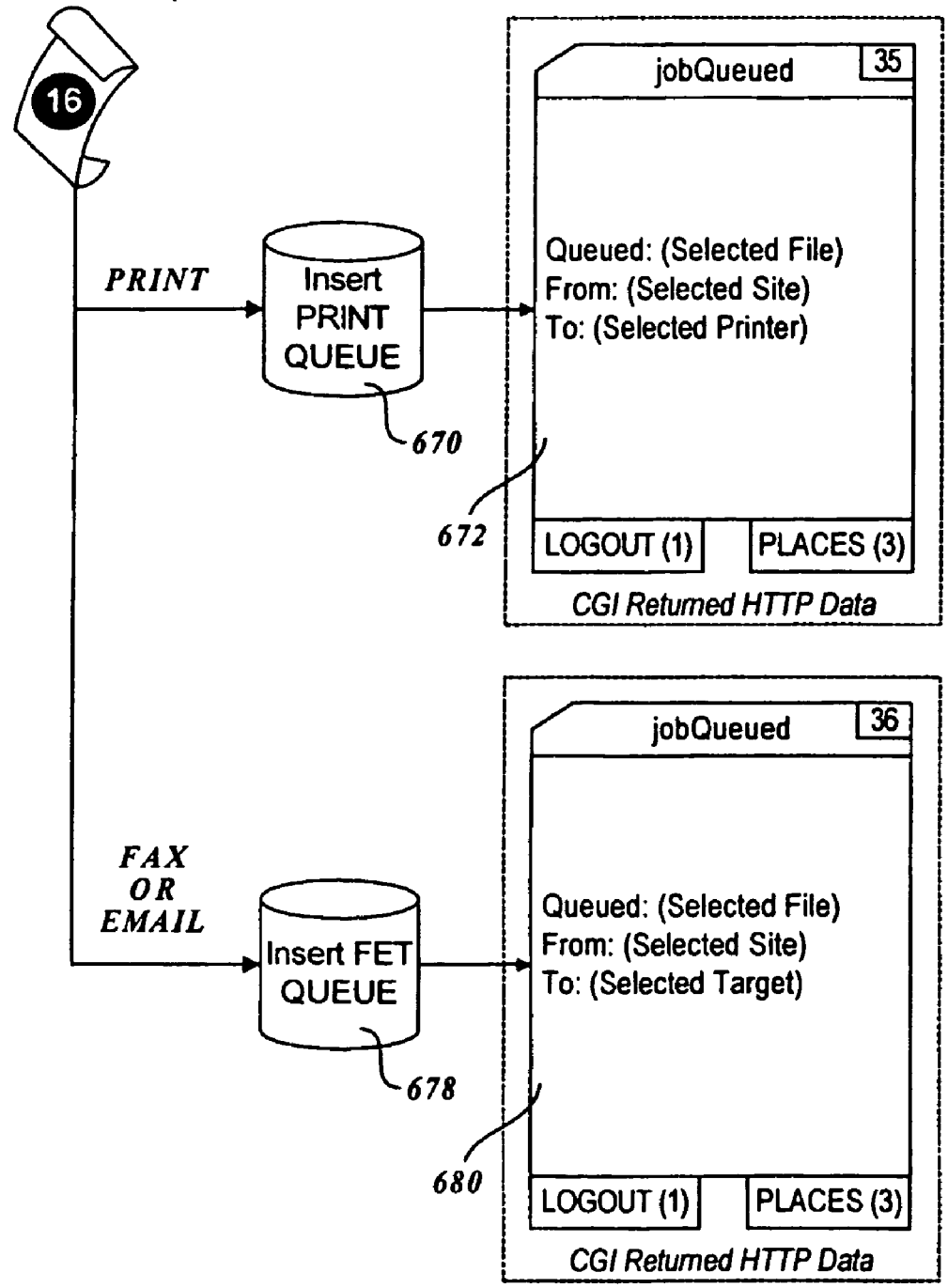
FIG. 51 is a WAP UI flow diagram corresponding to the insertion of print, fax, and e-mail jobs into corresponding job queues.

Processing of an e-mail request proceeds in a manner similar to a Fax request. This process is initiated by activation of the Email option from screen 632, which launches CGI script 15, as shown in FIG. 50. This CGI script first generates an e-mail selection screen 682, which enables the user to select a e-mail address to send the document to from among the user's previously configured list of favorite e-mail recipients (via corresponding e-mail aliases), or to enter a new e-mail address for someone who isn't already configured. If the user selects to manually enter the unlisted e-mail address, the user is presented with a screen 684 via which the address can be entered. Selection of the OK option from screen 684 or selection of a pre-configured e-mail recipient from screen 682 will cause a confirmation screen 686 to be rendered. Upon selection of the OK option, CGI script 16 will be executed, wherein in this instance e-mail job information will be inserted into a Fax/Email Queue table via database query 678. Once the e-mail job has been queued, it is processed by an appropriate Message Center, which will generate an e-mail message with the selected document file attached, and send the e-mail message to the selected recipient via the recipient's e-mail address or via the e-mail address that was entered via screen 684. Optionally, the content of the document may be included in the main body of the e-mail. Further details of e-mail generation are discussed in co-pending U.S. patent application Ser. No. 10/104,528, entitled METHOD AND SYSTEM TO PRINT VIA E-MAIL," filed Mar. 21, 2002, the specification and drawing figures of which are included herein by reference in their entirety.

Returning to screen 606 in FIG. 39, in response to a user request to have his or her PIN sent via e-mail, the system will retrieve the PIN for the user from Message Center database 228, automatically generate an e-mail identifying the user by name and including the PIN, and send the e-mail back to the user via the user's previously-registered e-mail address. CGI script 17 is then executed, as shown in FIG. 52. If the e-mail message is successfully sent, a screen 688 is rendered identifying such. If a failure occurred in sending the e-mail address, a corresponding failure message is rendered on a screen 690.

Document Preview Navigation

One of the optional output methods of a job request is document preview. Due to the generally limited display capabilities (e.g., small screens, non-standard aspect ratios and low pixel resolutions), generating a preview of how a document will appear when rendered on the output device is a non-trivial and rather challenging task. In addition, the required response time of a preview request is much more stringent than a printing request. The output management system approaches these challenges in two directions. For image files, it creates dithered thumbnails and adjusts the final output size to fit the vertical and horizontal dimensions without losing the aspect ratio. For non-image files, it converts the files to a plain text format without losing the page relations, and breaks each page to a series of cards, then links these cards together with references to allow page navigation in vertical and horizontal directions.

A diagram 700 in FIG. 700 illustrates how the conversions take place. The process begins with original images 702. In the first row, a thumbnail 704 is produced based on the display capabilities of a Palm device 706, while in the second row a smaller thumbnail 708 is produced based corresponding to the much lower resolution of the screen provided by a cell phone 710. Note that the thumbnail for the cell phone does not cover the entire screen in order to preserve the aspect ratio.

A diagram 712 in FIG. 54 illustrates the text document viewing conversion process. As discussed the above, the text pages of the output document are broken down into WAP cards based on the text flow. For instance, the first 256 bytes of the page are converted to a first card (labeled "1"), the next 256 bytes are converted to a second card, and so on. The images in the original text pages will be replaced with image links in the cards to indicate their placement in the original context, as depicted by an image link 714 and preview image 716, respectively. Users may use these links to preview the images that are generated based on the aforementioned image viewing conversion mechanism. This layout allows page navigation in up-and-down directions as well as across different pages. Because the page relations are maintained, users may have random access to preview these pages as well.

Figure 55:
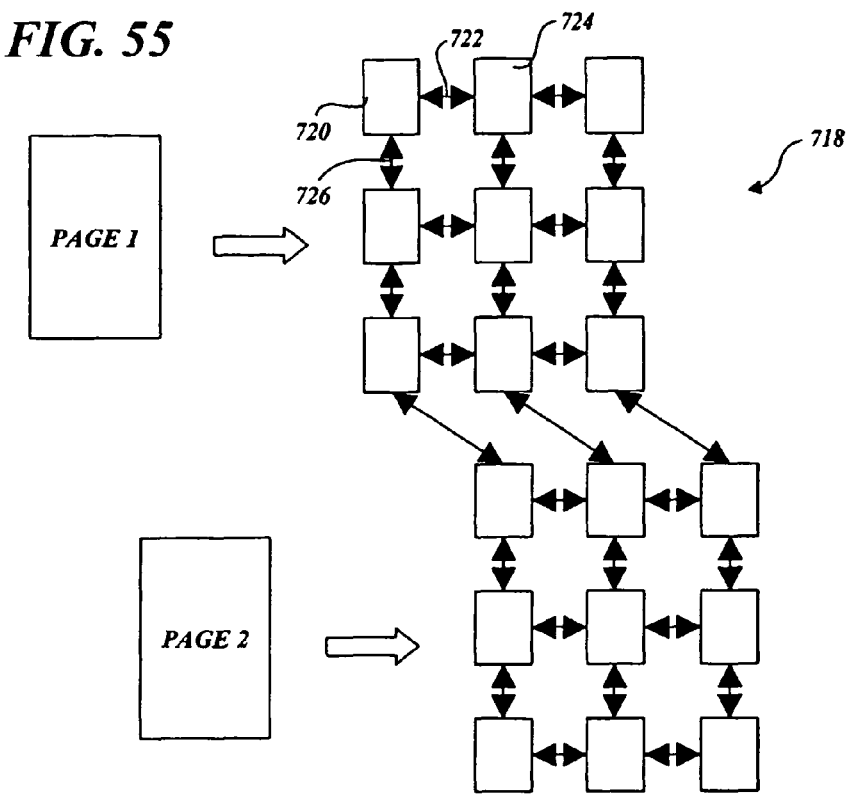
FIG. 55 is a schematic diagram illustrating how a user may navigate through portions of a spreadsheet document to preview how the document will appear when it is output on a selected output device.

In addition to sequential text documents, the system can provide previews for spreadsheet-type documents as well, as illustrated by a diagram 718 in FIG. 55. The difference between previewing a regular (i.e., sequential text) document and a spreadsheet is that the preview of a spreadsheet requires the preservation of its physical layout. Therefore the preview of the spreadsheet needs to be built in both vertical and horizontal dimensions. The example in FIG. 55 corresponds to a two-page spreadsheet document that is converted to two 9-card preview pages, each including two or more links (as applicable) to navigate to another page. For example, a first card 720 includes a "right" link 722 to a card 724 and a "down" link 726 to a card 728. Links are also provided to navigate between pages. Because the page relations are maintained, users may have random access to preview these pages as well.

Instant Messaging Integration

The rapid growing population and broad acceptance of the instant messaging technology have made instant messaging a great system for connecting users. Instant messaging enables users to exchange text messages, chat, and send images or voice greetings to friends and family in a simple manner, in a near real-time manner. However because it was originally designed for text exchange, it did not have the perception of information or resource sharing in general. The output management system therefore can step in to augment the deficiency.

The system enables instant messaging users to share their resources to their buddies. The resource is not restricted to its type, connectivity (internal or external, network or local), or the running platform, as long as the device is shared on the network. Resources include, but are not limited to, files, floppy or compact disk drives, and network file systems (i.e., shared file directories and the like). When users announce the availability of their shared resources, these resources will be visible to their buddies. Their buddies can then download a file from the other person's local directory by pressing a button, drag-and-drop a file to the other person's floppy or compact disk, view the other person's local drive directory by clicking the drive link, all without significant recurring system administration efforts other than the one-time output management system deployment in the instant messaging operation domain and have users to run the instant messaging tool with Remote Desktop Client enabled.

To accomplish the resource sharing in the instant messaging domain, the instant messaging client needs to be equipped with the Remote Desktop Client capability. The Remote Desktop Client helps the client machine to announce its shared resources by registering to a Message Center. Upon completion of the registration, the Client machine can send and receive resource-sharing requests. To improve the performance, the instant messaging operator should preferably install its own Message Centers to manage its clients instead of relying on the root Message Center.

Figure 56:
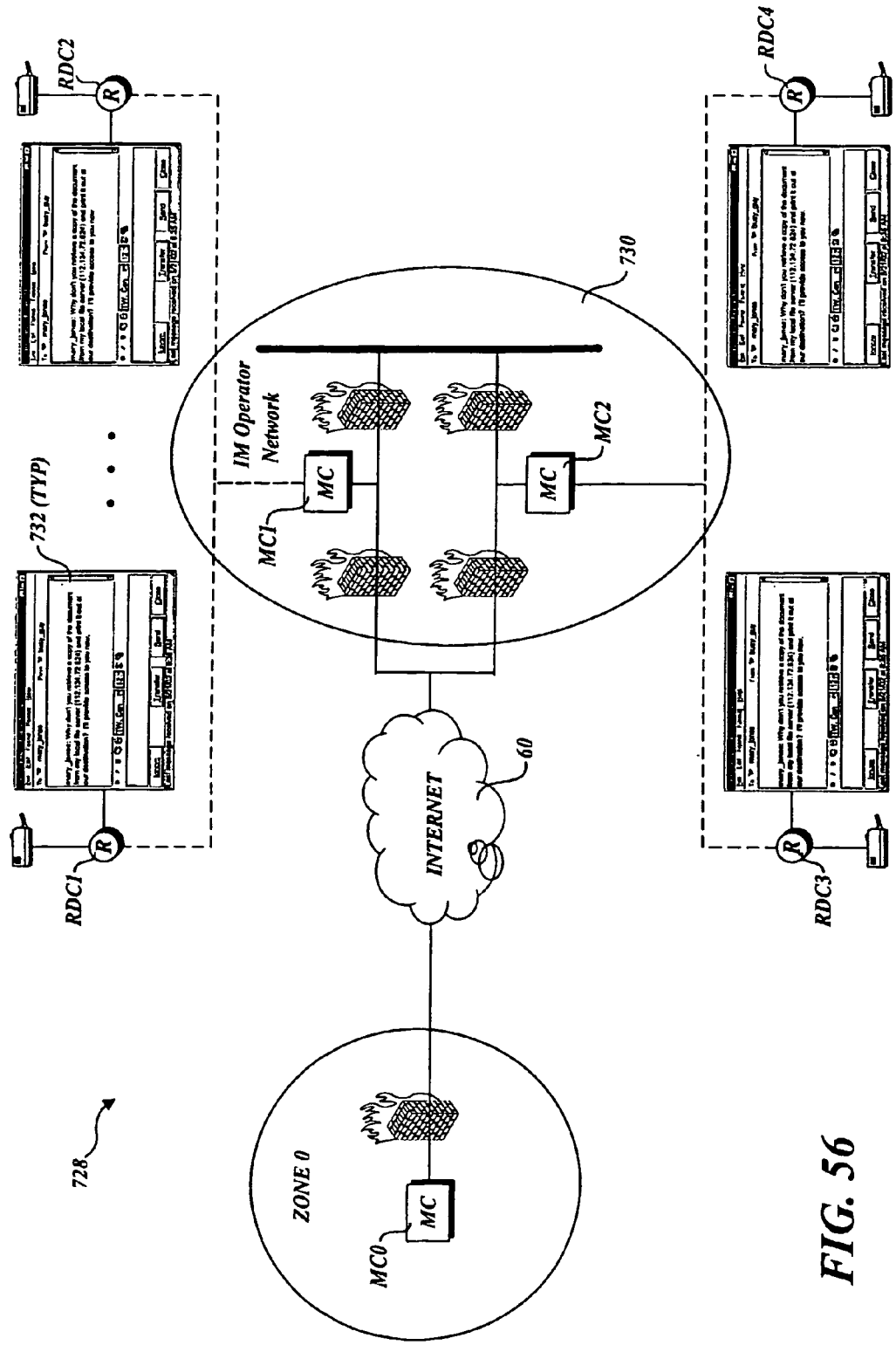
FIG. 56 is a schematic diagram illustrating how the principles of the output management system architecture can be extended to support resource sharing via instant messaging services.

A diagram 729 illustrating an exemplary instant messenger integration implementation is shown in FIG. 56. In this example, two public Message Centers MC1 and MC2, each including an integrated Print Service, are located within an instant messaging (IM) operating network 730. These Message Centers are registered to the Zone 0 root Message Center MC0. Each instant messaging client 732 user runs a Remote Desktop Client on the same host and is registered to one of the Message Centers in the IM operator network 730. In this configuration, all of the instant messaging client users can access each other's shared resources without consulting the root Message Center. If desired, the IM network operator may install more Message Centers to scale the system up for performance considerations.

The illustrated system takes advantage of the Microsoft Windows' new architecture for device sharing. Using a printer driver as an example, a device driver of a Windows shared printer can be delivered, upon request, through the Remote Desktop Client to another host. After downloading and installation of the printer driver, users may access the other person's printer as a shared network device. This expands the concept of device sharing in Windows to a greater extent. The network in this configuration is extended to the entire instant messaging network instead of a LAN. Instant messaging users can then output documents to each other's shared device as if they were connected on the same LAN while the Remote Desktop clients do all the works.

Multimedia Messaging Service Integration

Not long ago, wireless computing was still limited to text-oriented applications, generally due to the low network bandwidths and lack of processing power on the wireless device. Recently, some carriers have introduced support for a broader suite of services, such as WAP applications. Although the initial response has not been overwhelming, most wireless carriers believe that it is inevitable to provide services that will provide users with a more compelling experience. This will require higher network bandwidth, more capable hardware, and more powerful devices. All the efforts from carriers, infrastructure providers, and device manufactures have led to the arrival of "3G" (third generation) wireless communications.

Figure 57:
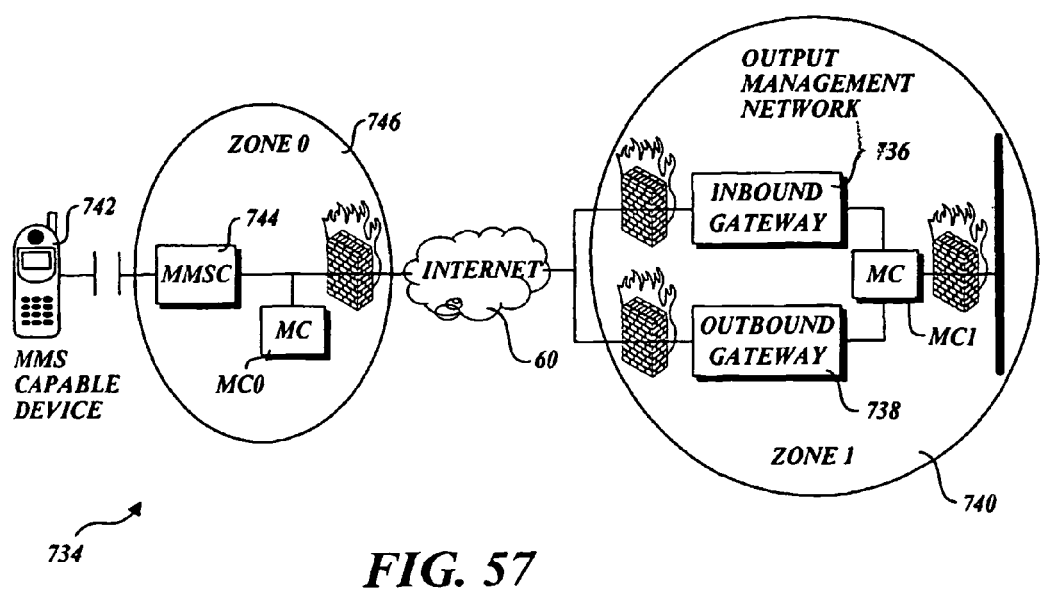
FIG. 57 is a schematic diagram illustrating how the system may be used via a multimedia messaging-enabled device.

Many mobile device manufactures have started working on 3G service development, including support for video clips, MP3, slide shows, video conferencing, etc. These fall into the general category multimedia wireless solutions. The architecture of the present system compliments such multimedia and mobile computing environments by providing a common platform for multimedia output management. A diagram 734 corresponding to a multimedia integration system that is being developed by one of the industry leaders, Nokia, called the Multimedia Messaging Service (MMS), is shown in FIG. 57.

In this example, an inbound gateway 736 and an outbound gateway 738 are deployed such that they both connect to the MMSC and a Message Center MC1 within an Output Management Network 740. The inbound gateway receives mobile originated MMS requests from an MMS capable device 742, converts and delivers these requests to Message Center MC1 for further processing. A typical request can be to save a movie clip to a shared file server, to print a picture image to a color laser printer, or to relay an MP3 audio message to the aforementioned output management system-powered instant messaging client. The outbound MMS gateway receives general requests destined to MMS devices from the output management clients. It converts the requests to comply with MMS format and sends it to a Multimedia Messaging Service Center (MMSC) 744 for delivery. The system can employs an optional root Message Center in an MMS Operation Network 746 to support efficient resource sharing among MMS-enabled Message Centers and clients. In one embodiment, the Inbound Gateway and Outbound Gateway may be co-located (i.e., hosted on the same equipment) to minimize hardware costs. This architecture leverages the MMS service to non-MMS clients using the output management system as the conduit. The general concept of the multimedia messaging service integration can apply to any type of multimedia service with modifications of the incoming interface of the inbound gateway and the outgoing interface of the outbound gateway. The rest of the output management system shall remain intact.

Document Access/Printing Behind a Firewall via Secure CGI/VPI Proxy

Figure 58:
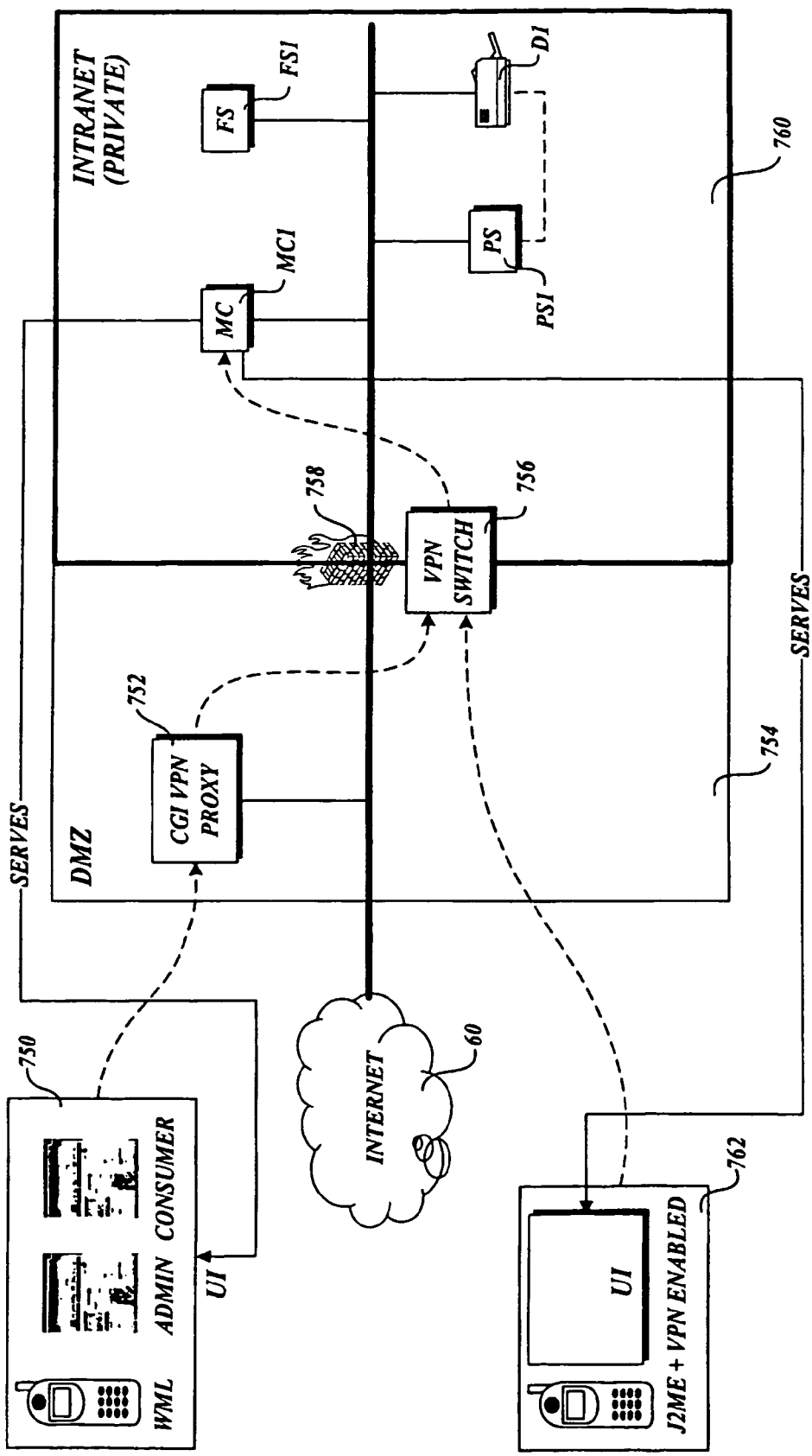
FIG. 58 is a schematic diagram illustrating how a CGI VPN proxy may be implemented to enhance the security of a private network that includes resources used by the system.

As discussed above, the system enables users to access resources, including documents and output devices, which are located on private networks behind firewalls. In the earlier architectures, this functionality was facilitated by using a Message Channel-to-Message Channel persistent communication channel through the firewall. With reference to FIG. 58, another way this can be accomplished is through the user of a CGI/VPN proxy. As illustrated In the Figure, the various user interfaces 750 of the system may be configured such that public user communications are routed from a public network (e.g., Internet 60) through a CGI VPN proxy 752 disposed within a DMZ 754. The CGI VPN proxy then routes the communications through a VPN switch 756 that provides a secure pass-through through a firewall 758, which provides security protection between DMZ 754 and a private Intranet 760. The VPN switch then routes inbound communications to a Message Center MC1 located within Intranet 760. Also located with the Intranet are three private resources, including a Print Service PS1, a File Store FS1, and an output device D1.

In accordance with the illustrated architecture, public users are permitted access to private resources via a VPN link between the publicly accessible user interfaces (i.e.; Web and WAP UI's) and a Message Center located within a private network. When the security of the Web and WAP UI's are secured, e.g., through user authentication and optional encryption techniques, only authorized users are enabled to access the VPN link, thereby maintaining the security features of firewall 756. Furthermore, since a Secure CGI/VPN proxy is used, hacking into the private network through the proxy is virtually eliminated.

This implementation extends the functionality of the system such that there is no requirement to provide a publicly-accessible Message Center. For example, an enterprise may desire to provide its sales representatives with the ability to retrieve and print documents stored on one or more private enterprise networks when the sales representatives are away from their home offices. The CGI/VPN proxy in combination with a private MC enables these sales representatives to access file stores within the private enterprise network(s) and to print documents stored on those file stores to any output devices registered with the private MC.

Another way to access a private MC through the VPN switch is through use of a J2ME (Java 2 Micro Edition)+VPN-enabled device 762. Such devices are in current development and are envisioned to be more readily available in the near future. In essence, a J2ME+VPN-enabled device has a VPN client built in that enables the device to directly communicate with a VPN switch without requiring the user of a VPN proxy, as illustrated in FIG. 58.

Printing on to Resources on Private Networks without MC's

Figure 59A:
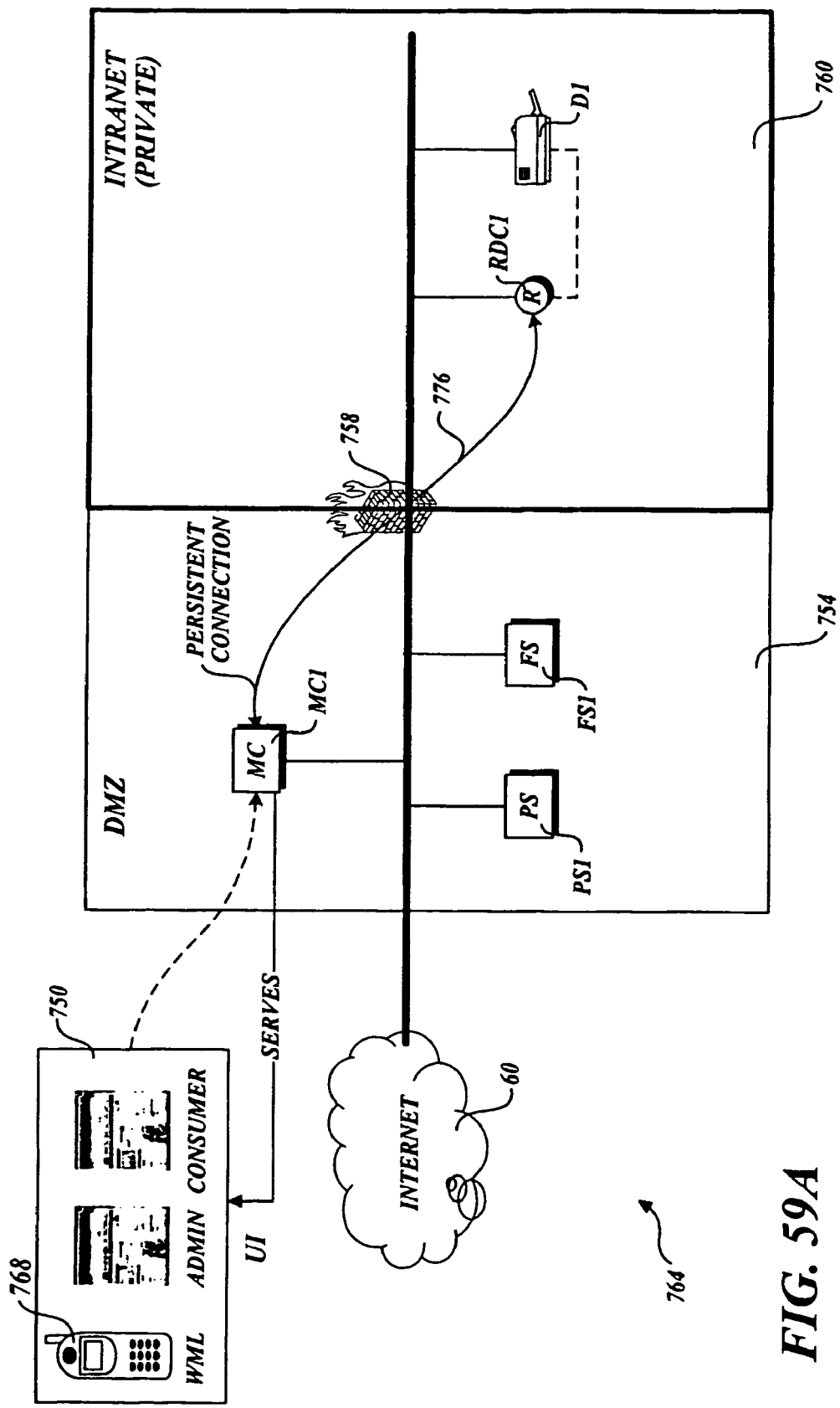
FIG. 59A is a schematic diagram illustrating a first configuration for enabling access to an output device located on a private network that doesn't include a Message Center.
Figure 59B:
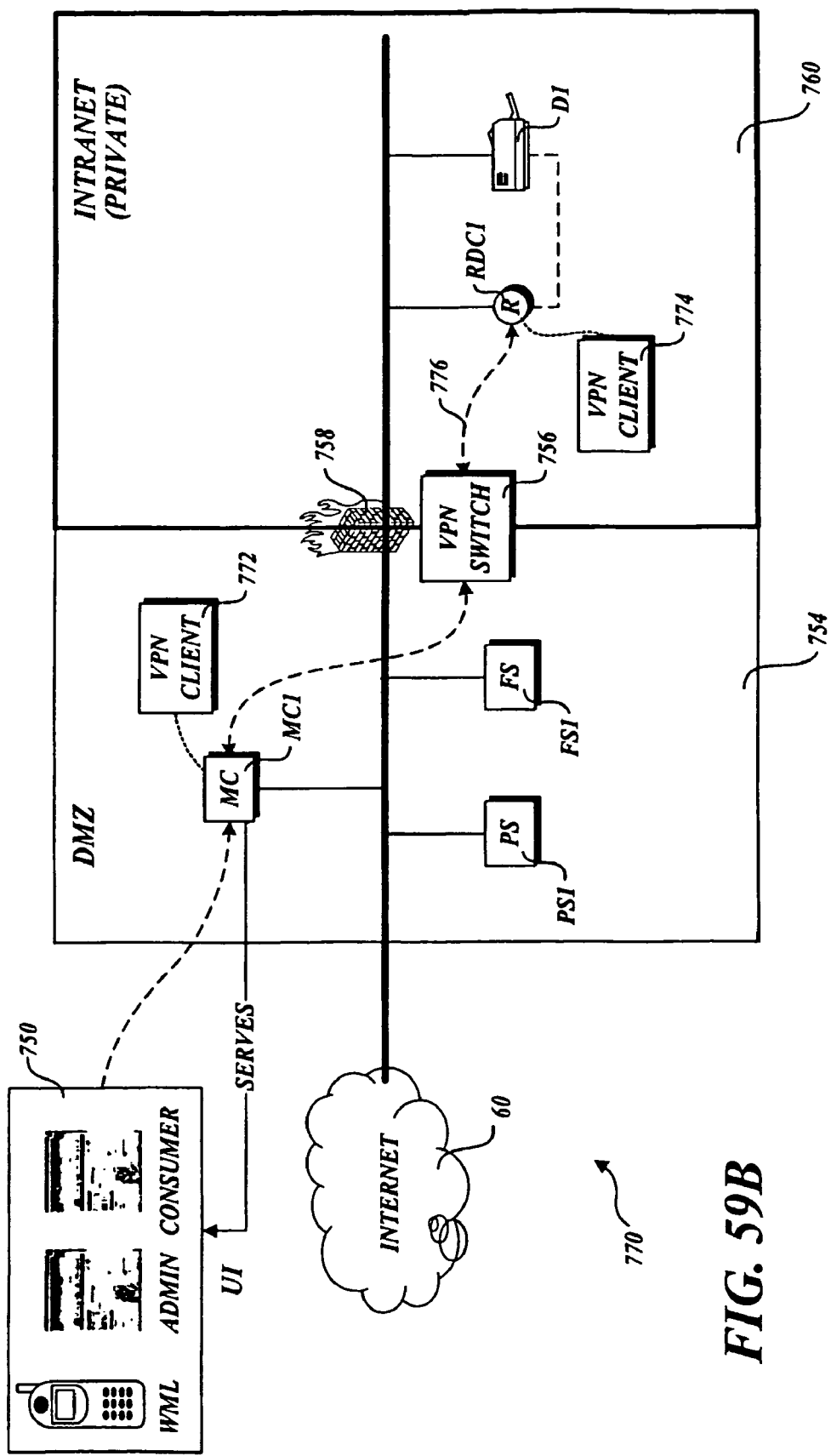
FIG. 59B is a schematic diagram illustrating a second configuration for enabling access to an output device located on a private network that doesn't include a Message Center.

As shown in FIGS. 59A and 59B, it is possible to configure the system to enable printing on output devices that are located on private networks that don't include Message Centers. For example, in a configuration 764 shown in FIG. 59A, a Message Center MC1 is disposed in a DMZ 754, while a destined printer D1 is located within a private intranet 760 that is separated from the DMZ by a firewall 758. In this configuration a persistent connection 764 is set up between an Remote Desktop Client RDC1 located with the private intranet and Message Center MC1.

During setup operations, Remote Desktop Client RDC1 will initialize a communication with Message Center MC1 to open a communication link corresponding to persistent connection 766 with the Message Center. The RDC will then send data to Message Center MC1 identifying the output devices connected to it (in this case output device D1). This information will be stored in Message Center MC1's RPRM database 242.

An exemplary print operation corresponding to configuration 764 may then proceed as follows. First, a user of an originating device such as cell phone 768 connects to Message Center MC1 via UI 750. Via the UI, the user is enabled to select a remote source document that is stored, e.g., on a file store FS1 located in DMZ 754, to be printed. Optionally, dependent on the configuration of other MC's and the location of other file stores, the document could be retrieved from another DMZ or private network (not shown). Of course, the user could also select a local source document stored on the originating device to print as well.

After selecting the document, the user would then select an output device; in this instance output device D1 is selected. Upon confirmation of the print request, the source document would be retrieved from its file store by Print.

Service PS, or sent to the Print Service if the document was a local source. The MC would also send information to the PS identifying the device capabilities of selected output device. The Print Service would then generate output image data corresponding to the source document and the selected output device, and store the output image data as an output image file in a repository (e.g., located within file store FS1). The PS would then inform Message Center MC1 that the job was complete, along with a reference to the output image file. The Message Center would then retrieve the output image file and forward it to Remote Desktop Client RDC1 via persistent connection 766. Once the image data file is received, the RDC would then submit it to output device D1 for rendering. Upon completion, the RDC would notify Message Center MC1 via persistent connection 766, whereupon the MC would update UI 750 to inform the user that the print job has been completed.

Another configuration 770 to produce the same end result is shown in FIG. 59B. In this instance, all of the components are the same as in FIG. 59A, except for the addition of a VPN switch 756, and VCN clients 772 and 774. In this instance, Message Center MC1 and Remote Desktop Client RDC1 would communicate via a VPN channel 776. Use of the VPN channel provides an extra level of security for private intranet 760.

In the foregoing description and accompanying drawings, embodiments of the invention that implement software operations provided by MS Windows operating system components were disclosed. This is not meant to be limiting, as the principles and teaching of the invention may be applied to implementation in which other operating systems are used, such as UNIX-based operating systems and LINUX-based operating systems. For example, various UNIX and LINUX operating systems provide graphical user interfaces, application API's and printing capabilities that are supported by OS kernel components that provide similar operations to the MS Windows printing support components discussed above (e.g., Windows GDI, print spooler, printer drivers, etc.)

Exemplary Server Computer System

Figure 60:
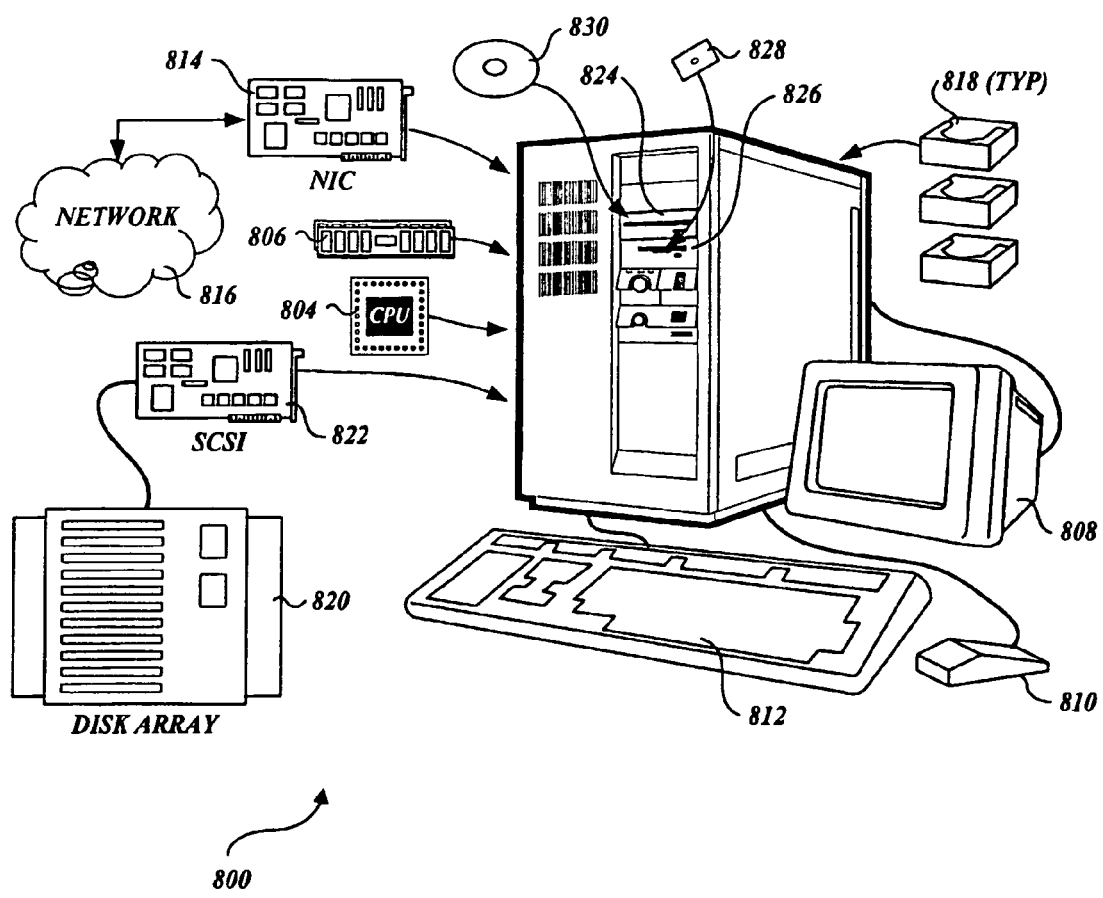
FIG. 60 is a schematic diagram of an exemplary computer server that may be used to host various components of the system, including Message Centers and Print Services.

With reference to FIG. 60, a generally conventional computer server 800 is illustrated, which is suitable for use in connection with practicing the present invention, and may be used for the DPS server computer and Web server computer where a separate computer is used for performing Web server operations. Examples of computer systems that may be suitable for these purposes include computer servers operating Microsoft Windows, UNIX-based, and LINUX-based operating systems.

Computer server 800 includes a chassis 802 in which is mounted a motherboard (not shown) populated with appropriate integrated circuits, including one or more processors 804 and memory (e.g., DIMMs or SIMMs) 806, as is generally well known to those of ordinary skill in the art. A monitor 808 is included for displaying graphics and text generated by software programs and program modules that are run by the computer server. A mouse 810 (or other pointing device) may be connected to a serial port (or to a bus port or USB port) on the rear of chassis 802, and signals from mouse 810 are conveyed to the motherboard to control a cursor on the display and to select text, menu options, and graphic components displayed on monitor 808 by software programs and modules executing on the computer. In addition, a keyboard 812 is coupled to the motherboard for user entry of text and commands that affect the running of software programs executing on the computer. Computer server 800 also includes a network interface card (NIC) 814, or equivalent circuitry built into the motherboard to enable the server to send and receive data via a network 816.

File system storage corresponding to the invention may be implemented via a plurality of hard disks 818 that are stored internally within chassis 802, and/or via a plurality of hard disks that are stored in an external disk array 820 that may be accessed via a SCSI card 822 or equivalent SCSI circuitry built into the motherboard. Optionally, disk array 820 may be accessed using a Fibre Channel link using an appropriate Fibre Channel interface card (not shown) or built-in circuitry.

Computer server 800 generally may include a compact disk-read only memory (CD-ROM) drive 824 into which a CD-ROM disk may be inserted so that executable files and data on the disk can be read for transfer into memory 806 and/or into storage on hard disk 818. Similarly, a floppy drive 826 may be provided for such purposes. Other mass memory storage devices such as an optical recorded medium or DVD drive may also be included. The machine instructions comprising the software programs, components, and modules that causes processor(s) 804 to implement the operations of the present invention that have been discussed above will typically be distributed on floppy disks 828 or CD-ROMs 830 (or other memory media) and stored on one or more hard disks 818 until loaded into memory 806 for execution by processor(s) 804. Optionally, the machine instructions may be loaded via network 816 as a carrier wave file. As presented above, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for printing via a wireless device, comprising:
   providing renderable data to the wireless device by which a user-interface (UI) is rendered on the wireless device;
   enabling a user to select source data to be printed via the UI;
   enabling the user to select an output device or use a default output device on which the source data are to be printed via the UI;
   receiving the source data via a print service;
   after said receiving, generating a preview on said wireless device of how a document will appear when rendered on the selected or default output device, wherein for image files, said generating creates said preview as dithered thumbnails based on display characteristics of a display of said wireless device and adjusts the final output size to fit the vertical and horizontal dimensions of the selected or default output device without losing an aspect ratio, and for multi-page non-image files, said generating converts the non-image files to a plain text format based on the display characteristics of the display of said wireless device without losing page relations to allow page navigation in a vertical direction and a horizontal direction using said UI, said navigation including random access to said preview of said multi-page files; and
   rendering output image data corresponding to the source data and one of the output device that was selected or the default output device via the print service,
   submitting the output image data to the output device to be printed.

2. The method of claim 1, wherein the wireless device comprises a wireless web-enabled device.

3. The method of claim 2, the wireless web-enabled device comprises a WAP (Wireless Application Protocol)-enabled device, and wherein the renderable data comprise WML (Wireless Markup Language) data.

4. The method of claim 1, wherein the wireless device comprises an IEEE 802.11-enabled device.

5. The method of claim 1, wherein the wireless device comprises a Bluetooth-enabled device.

6. The method of claim 1, wherein the source data are stored on the wireless device.

7. The method of claim 1, wherein the source data are stored on a remote store that is located remotely from the wireless device.

8. The method of claim 7, wherein the user-interface enables a user to navigate the remote store to select the source data.

9. The method of claim 7, wherein the remote store is on a private network that may not be directly accessed by the wireless device, further comprising providing a proxy that enables the wireless device to access the private network.

10. The method of claim 9, wherein the proxy comprises a virtual private network (VPN) proxy.

11. The method of claim 1, wherein the method is facilitated by an output management system, further comprising:
enabling the user to select and/or specify one or more favorite output devices from among output devices accessible via the output management system; and
storing information with the output management system pertaining to those output devices selected and/or specified by the user.

12. The method of claim 1, wherein the user-interface further enables a user to specify a network server to access source data from.

13. The method of claim 1, wherein the user-interface further enables a user to search for an output device via one or more search parameters.

14. The method of claim 1, wherein the print service generates the output image data by performing the operations of:
determining a file type of the source data;
determining an appropriate application to load via the print service to
generate the output image data; and
initiating a print action to cause the application in combination with print subsystem to generate the output image data.

15. The method of claim 1, wherein the source data correspond to a spreadsheet-type document, further comprising providing navigation controls via the user interface to enable a user to navigate to various portions of the simulated representation of the printed output, including moving horizontally and vertically within a single page of a spreadsheet document corresponding to the source data.

16. The method of claim 1, further comprising:
storing the output image data in a repository;
retrieving the output image data from the repository; and
forwarding the output image data to the output device.

17. The method of claim 1, further comprising providing job status information to the user via the user-interface.

18. The method of claim 7, further comprising sending a reference identifying a location of the source data on the remote store to the print service, and in response to receiving the reference, retrieving the source data via the print service using the reference.

19. The method of claim 1, further comprising: determining a location of the wireless device; dynamically determining a default output device based on the location of the wireless device.

20. The method of claim 19, wherein the method is facilitated by a output management system that includes a plurality of wireless data access points (WDAPs), further comprising:
storing data identifying a topological location of said plurality of WDAPs and output devices that are accessible via those WDAPs; and
determining a default output device based on its proximity to a WDAP through which the output management system is accessed by the wireless device.

* * * * *